(12) United States Patent
Theander et al.

(10) Patent No.: US 10,011,198 B2
(45) Date of Patent: Jul. 3, 2018

(54) VEHICULAR SEATING ASSEMBLY, SYSTEM AND METHOD

(71) Applicants: Joshua Hans Theander, Richmond, TX (US); Scott Allan Bannert, Houston, TX (US)

(72) Inventors: Joshua Hans Theander, Richmond, TX (US); Scott Allan Bannert, Houston, TX (US)

( * ) Notice: Subject to any disclaimer, the term of this patent is extended or adjusted under 35 U.S.C. 154(b) by 64 days.

(21) Appl. No.: 15/273,530

(22) Filed: Sep. 22, 2016

(65) Prior Publication Data

US 2018/0079329 A1    Mar. 22, 2018

(51) Int. Cl.

| | |
|---|---|
| *A47C 1/08* | (2006.01) |
| *A47D 1/10* | (2006.01) |
| *B60N 2/28* | (2006.01) |
| *B60N 2/26* | (2006.01) |
| *B60N 2/30* | (2006.01) |
| *B60N 2/42* | (2006.01) |
| *B60N 2/44* | (2006.01) |
| *B60N 2/90* | (2018.01) |

(52) U.S. Cl.
CPC ............ *B60N 2/286* (2013.01); *B60N 2/265* (2013.01); *B60N 2/2845* (2013.01); *B60N 2/2863* (2013.01); *B60N 2/3011* (2013.01); *B60N 2/4249* (2013.01); *B60N 2/449* (2013.01); *B60N 2/986* (2018.02)

(58) Field of Classification Search
CPC ...... B60N 2/286; B60N 2/265; B60N 2/2845; B60N 2/2863; B60N 2/3011; B60N 2/4249; B60N 2/449; B60N 2/2857; B60N 2/28; B60N 2002/2896; A47D 1/103

USPC ........ 297/250.1, 255, 256.1, 256.13, 256.14, 297/256.16, 254, 256
See application file for complete search history.

(56) References Cited

U.S. PATENT DOCUMENTS

| | | |
|---|---|---|
| 3,934,934 A | 1/1976 | Farrell, Jr. et al. |
| 3,948,556 A | 4/1976 | Hyde et al. |
| 3,951,450 A | 4/1976 | Gambotti |
| 3,992,056 A | 11/1976 | Koziatek et al. |
| D244,325 S | 5/1977 | Voytko |
| 4,033,622 A | 7/1977 | Boudreau |
| 4,058,342 A | 11/1977 | Ettridge |
| 4,186,961 A | 2/1980 | Farrell, Jr. et al. |

(Continued)

FOREIGN PATENT DOCUMENTS

| | | |
|---|---|---|
| DE | 2823529 | 11/1980 |
| DE | 3020212 | 12/1981 |

(Continued)

*Primary Examiner* — Mark R Wendell
(74) *Attorney, Agent, or Firm* — Buche & Associates, P.C.; John K. Buche; Scott D. Compton

(57) ABSTRACT

The present application is directed to a vehicular seating assembly including a plurality of forward facing seating configurations and a rearward facing seating configuration, the rearward facing seating configuration including an infant seat carrier operationally configured to be concealed from view when the seating assembly is set at a forward facing seating configuration, wherein the infant seat carrier is releasably attachable to the seat member assembly for vehicular seating assembly use and releasably attachable to vehicular child anchors for standalone use of the infant seat carrier apart from the seating assembly.

17 Claims, 42 Drawing Sheets

(56) References Cited

U.S. PATENT DOCUMENTS

| | | |
|---|---|---|
| 4,205,877 A | 6/1980 | Ettridge |
| D265,780 S | 8/1982 | Johansson |
| 4,429,916 A | 2/1984 | Hyde et al. |
| 4,436,341 A | 3/1984 | Converse |
| 4,461,510 A | 7/1984 | Cunningham et al. |
| 4,502,732 A | 3/1985 | Williams |
| 4,533,176 A | 8/1985 | Wyttenbach |
| 4,555,135 A | 11/1985 | Freeland |
| D283,475 S | 4/1986 | Reece |
| 4,596,420 A | 6/1986 | Vaidya |
| 4,634,177 A | 1/1987 | Meeker |
| D288,036 S | 2/1987 | Johnson, Jr. |
| 4,643,474 A | 2/1987 | Wise et al. |
| 4,655,506 A | 4/1987 | Wise et al. |
| 4,664,443 A | 5/1987 | Casale |
| 4,674,800 A | 6/1987 | Ensign |
| 4,678,196 A | 7/1987 | Van Steenburg |
| 4,738,489 A | 4/1988 | Wise et al. |
| 4,754,999 A | 7/1988 | Kain |
| 4,768,827 A | 9/1988 | Musgrove |
| 4,770,468 A | 9/1988 | Shubin |
| 4,822,064 A | 4/1989 | Hunter |
| 4,826,246 A | 5/1989 | Meeker |
| 4,858,997 A | 8/1989 | Shubin |
| D305,583 S | 1/1990 | Turner et al. |
| 4,909,574 A | 3/1990 | Sedlack |
| 4,915,446 A | 4/1990 | Darling et al. |
| D307,834 S | 5/1990 | Sudoh et al. |
| 4,936,627 A | 6/1990 | Guim |
| 4,936,628 A | 6/1990 | Delaney et al. |
| 4,936,629 A | 6/1990 | Young |
| 4,943,112 A | 7/1990 | Law |
| 4,984,845 A | 1/1991 | Knoedler et al. |
| 4,986,600 A | 1/1991 | Leblanc et al. |
| 5,061,012 A | 10/1991 | Parker et al. |
| 5,074,588 A | 12/1991 | Huspen |
| D323,432 S | 1/1992 | Morton |
| D324,439 S | 3/1992 | Churchill et al. |
| D325,132 S | 4/1992 | Cone |
| 5,106,154 A | 4/1992 | Kain |
| 5,121,964 A | 6/1992 | Fourrey et al. |
| 5,121,965 A | 6/1992 | Skold et al. |
| 5,133,567 A | 7/1992 | Owens |
| 5,147,109 A | 9/1992 | Jolly |
| 5,156,436 A | 10/1992 | Grene |
| D331,153 S | 11/1992 | Williams |
| 5,161,855 A | 11/1992 | Harmon |
| 5,181,761 A | 1/1993 | Meeker |
| D334,847 S | 4/1993 | Takahashi et al. |
| 5,228,745 A | 7/1993 | Hazel |
| D338,343 S | 8/1993 | Grange |
| D339,477 S | 9/1993 | Kain |
| D341,969 S | 12/1993 | Hazelton Kroah |
| D342,405 S | 12/1993 | Hazel |
| 5,277,472 A | 1/1994 | Freese et al. |
| D344,639 S | 3/1994 | Evans, Jr. |
| 5,292,175 A | 3/1994 | Artz |
| 5,292,176 A | 3/1994 | Artz |
| D347,737 S | 6/1994 | Allard et al. |
| 5,318,311 A | 6/1994 | Bofill |
| 5,322,343 A | 6/1994 | Parker et al. |
| D351,506 S | 10/1994 | Artz |
| 5,362,123 A | 11/1994 | Simmons |
| 5,393,116 A * | 2/1995 | Bolsworth ......... B60N 2/01583 296/65.03 |
| D355,986 S | 3/1995 | Myers |
| 5,398,951 A | 3/1995 | Ryu |
| D366,965 S | 2/1996 | Meeker et al. |
| 5,499,860 A | 3/1996 | Smith et al. |
| 5,518,293 A | 5/1996 | Coy et al. |
| 5,524,962 A | 6/1996 | Fulgenzi et al. |
| 5,524,964 A | 6/1996 | Weimersheimer |
| D373,028 S | 8/1996 | Kain |
| 5,542,742 A | 8/1996 | Fulgenzi et al. |
| D374,558 S | 10/1996 | Kain |
| 5,560,680 A | 10/1996 | Salvador et al. |
| 5,580,133 A | 12/1996 | Knox et al. |
| 5,588,699 A | 12/1996 | Rundle et al. |
| 5,588,700 A | 12/1996 | Homier |
| 5,599,060 A | 2/1997 | Stephens et al. |
| D383,912 S | 9/1997 | Meeker et al. |
| 5,678,887 A | 10/1997 | Sher |
| 5,688,025 A | 11/1997 | Davidson |
| 5,722,724 A | 3/1998 | Takei et al. |
| 5,779,320 A | 7/1998 | Corrales |
| 5,788,326 A | 8/1998 | Kawade et al. |
| 5,795,020 A | 8/1998 | Sirico |
| 5,836,650 A | 11/1998 | Warner, Jr. et al. |
| 5,884,967 A | 3/1999 | Gasper |
| 5,895,092 A | 4/1999 | Fischer |
| 5,957,531 A | 9/1999 | Kane et al. |
| 5,971,479 A | 10/1999 | Jacquemot et al. |
| 5,997,086 A | 12/1999 | Gibson et al. |
| 6,000,753 A | 12/1999 | Cone, II |
| 6,030,047 A | 2/2000 | Kain |
| D431,116 S | 9/2000 | Gibson et al. |
| 6,139,100 A | 10/2000 | Baskin-Lockman et al. |
| 6,139,101 A | 10/2000 | Berringer et al. |
| 6,152,528 A | 11/2000 | Van Montfort |
| 6,193,310 B1 | 2/2001 | Batalaris et al. |
| D439,020 S | 3/2001 | Kontos |
| 6,199,949 B1 | 3/2001 | DaSilva |
| 6,237,999 B1 | 5/2001 | Hobson |
| 6,241,314 B1 | 6/2001 | Pufall |
| 6,267,441 B1 | 7/2001 | Otero |
| D450,935 S | 11/2001 | Dranschak et al. |
| 6,336,682 B1 | 1/2002 | Rosko |
| 6,338,529 B1 | 1/2002 | David et al. |
| 6,341,818 B1 | 1/2002 | Verbovszky et al. |
| 6,367,821 B2 | 4/2002 | Thiele |
| 6,428,099 B1 | 8/2002 | Kain |
| 6,431,647 B2 | 8/2002 | Yamazaki |
| 6,450,576 B1 | 9/2002 | Rhein et al. |
| 6,467,840 B1 | 10/2002 | Verbovszky et al. |
| 6,481,791 B1 | 11/2002 | Facchini et al. |
| 6,491,348 B1 | 12/2002 | Kain |
| 6,494,531 B1 | 12/2002 | Kim |
| 6,508,510 B2 | 1/2003 | Yamazaki |
| 6,513,870 B1 | 2/2003 | Takizawa |
| 6,543,722 B1 | 4/2003 | Parrow et al. |
| 6,572,189 B1 | 6/2003 | Blaymore |
| 6,592,183 B2 | 7/2003 | Kain |
| 6,616,226 B2 | 9/2003 | Yanagihara |
| 6,623,074 B2 | 9/2003 | Asbach et al. |
| 6,626,492 B1 | 9/2003 | Uno |
| 6,641,211 B2 | 11/2003 | Takizawa |
| 6,655,702 B2 | 12/2003 | Senger |
| 6,672,664 B2 | 1/2004 | Yanaka et al. |
| 6,676,212 B1 | 1/2004 | Amirault |
| 6,695,400 B2 | 2/2004 | Washizuka et al. |
| 6,705,675 B1 | 3/2004 | Eastman et al. |
| 6,705,676 B1 | 3/2004 | Berringer et al. |
| 6,739,661 B1 | 5/2004 | Dukes |
| 6,746,080 B2 | 6/2004 | Tsugimatsu et al. |
| 6,769,735 B1 | 8/2004 | Winkler |
| 6,793,280 B2 | 9/2004 | Washizuka et al. |
| 6,793,283 B1 | 9/2004 | Sipos |
| 6,808,232 B2 | 10/2004 | Takizawa |
| 6,811,216 B2 | 11/2004 | Sedlack |
| 6,820,939 B1 | 11/2004 | Chen |
| 6,834,915 B2 | 12/2004 | Sedlack |
| 6,837,531 B2 | 1/2005 | Mack et al. |
| 6,857,700 B2 | 2/2005 | Eastman et al. |
| 6,871,908 B2 | 3/2005 | Takizawa |
| 6,874,667 B2 | 4/2005 | Dykstra et al. |
| 6,877,809 B2 | 4/2005 | Yamazaki et al. |
| 6,893,088 B2 | 5/2005 | Kassai et al. |
| 6,908,151 B2 | 6/2005 | Meeker et al. |
| 6,913,313 B2 | 7/2005 | Sedlack |
| 6,916,066 B2 | 7/2005 | Sedlack |
| 6,938,915 B2 | 9/2005 | Bischoff et al. |
| 6,942,294 B2 | 9/2005 | Takamizu |
| 6,962,393 B2 | 11/2005 | Amirault |
| 6,979,057 B2 | 12/2005 | Sedlack |

(56) References Cited

U.S. PATENT DOCUMENTS

| | | |
|---|---|---|
| 7,000,985 B2 | 2/2006 | Belgarde |
| 7,004,541 B2 | 2/2006 | Sedlack |
| 7,044,548 B2 | 5/2006 | Mullen et al. |
| 7,066,536 B2 | 6/2006 | Williams et al. |
| D524,559 S | 7/2006 | Cymbalski et al. |
| 7,097,245 B2 | 8/2006 | Barker |
| D528,832 S | 9/2006 | Shibata et al. |
| 7,100,976 B1 | 9/2006 | Desalve |
| D529,302 S | 10/2006 | Loehr |
| D529,319 S | 10/2006 | Shibata et al. |
| D530,136 S | 10/2006 | Toth |
| D533,363 S | 12/2006 | Cymbalski et al. |
| D535,500 S | 1/2007 | Shibata et al. |
| 7,159,941 B2 | 1/2007 | Thomas |
| 7,163,265 B2 | 1/2007 | Adachi |
| D536,908 S | 2/2007 | Eros |
| D537,640 S | 3/2007 | Spence et al. |
| 7,195,314 B2 | 3/2007 | Spence et al. |
| 7,207,628 B2 | 4/2007 | Eros |
| 7,219,958 B2 | 5/2007 | Yamazaki et al. |
| D545,074 S | 6/2007 | Loew et al. |
| 7,230,530 B1 | 6/2007 | Almquist |
| 7,246,853 B2 | 7/2007 | Harcourt et al. |
| 7,261,376 B2 | 8/2007 | Kespohl |
| 7,270,373 B2 | 9/2007 | Sakumoto |
| 7,273,256 B2 | 9/2007 | Santamaria |
| 7,278,683 B2 | 10/2007 | Williams et al. |
| 7,325,871 B2 | 2/2008 | Gangadharan et al. |
| 7,357,451 B2 | 4/2008 | Bendure et al. |
| 7,370,912 B2 | 5/2008 | Williams et al. |
| 7,380,878 B2 | 6/2008 | Clement et al. |
| 7,448,683 B2 | 11/2008 | Rikhof |
| 7,455,358 B2 | 11/2008 | Harcourt et al. |
| 7,458,635 B2 | 12/2008 | Mendis et al. |
| 7,464,990 B2 | 12/2008 | Collias |
| D584,899 S | 1/2009 | Cymbalski et al. |
| 7,472,955 B2 | 1/2009 | Crane et al. |
| 7,475,941 B2 | 1/2009 | Clement et al. |
| 7,478,877 B2 | 1/2009 | Lhomme et al. |
| 7,481,492 B2 | 1/2009 | Lhomme et al. |
| 7,490,897 B2 | 2/2009 | Lhomme et al. |
| D591,063 S | 4/2009 | Cymbalski et al. |
| 7,517,016 B1 | 4/2009 | West et al. |
| D591,960 S | 5/2009 | Cymbalski et al. |
| D591,961 S | 5/2009 | Cymbalski et al. |
| 7,533,935 B2 | 5/2009 | Mostert |
| 7,600,766 B2 | 10/2009 | Erskine |
| 7,604,295 B2 | 10/2009 | Fransen et al. |
| 7,625,043 B2 | 12/2009 | Hartenstine et al. |
| 7,628,438 B2 | 12/2009 | Partch |
| 7,658,431 B2 | 2/2010 | Foussianes et al. |
| 7,669,927 B1 | 3/2010 | Zaid |
| 7,717,506 B2 | 5/2010 | Amesar et al. |
| 7,726,738 B1 | 6/2010 | Rice |
| 7,735,921 B2 | 6/2010 | Hutchinson et al. |
| 7,740,313 B1 | 6/2010 | Hei et al. |
| D621,171 S | 8/2010 | Xu |
| 7,770,970 B2 | 8/2010 | Hei et al. |
| D629,218 S | 12/2010 | Li |
| D629,219 S | 12/2010 | Xu et al. |
| D629,220 S | 12/2010 | Xu et al. |
| D632,098 S | 2/2011 | Cymbalski et al. |
| D632,099 S | 2/2011 | Cymbalski et al. |
| D632,100 S | 2/2011 | Cymbalski et al. |
| D632,501 S | 2/2011 | Cymbalski et al. |
| 7,887,140 B1 | 2/2011 | Forlivio |
| 7,891,738 B2 | 2/2011 | Sellers |
| D637,825 S | 5/2011 | Xu et al. |
| 7,942,478 B2 | 5/2011 | Cymbalski et al. |
| 8,002,290 B2 | 8/2011 | Russell et al. |
| 8,002,325 B2 | 8/2011 | Foussianes et al. |
| 8,007,043 B1 | 8/2011 | Vuong |
| D648,550 S | 11/2011 | Owen |
| 8,061,772 B2 | 11/2011 | Mosler et al. |
| 8,061,773 B2 | 11/2011 | Collias |
| 8,070,226 B2 | 12/2011 | Dingler et al. |
| 8,070,227 B2 | 12/2011 | Brunick et al. |
| 8,070,228 B2 | 12/2011 | Karremans et al. |
| D653,885 S | 2/2012 | Longenecker |
| 8,136,881 B2 | 3/2012 | Vertegaal |
| 8,182,017 B2 | 5/2012 | Foussianes et al. |
| 8,220,870 B2 | 7/2012 | Omar |
| 8,235,464 B2 | 8/2012 | Rikhof et al. |
| 8,235,465 B2 | 8/2012 | Hei et al. |
| 8,262,161 B2* | 9/2012 | Fritz ................ B60N 2/2806 297/253 |
| 8,276,988 B2 | 10/2012 | Hartenstine et al. |
| 8,303,019 B2 | 11/2012 | Foussianes et al. |
| 8,317,265 B2 | 11/2012 | Hutchinson et al. |
| D676,250 S | 2/2013 | Cymbalski et al. |
| D676,679 S | 2/2013 | Cymbalski et al. |
| 8,382,153 B2 | 2/2013 | Harris |
| D680,761 S | 4/2013 | Spaven et al. |
| 8,419,129 B2 | 4/2013 | Inoue et al. |
| 8,430,443 B2 | 4/2013 | Foussianes et al. |
| 8,434,821 B2 | 5/2013 | Gibree |
| D684,804 S | 6/2013 | Spaven et al. |
| 8,459,739 B2* | 6/2013 | Tamanouchi ........ B60N 2/2806 297/256.12 |
| 8,474,907 B2 | 7/2013 | Weber et al. |
| D687,231 S | 8/2013 | Gillett et al. |
| 8,500,196 B2 | 8/2013 | Strong et al. |
| 8,534,756 B2 | 9/2013 | Zhao |
| D692,678 S | 11/2013 | Williams et al. |
| 8,590,967 B1 | 11/2013 | Pearce |
| D697,323 S | 1/2014 | Williams et al. |
| 8,622,476 B2 | 1/2014 | Karremans et al. |
| 8,622,478 B2 | 1/2014 | Spence |
| 8,632,124 B2 | 1/2014 | Clement et al. |
| 8,632,127 B2 | 1/2014 | Brunick et al. |
| 8,684,454 B2 | 4/2014 | Chipman et al. |
| 8,696,063 B2 | 4/2014 | Rattenbury et al. |
| 8,807,650 B2 | 8/2014 | Ascher et al. |
| 8,827,364 B2 | 9/2014 | Banghart et al. |
| 8,840,184 B2 | 9/2014 | Szakelyhidi et al. |
| 8,894,148 B2 | 11/2014 | Bailey |
| 8,894,151 B2 | 11/2014 | Poniatowski et al. |
| 8,960,794 B2 | 2/2015 | St. Pierre |
| 8,967,717 B2 | 3/2015 | Sims |
| 9,061,611 B2* | 6/2015 | Love ................... B60N 2/2887 |
| 2005/0253431 A1* | 11/2005 | Hei ..................... B60N 2/2806 297/250.1 |
| 2007/0108813 A1* | 5/2007 | Thomas .............. B60N 2/2863 297/255 |
| 2007/0114824 A1* | 5/2007 | Mendis ................ B60N 2/206 297/238 |
| 2007/0170758 A1* | 7/2007 | Allen .................. B60N 2/0244 297/250.1 |
| 2008/0238162 A1 | 10/2008 | Suzuki et al. |
| 2008/0258525 A1* | 10/2008 | Mendenhall ............ B60N 2/28 297/250.1 |
| 2008/0258526 A1* | 10/2008 | Mendenhall ......... B60N 2/2866 297/250.1 |
| 2010/0026063 A1 | 2/2010 | Mosler |
| 2010/0045086 A1 | 2/2010 | Merensky |
| 2010/0117417 A1* | 5/2010 | Foussianes ............ B60N 2/002 297/256.16 |
| 2014/0203610 A1* | 7/2014 | Line ................... B60N 2/2222 297/354.1 |
| 2015/0137549 A1 | 5/2015 | Markel |
| 2015/0183341 A1* | 7/2015 | Carpenter ............ B60N 2/2821 297/256.16 |
| 2015/0336481 A1* | 11/2015 | Horsfall ................. B60R 22/10 297/256.12 |
| 2017/0240073 A1* | 8/2017 | Termini ................ B60N 2/2848 |

FOREIGN PATENT DOCUMENTS

| | | |
|---|---|---|
| DE | 4417869 | 11/1995 |
| EP | 0348374 | 12/1989 |
| EP | 0516495 A1 | 12/1992 |
| EP | 0650864 | 5/1995 |
| FR | 2665399 | 2/1992 |

(56) References Cited

FOREIGN PATENT DOCUMENTS

| WO | WO 1993014952 | 8/1993 |
|----|---------------|--------|
| WO | WO 1994004389 | 3/1994 |
| WO | WO 2001005618 | 1/2001 |
| WO | WO 2009061250 | 5/2009 |
| WO | WO 2012013837 | 2/2012 |
| WO | WO 2015076764 | 5/2015 |

* cited by examiner

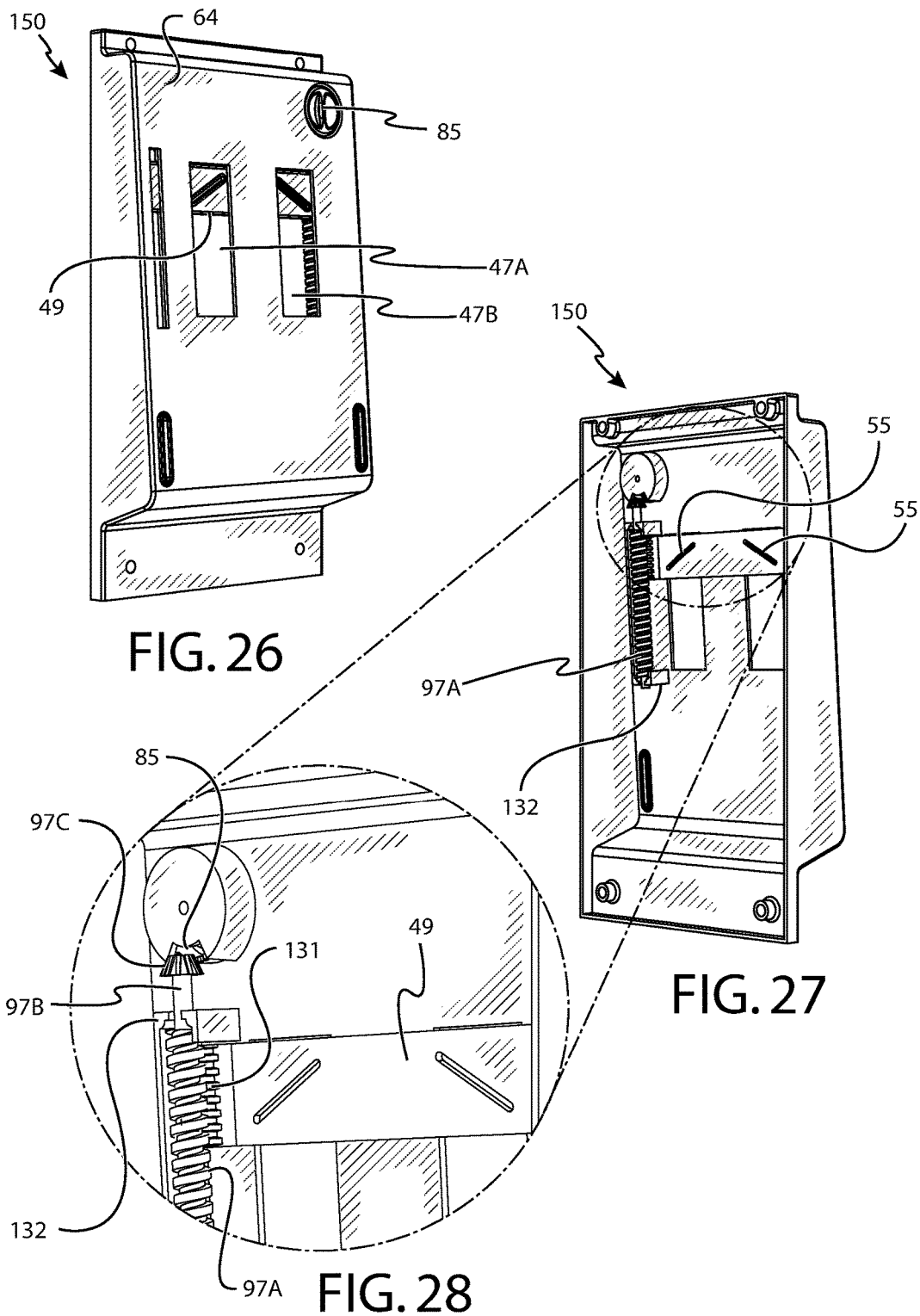

VEHICULAR SEATING ASSEMBLY, SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The application relates generally to vehicular seating including seating configured for use by persons of varying size and/or age and/or weight.

BACKGROUND OF THE INVENTION

According to the laws and regulations of most governing bodies, infants and children must be secured when traveling in a vehicle such as an automobile in the event of a collision or sudden stoppage of the vehicle. As a result, over time various classes of vehicular passenger seats have been developed to accommodate persons of varying size and/or age and/or weight. In other words, different types of passenger seats have been manufactured for holding infants, toddlers, small children and persons otherwise too small to utilize the seat restraint provided as part of the vehicle. What is needed is a vehicular passenger seat, either OEM or a replacement seat, capable of holding and securing persons of varying size, age and weight—from infancy to adulthood.

SUMMARY OF THE INVENTION

The present application is directed to a vehicular seating assembly having a seat member assembly and a backrest member assembly, the vehicular seating assembly including a plurality of vehicular forward facing seating configurations and a plurality of vehicular rearward facing seating configurations, the rearward facing seating configuration including an infant seat carrier operationally configured to be concealed from view when the seating assembly is set at a forward facing seating configuration, the infant seat carrier being (1) releasably attachable to the seat member assembly for rearward facing seating use and (2) releasably attachable to vehicular child anchors for standalone vehicular use apart from the seating assembly.

The present application is also directed to a vehicular seating assembly including (1) a mounting chassis fixable to one or more vehicular surfaces, (2) a seat member assembly attached to the mounting chassis, the seat member assembly having a pivotal seat member defining a first seat surface and an opposing underside surface including a mounting assembly disposed along the underside surface, (3) a backrest member assembly attached to the mounting chassis, the backrest member assembly having a pivotal first backrest member defining a first backrest surface when the first backrest member is set at an upright position, and (4) an infant seat carrier releasably attachable to the mounting assembly.

The present application is also directed to an infant seat carrier including (a) a seat surface member having a center longitudinal plane and a backrest surface member having a center longitudinal plane, the backrest surface member being pivotally attached to the seat surface member at opposing pivot axis junctions wherein the seat surface member and backrest surface member are pivotal between (1) a closed position wherein said center longitudinal planes are oriented in a substantially parallel alignment and (2) one or more open positions including open positions wherein the center longitudinal planes define obtuse angles; (b) one or more connectors releasably attachable to vehicular child anchors; and (c) at least a first locking mechanism operable with one of the pivot axis junctions, the first locking mechanism being operationally configured to dictate pivotal movement of the seat surface member and the backrest surface member between said closed position and said one or more open positions.

BRIEF DESCRIPTION OF THE SEVERAL VIEWS OF THE DRAWING

Other objectives of the disclosure will become apparent to those skilled in the art once the invention has been shown and described. The manner in which these objectives and other desirable characteristics can be obtained is explained in the following description and attached figures in which:

FIG. 26 is a perspective view of another embodiment of a second back surface of a backrest member;

FIG. 27 is a perspective view of the inner surface of the second back surface of FIG. 26;

FIG. 28 is a detail view of a slidable assembly of FIG. 27;

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF THE INVENTION

Before describing the invention in detail, it is to be understood that the present vehicular seating assembly, system and method are not limited to particular embodiments. It is also to be understood that the terminology used herein is for the purpose of describing particular embodiments only, and is not intended to be limiting. As used in this specification and the appended claims, OEM means "original equipment manufacturer." The term "vehicle" may include any passenger vessel or device typically used for transport purposes. Suitable vehicles may include, but are not necessarily limited to land based vehicles, aircraft, spacecraft, and watercraft. Suitable land based vehicles may include road transport vehicles, rail transport vehicles and magnetic levitation transport vehicles. Suitable road transport vehicles include, but are not necessarily limited to motor vehicles such as automobiles, i.e., cars, trucks and buses, wheeled machinery such as tractors and the like. Suitable rail transport vehicles include, but are not necessarily limited to passenger rail track trains and passenger monorail trains. Suitable aircraft include, but are not necessarily limited to fixed wing passenger airplanes, rotorcraft, fixed wing gliders, non-rigid airships, e.g., blimps, semi-rigid and/or rigid airships such as Zeppelins. Suitable watercraft include, but are not necessarily limited to ships, boats, hovercraft, and submarines.

Figure 1:
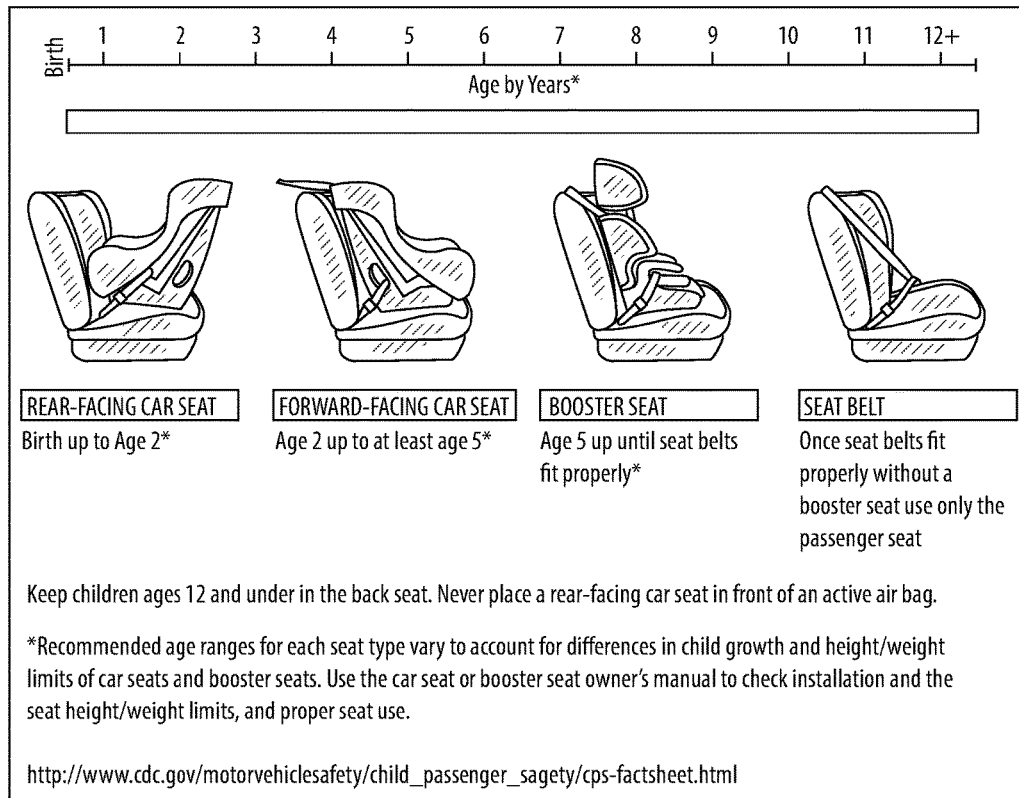
FIG. 1 illustrates various car type vehicular seats recommended by the American Academy of Pediatrics as of the time of this application.

The terms "adult" and "child" can be broadly defined as larger and smaller persons and not necessarily limited to any particular age or age range. The term "infant" herein refers to any child or baby of age and size that is typically required to be secured in rear-facing vehicular seat when acting as a passenger in a vehicle according to applicable laws and regulations. As understood by the skilled artisan, an infant may include an individual having one or more disabilities requiring seat restraints typically reserved for infants. Because the scope of what one or more governing and/or regulatory bodies may deem to be a human "infant" may vary, the term as used herein is not meant to be limited to any particular age, height and/or weight. As a non-limiting example, at the time of this application the United States Department of Health and Human Services—Centers for Disease Control and Prevent defines infants as persons up to one year in age. Herein, the term "passenger" refers to a person seated in the seating assembly during use thereof. The term "law" or "laws" may include one or more laws, rules, regulations and/or industry standards according to one or more governing bodies or jurisdictions in which the present invention is contemplated for use worldwide. For example, as of the date of the filing of this application the United States Department of Health and Human Services, Centers for Disease Control and Prevention recommends car type vehicular seats according to the classes recommended by the American Academy of Pediatrics as presented below and as shown in FIG. 1:

1. Birth Up to Age Two (2): Rear-Facing Car Seat

For the best possible protection, infants and children should be buckled in a rear-facing car seat, in the back seat, until age two or when they reach the upper weight or height limits of their particular seat. Check the seat's owner's manual and/or labels on the seat for weight and height limits.

2. Age Two (2) Up to at Least Age Five (5): Forward-Facing Car Seat

When children outgrow their rear-facing seats they should be buckled in a forward-facing car seat, in the back seat, until at least age five or when they reach the upper weight or height limit of their particular seat. Check the seat's owner's manual and/or labels on the seat for weight and height limits.

3. Age Five (5) Up Until Seat Belts Fit Properly: Booster Seat

Once children outgrow their forward-facing seat, (by reaching the upper height or weight limit of their seat), they should be buckled in a belt positioning booster seat until seat belts fit properly. Seat belts fit properly when the lap belt lays across the upper thighs (not the stomach) and the shoulder belt lays across the chest (not the neck). The recommended height for proper seat belt fit is 144.78 cm (57.0 inches) tall.

4. Once Seat Belts Fit Properly without a Booster Seat: Seat Belt Only

Children no longer need to use a booster seat once seat belts fit them properly. Seat belts fit properly when the lap belt lays across the upper thighs (not the stomach) and the shoulder belt lays across the chest (not the neck).

A rear-facing car seat may also be referred to herein as a "Class 1 Child Vehicle Seat"—in most locales this design is mandated with various safety features according to UN Standard ECE R44 R4 child seats as of the time of this application. Common safety features utilized in a Class 1 Child Vehicle Seat comprise a five point harness providing protective side shielding elements of an infant's upper torso and head and positioning of the infant in the reverse facing direction to reduce the effect of rapid vehicle deceleration on the infant's neck and head (see "Rear-Facing Car Seat" reference of FIG. 1). Once the infant reaches a particular size and weight, the individual will outgrow the size limitations of a typical Class 1 Vehicle Seat and is allowed to use a "Class 2 Child Vehicle Seat." An individual using a Class 2 Child Vehicle Seat may be referred to herein as a "toddler" as the term in understood by persons of ordinary skill in the art. Typically, toddlers are deemed to no longer require being transported in vehicles using a reverse facing seats. In most locales as of the time of this application, e.g., the United States of America, a toddler may be transported using a forward facing vehicle seat equipped with a five point harness and protective side shielding elements (see "Forward-Facing Car Seat" of FIG. 1). Class 2 Child Vehicle Seats suitably correspond to UN Standard ECE R44 R4 child seats. With further growth, a toddler suitably graduates from a Class 2 Child Vehicle Seat to a "Class 3 Child Vehicle Seat," which is then considered to be a small child once this size limit is realized. The Class 3 Child Vehicle Seat suitably positions a child in a booster seat configuration (see FIG. 1), forward facing in a vehicle's adult vehicle seat thereby raising a child's elevation and using a guide to properly position the adult vehicle seat's safety harness in a protective fashion for the child when seated in such booster seat. As such, the three point harness, i.e., shoulder belt, of the adult vehicle seat suitably restrains a child seated therein during vehicle operation. In many jurisdictions, protective side shielding elements and five point harnesses are no longer necessary for use of Group 3 Child Vehicle Seats.

As understood by persons of ordinary skill in the art, at the time of this application the acronym "ISOFIX" refers to International Organization for Standardization standard ISO 13216, which specifies the anchoring system, attachment points, for Group 1 child safety seats. The acronym ISOFIX is commonly used in Europe. In the United. States of America, the acronym "LATCH" is currently used to describe a similar anchoring system. As understood by the skilled artisan, LATCH refers to "Lower Anchors and Tethers for Children" and includes two lower anchor attachments and a top tether. In Canada, a similar anchoring system is referred to as "LUAS" or "Lower Universal Anchorage System." For purposes of this application and the claims, ISOFIX, LATCH, LUAS and similar anchoring systems may be referred to as herein as "vehicular child anchors" or "vehicular child anchor systems."

Accordingly, in one aspect the application provides a convenient manner to transform an adult type vehicular passenger seat between a Class 1, Class 2 and Class 3 Vehicle seat.

In another aspect, the application provides a vehicular passenger seating assembly operationally configured to provide a plurality of sitting surfaces including a plurality of seat surface members and backrest surface members for individuals of various size and age.

In another aspect, the application provides a vehicular passenger seating assembly effective to transform an adult vehicle seat into a rearward facing infant vehicle seat, including a Class 1 Vehicle Seat, and vice versa. In another aspect, the rearward facing infant vehicle seat of this application may be removed or detached from the remaining seat assembly and/or vehicle for independent vehicular use and/or transport apart from the vehicle.

In another aspect, the application provides a vehicular passenger seating assembly including a concealable rear-facing child vehicle seat, including a Class 1 Vehicle Seat, for transporting infants that may be exposed for passenger use when the adult passenger seat is set to an open position. In one suitable implementation, the rear-facing child vehicle seat of this application includes a five point harness for restraining an infant held therein and side shielding elements for safety considerations. As such, the present seating assembly may be interchanged between an adult passenger vehicle seat and a reverse facing vehicle seat for transporting infants.

In another aspect, the application provides a vehicular passenger seating assembly including a concealable front facing child vehicle seat configuration, including a Class 2 Child Vehicle Seat, for transporting toddlers. The concealable front facing vehicle child seat suitably folds out from a backrest of an adult passenger vehicle seat. The front facing vehicle child seat configuration may include a five point harness for restraining a toddler therein. The front facing vehicle child seat configuration may also include side shielding elements designed to fold out as the front facing vehicle child seat is directed to a passenger usable position. As such, the present seat assembly may be interchanged between an adult passenger vehicle seat and a seat configured for transporting toddlers in a forward facing position.

In another aspect, the application provides a vehicular seat assembly operationally configured to provide a booster child vehicle seat configuration, including a Class 3 Child Vehicle Seat, for transporting small children by adjusting the position of the seat surface of the seating assembly to an elevation substantially similar as the exemplary booster seat shown in FIG. 1. The seat assembly suitably orients smaller children at a position in the adult passenger seat to be properly harnessed in the seat using the seatbelt of the adult vehicle seat as provided. As such, the present seating assembly may be interchanged between an adult passenger vehicle seat and a seat configured for transporting small children in a forward facing position.

In another aspect, the application provides a vehicular seating assembly operationally configured to operate as a passenger seat for persons beginning at infancy up through adulthood as a person progresses in size and/or age and/or weight and according to laws governing passenger seat requirements according to size and/or age and/or weight and/or disabilities.

In another aspect, the application provides a vehicular seating assembly including various forms of safety features that are combined in multiple ways to meet safety requirements suitable for an infant and/or toddler and/or child passenger's protection during vehicle operation. Exemplary safety measures include, but are not necessarily limited to harnessing, protective shielding, passenger orientation or positioning, and the ability to prevent a passenger from misusing, bypassing or otherwise neglecting one or more safety features.

In another aspect, the application provides a vehicular seating assembly operationally configured to provide safety features such as proper harnessing, side shielding and passenger positioning of various positions discussed herein in a convenient form effective to assist a user of the vehicular seating assembly to avoid misuse or neglect of one or more of the safety features.

In another aspect, the application provides a vehicular seating assembly that may be installed for use in a pre-existing vehicle.

In another aspect, the application provides a vehicular seating assembly including a mounting chassis, a seat member assembly and a backrest member assembly, wherein the seat member assembly includes a seat member and an infant seat carrier concealable within the mounting chassis below the seat member.

In another aspect, the application provides a vehicular seating assembly that may be positioned as a front seat or as a back seat as the terms are understood by persons of ordinary skill in the art.

In another aspect, the application provides a vehicular seating assembly including one or more parts that may be removed from the vehicular seating assembly and replaced as desired or as otherwise required, e.g., any regulatory expiry schedule, improvements to vehicular seating assembly parts, vehicular collision or other impacts to the assembly via external forces, equipment malfunction, liquid spills, and combinations thereof.

In another aspect, the application provides a vehicular seating assembly including a foldable infant seat carrier that may be easily removed and replaced due to an expiry schedule or extenuating events such as a vehicular collision or other impact to the infant seat carrier requiring replacement of the infant seat carrier.

Although the present application is discussed in terms of a vehicular seating assembly, it is contemplated that the seating assembly may be employed for non-vehicular use if desired, e.g., residential use, office use, amusement park ride use.

To better understand the novelty of the vehicular seating assembly, system and method of use thereof, reference is hereafter made to the accompanying drawings. Referring to the simplified illustration of FIG. 2, the invention suitably includes a vehicular seating assembly 10 ("seating assembly 10") operationally configured to interchange between a plurality of seating arrangements and/or seating configurations for use by persons of various size and/or age and/or weight from infancy to adulthood. Although the seating assembly 10 may be built to scale, the present assembly 10 will be discussed in terms of vehicular seating assembly for automobile vehicle type use, e.g., a four door sedan, sport utility vehicle, and the like. As such, the present assembly 10 may be provided with an OEM type three point harness or "seatbelt" and releasable buckle as such is commonly used in vehicles such as automobiles.

Figure 2:
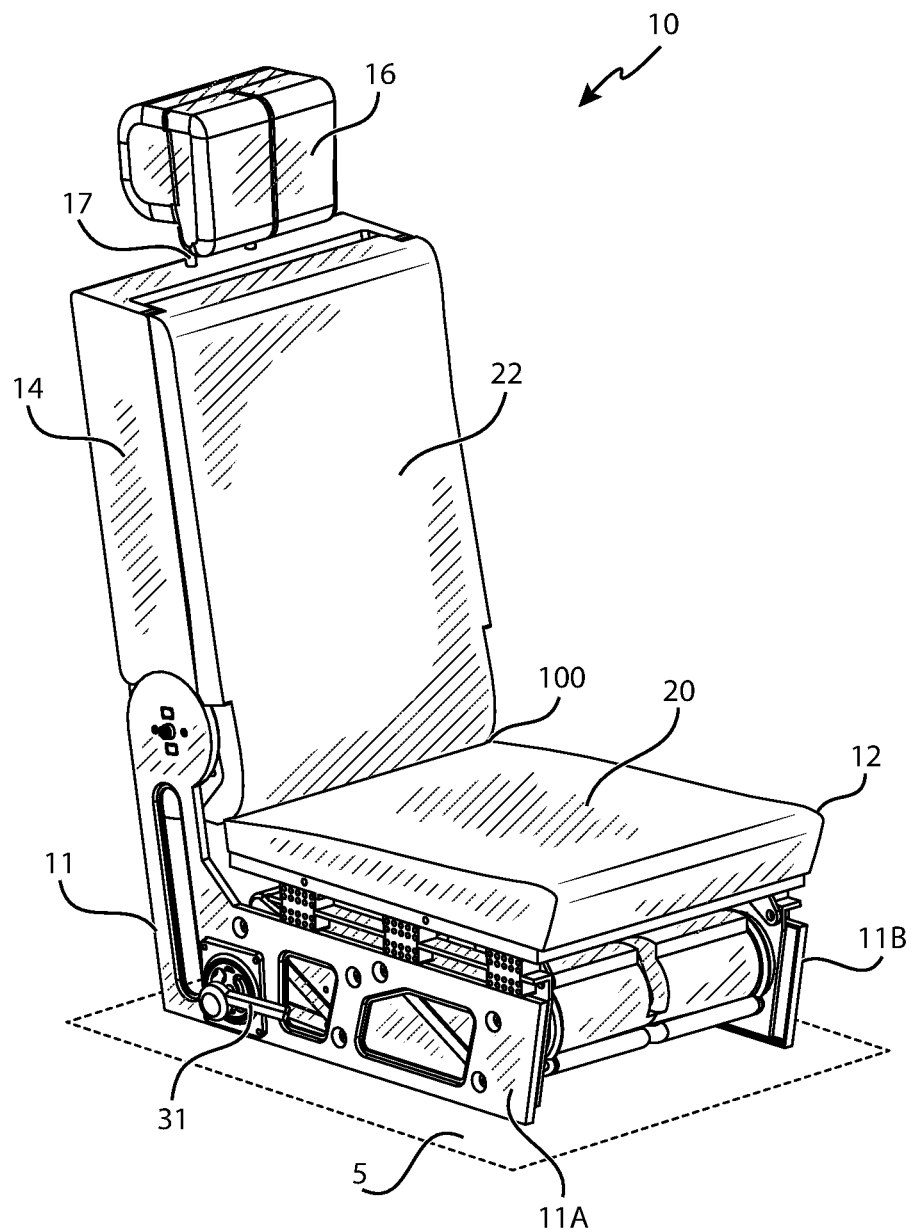
FIG. 2 is a front perspective view of an embodiment of a vehicular seating assembly of the present application.

As shown in the embodiment of FIG. 2, the seating assembly 10 may include a mounting chassis 11 (hereafter "chassis 11") with a seat base or seat member 12 and a back base or backrest member 14 attached to the chassis 11. Suitably, the chassis 11 is operationally configured to fix the seating assembly 10 to one or more vehicle surfaces 5. As such, the chassis 11 may be constructed from one or more materials durable for vehicular operation. Depending on the target vehicle of use and/or one or more applicable laws, the material(s) of construction of the chassis 11 may vary accordingly. For most vehicular operations, suitable materials include, but are not necessarily limited to metals, composite materials, plastics, and combinations thereof. In one particular embodiment, the chassis 11 may be constructed from individual steel members or parts welded together, including one or more lateral type connectors (not shown) interconnecting the opposing side sections 11A and 11B of the chassis 11 along or near their bottom edges. In another particular embodiment, the side sections 11A and 11B may be separate or independent members wherein each section is individually secured to a vehicle surface 5 and the seating assembly 10. Although the application includes a discussion herein incorporating a novel chassis 11, it is also contemplated that in another embodiment the remaining parts of the seating assembly 10, e.g., seat member 12 and backrest member 14, may be operationally configured for use with a preexisting or OEM seat chassis of a vehicle.

As understood by the skilled artisan, the first seat surface 20 of the seat member 12 and the first back or backrest surface 22 of the backrest member 14 are operationally configured to provide a sitting surface for an adult or adult sized person—typically supporting the buttocks region and the back region respectively of a person. Similar as commercially available vehicular seats, the seat member 12 and backrest member 14 are suitably operationally configured to support a seated person under static and dynamic conditions in a way that the supporting force is compatibly distributed on to the body of the person seated therein. As such, the seat member 12 and backrest member 14 may each be provided with (1) an internal structural support framework and (2) an outer covering for housing the support framework therein, the outer covering including, but not necessarily being limited to cushioning, padding, one or more outer covers or outer skin members, and combinations thereof. The cushioning and/or padding may include one or more soft and/or hard and/or resilient materials enclosed within one or more outer skins using materials similar as those in commercial vehicular use and appreciated by those persons skilled in the art. Without limiting the invention, typical commercially available vehicular seats include one or more foam materials enclosed within leather, faux leather, fabrics, polyesters, and combinations thereof. One suitable foam material includes, but is not necessarily limited to polyurethane foam. In addition to foam materials, other resilient materials may include, but are not necessarily limited to springs and similar support networks used alone or used in combination with one or more foam materials. An example of a frame, cushions or pads, and outer skins is detailed according to U.S. Pat. No. 8,162,402 titled "Vehicular Seats," which is herein incorporated by reference in its entirety. As understood by the skilled artisan, the outer skins may be removable and/or replaceable and/or washable and attached about the seat member 12 and backrest member 14 via snaps, elastic bands along the perimeter of the outer skins, hook/loop fasteners, zippers, and combinations thereof.

The present seat member 12 and backrest member 14 may also include seat warmers and/or seat coolers similar as known commercially available vehicular passenger seats. Examples include the teachings of U.S. Pat. No. 8,944,145 titled "Vehicle Seat Air-Conditioner and Vehicle Temperature Controller," which is herein incorporated by reference in its entirety and U.S. Pat. No. 6,079,485 titled "Vehicle Air-Conditioning System with Seat Heating and Cooling Device," which is herein incorporated by reference in its entirety. In addition, the backrest member 14 may also include lumbar support including lumbar support adjustment as described in U.S. Pat. No. 8,544,953 titled "Lumbar Support Assembly and Corresponding Seat Structure," which is herein incorporated by reference in its entirety and U.S. Pat. No. 8,162,399 titled "Lumbar Support for a Vehicle Backrest," which is herein incorporated by reference in its entirety.

As further shown in FIG. 2, the seating assembly 10 may include a headrest member 16 in communication with the backrest member 14 providing a contact surface for the rear part of the head and/or neck of an adult or adult sized person. As common to vehicular seating, the present headrest member 16 may include one or more post members 17 for mating with the backrest member 14, e.g., via corresponding female type receptacles along the backrest member 14. In one suitable embodiment, the post members 17 of the headrest member 16 may be adjustable lengthwise within female type receptacles in a manner similar as other commercially available vehicular headrest assemblies for adjusting the location of the headrest member 16 in relation to the backrest member 14 to a plurality of fixed positions, e.g., from (1) a lower most abutment position with the top of the backrest member 14 to (2) an upper most position fully extended apart from the top of the backrest member 14 wherein the post members 17 may be substantially exposed with a minimal portion of the post members 17 in a functional mating position with the female type receptacles along the backrest member 14. Without limiting the invention, the location of the headrest member 16 may be adjusted in a manner similar as known vehicular seat/headrests including, but not necessarily limited to the configurations as discussed in U.S. Pat. No. 6,035,516 titled "Securement of head rest support into automobile seat frame," issued Mar. 14, 2000, U.S. Pat. No. 5,769,499 titled "Motor vehicle seat," issued Jun. 23, 1998 and U.S. Pat. No. 4,844,545 titled "Headrest apparatus," issued Jul. 4, 1989, each of which is herein incorporated by reference in its entirety.

The sitting surface defined by the seat member 12 and backrest member 14 may be referred to herein as a primary sitting surface orientation of the seating assembly 10 that is operationally configured for adult and adult sized vehicle passengers wherein the seat member 12 provides a substantially horizontal first seat surface 20, or seat surface at a first elevation, and wherein the backrest member 14 provides a first back surface 22 at a first upright orientation substantially similar to commercially available standard vehicle passenger seats as depicted in the simplified illustration of FIG. 1. Still referring to FIG. 2, at a first elevation, the rear edge of the first seat surface 20 may lie in abutment with the underside of the backrest member 14 (see Contact Position 100). In another embodiment, the rear edge of the first seat surface 20 may lie very near to the underside of the backrest member 14. In still another embodiment, the rear edge of the first seat surface 20 may be shaped in a manner effective whereby only part of the rear edge of the first seat surface 20 lies in abutment with the underside of the backrest member 14.

For purposes of this application, the position of the seating assembly 10 in FIG. 2 may be considered as being set in a vehicular forward position, although the seating assembly 10 may be fixed to a vehicle surface 5 in a vehicular rearward position or side facing position as desired. As used herein, the terms "forward," "forward facing," "forward position" and the like suitably refer to an arrangement of the seating assembly 10 for seating a person in a manner effective to face the front of the vehicle provided with the seating assembly 10. Likewise, the term "rearward" suitably refers to an arrangement of the seating assembly 10 for seating a person in a manner effective to face the rear of the vehicle provided with the seating assembly 10.

Figure 3:
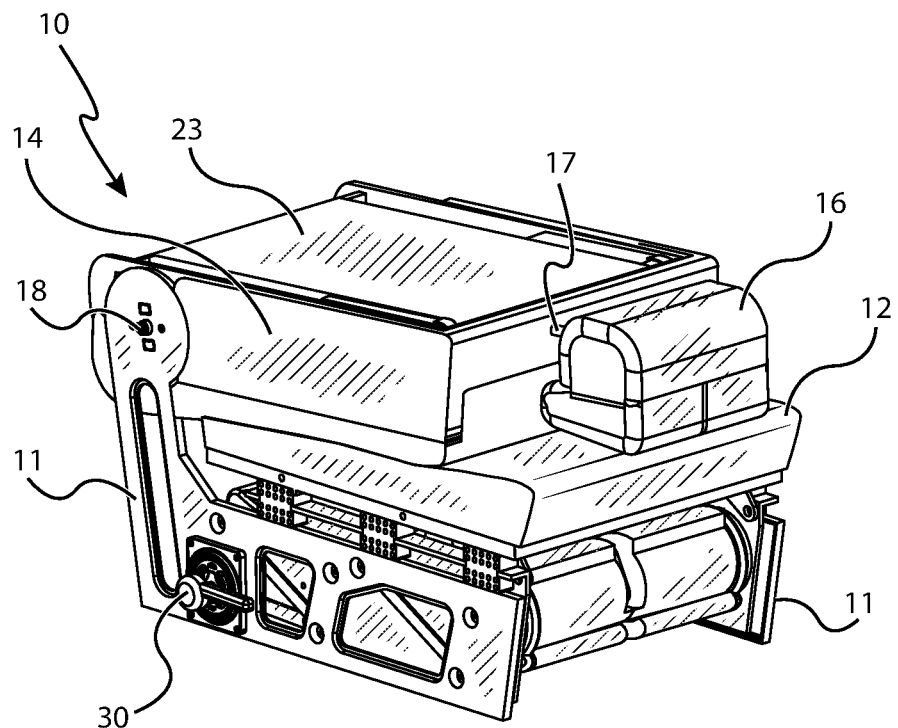
FIG. 3 is a front perspective view of the vehicular seating assembly of FIG. 2 in a collapsed or fold-down position.
Figure 4:
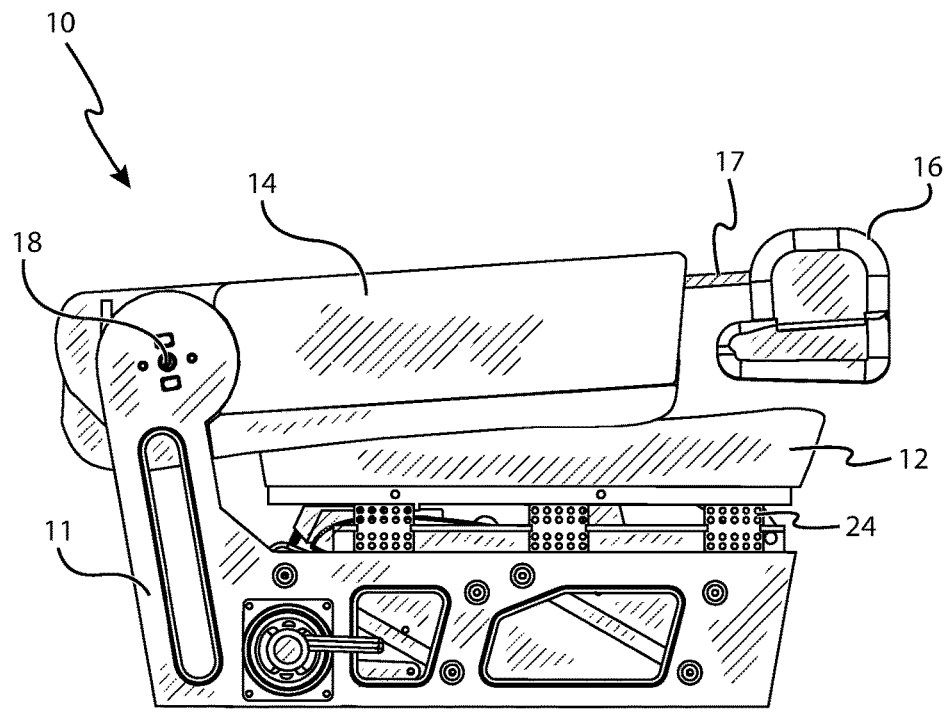
FIG. 4 is a side view of the vehicular seating assembly of FIG. 3.

Turning to FIGS. 3 and 4, the seating assembly 10 may be operationally configured to be oriented from the primary sitting surface orientation as shown in FIG. 2 to a collapsed or fold-down position as shown in FIGS. 3 and 4—or oriented to one or more intermediary positions there between. As shown in FIGS. 3 and 4, a fully collapsed or fold-down position may be characterized by directing the first back surface 22 of the backrest member 14 to a partial abutment position or full abutment position with the first seat surface 20 of the seat member 12 depending on the size and/or shape of the seat member 12 and/or the backrest member 14. In a collapsed position, one or more individuals may sit atop the second surface 23 of the backrest member 14 in any direction 360.0 degrees as desired. As such, a fully collapsed seating assembly 10 may be considered a non-directional sitting configuration compared to the other forward facing and rearward facing configurations discussed herein. In addition, the second surface 23 of the backrest member 14 may be used as a tabletop and/or work type surface, e.g., a surface for changing a baby's diaper, preparing meals, working with/on objects, as well as other purposes for which such surfaces may be used.

Figure 5:
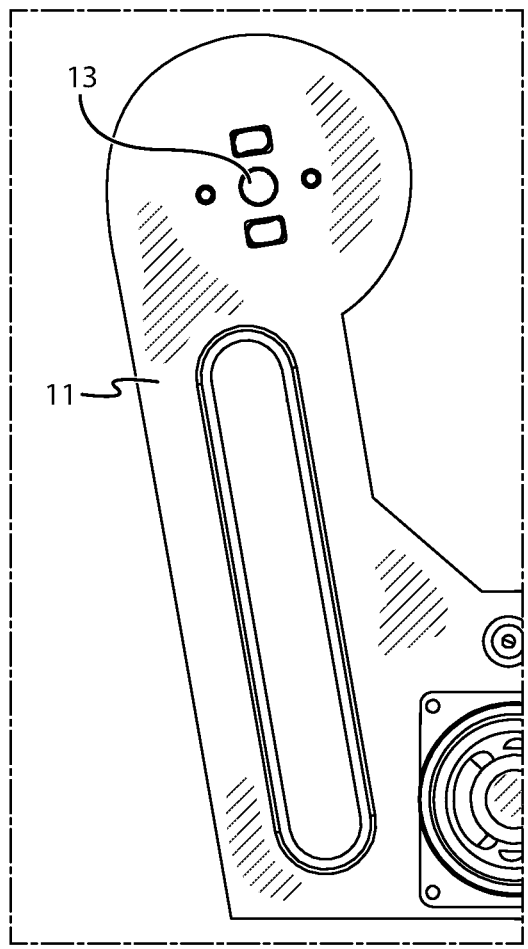
FIG. 5 is a detail view of a chassis of the vehicular seating assembly of FIG. 2.

In one simplified implementation, the backrest member 14 may be held or fixed in one or more reclining positions and/or upright positions and/or intermediary positions and/or collapsed positions in a manner similar as backrests of commercially known vehicular seats. As depicted in FIGS. 3 and 4, the backrest member 14 may be pivotally attached to the chassis 11 via one or more pivot members 18 disposed through one or more apertures 13 (see FIG. 5) of the chassis 11 and aperture(s) or opening(s) within or through the backrest member 14 in a manner effective for the backrest member 14 to be swiveled or pivoted about the one or more pivot members 18 and held in one of a plurality of fixed angles from a maximum reclining position (not shown) to an upright position as shown in FIG. 2 to a fully collapsed or folded position as shown in FIGS. 3 and 4 and various angles there between. In one implementation, the pivot member 18 may be provided in the form of an axle disposed through and extending out the opposing sides of the backrest member 14 where the pivot member 18 is attached to the chassis 11 via opposing apertures 13 on either side of the backrest member 14. In another implementation, one or more separate shorter opposing pivot members 18, e.g., pivot pins, pivot rods, or the like, may be employed along one or both the opposing sides of the backrest member 14 for mating with the apertures 13 of the chassis 11 and allowing the backrest member 14 to be directed or pivoted about the opposing pivot members 18. As understood by the skilled artisan, the backrest member 14 may include separate female openings for receiving opposing pivot members 18 as opposed to a single opening disposed through the backrest member 14. As also understood by the skilled artisan, the one or more pivot members 18 may include welds, nuts or other cap type members attachable at their outer distal ends for maintaining a mated position between the one or more pivot members 18 and the apertures 13 of the chassis 11. In still another embodiment, the seating assembly 10 may include planocentric discs welded or otherwise secured directly to the chassis 11 and backrest member 14 as discussed below.

Figure 6:
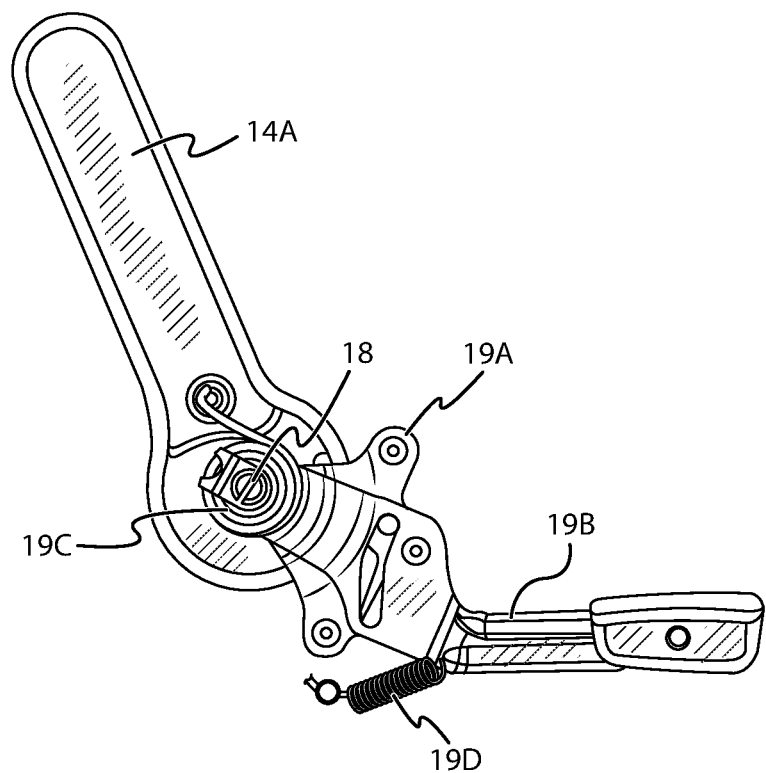
FIG. 6 is an exemplary side view of a reclining system usable with the vehicular seating assembly of FIG. 2.

The reclining angle of the backrest member 14 may be adjusted by incorporating one of several known techniques commonly found on commercially available automobile seats and the like including mechanical and electromechanical configurations. For example, the seating assembly 10 may include a mechanical reclining system as shown in FIG. 6, operationally configured to (1) adjust the reclining angle of the backrest member 14 and (2) lock the seating assembly 10 when set to a collapsed position as shown in FIGS. 3 and 4. In the simplified embodiment as shown, the mechanical reclining system may include a stabilizer plate 19A or similar device that is operationally configured to be attached to the chassis 11 and/or the frame member 25. The mechanical reclining system may also include a manual lever 19B pivotally attached to the pivot member 18 and a radial spring 19C disposed about the pivot member 18 and connected to the backrest member frame 14A as shown. The lever 19B is suitably held in a resting horizontal position via a linear biasing spring 19D attached to the chassis 11 and/or frame member 25 at a first end and attached to the lever 19B at a second end as shown. As understood by the skilled artisan, the stabilizer plate 19A includes gears corresponding to gears along the backrest member frame 14A. As the lever 19B is directed upward the gears along the stabilizer plate 19A and backrest member frame 14A disengage whereby the reclining angle of the backrest member 14 may be changed and locked in place by lowering the lever 19B back to a horizontal resting position. In addition, when the lever 19B is directed to a maximum upward position, the radial spring 19C may direct the backrest member 14 to a collapsed position as shown in FIGS. 3 and 4. In another embodiment, planocentric discs may be employed as described in U.S. Pat. No. 6,805,650 titled "Planocentric Disc Recliner," which is herein incorporated by reference in its entirety.

In addition to the configurations of the seating assembly 10 as shown in FIGS. 2-4, the seating assembly 10 is also suitably operationally configured to provide a plurality of additional sitting configurations for persons ranging from infants to adults including both forward facing sitting configurations and at least a first rearward facing sitting configuration. As discussed below, the additional sitting configurations of the seating assembly 10 may include, but are not necessarily limited to (1) a second forward sitting configuration including the first seat surface 20 at a second elevation and the first back surface 22 of the backrest member 14 in the first upright orientation of FIG. 2, (2) a third forward sitting configuration including a second seat surface at a third elevation and a second backrest surface and (3) a first rearward facing sitting configuration.

Figure 7:
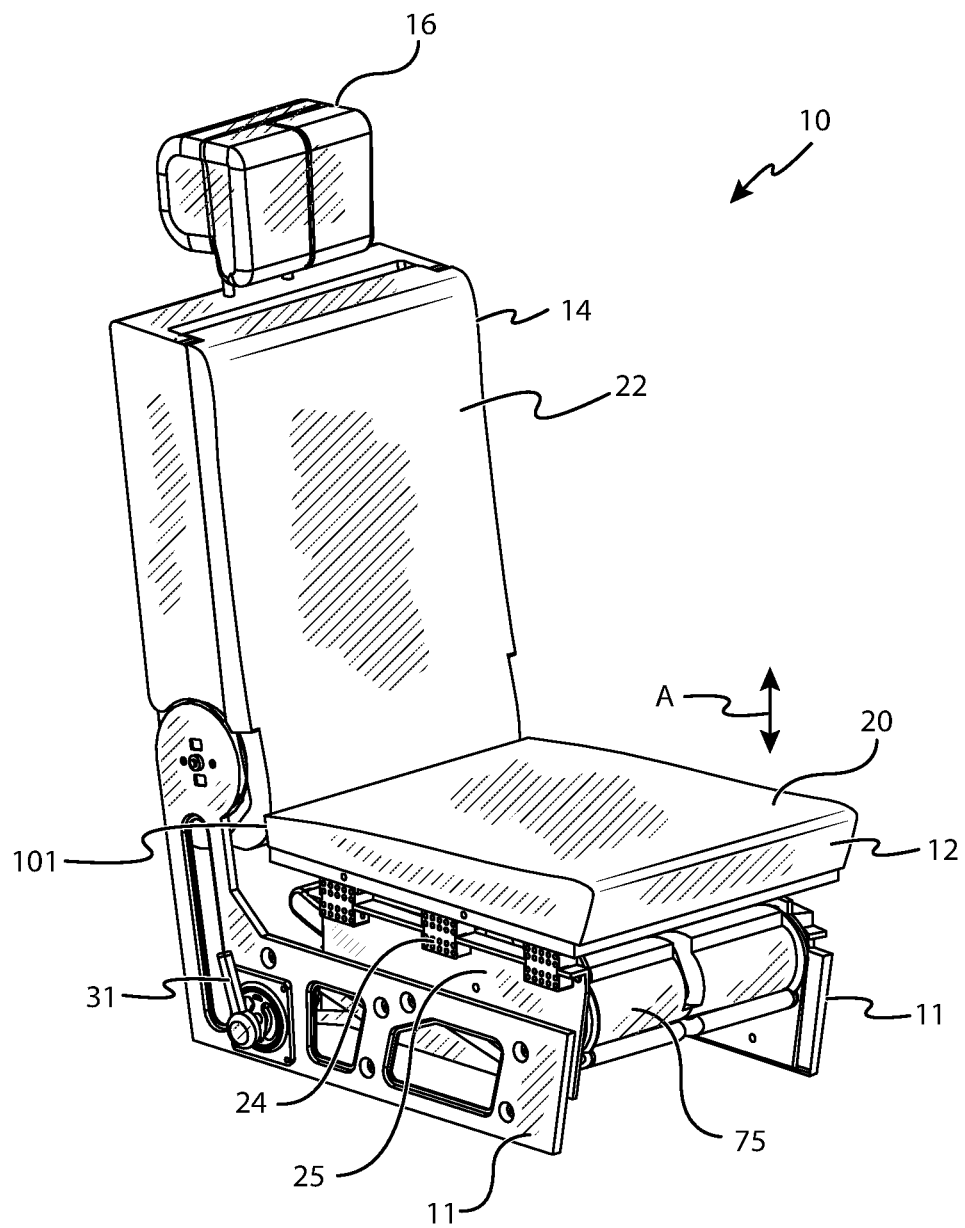
FIG. 7 is a front perspective view of the vehicular seating assembly of FIG. 2 including a seat at a raised altitude.

Turning to FIG. 7, the seating assembly 10 may further include an undercarriage defined by a frame member 25 operationally configured to provide structural support for the seat member 12 during use thereof and for housing a concealable removable member such as an infant seat carrier 75 (hereafter "carrier 75") described more below. In addition, the frame member 25 may include one or more force dampeners 24 disposed along the upper edge of one or both sides of the frame member 25. In one aspect, the one or more force dampeners 24 are operationally configured to assist with the load absorption of the seat member 12 during use, e.g., when a vehicle travels over bumps, holes, and the like, along a road or other travel surface. Without limiting the invention, suitable force dampeners 24 may be constructed from one or more resilient materials including, but not necessarily limited to plastics, rubbers, layered textiles, and combinations thereof. As shown, the one or more force dampeners 24 may include a plurality of holes there through to assist in force absorbing properties of the dampeners 24.

Suitably, the frame member 25 lies in mechanical communication with the chassis 11 via a lift system operationally configured to raise and lower (see Directional Arrow A) the frame member 25 and the seat member 12 attached thereto between (1) the first elevation of the first seat surface 20 as shown in FIG. 2 and (2) a second higher elevation of the first seat surface 20 as shown in FIG. 7—the second elevation being suitable for use in a manner similar as a booster seat as discussed in reference to FIG. 1 or, in the alternative, for use by shorter adult passengers, e.g., persons wishing to sit at a higher viewing elevation. As FIG. 7 depicts, at a second higher elevation the rear edge of the first seat surface 20 lies in abutment with the bottom portion of the first back surface 22 of the backrest member 14 (see Contact Position 101). As such, when the seat member 12 is directed from the first elevation of FIG. 2 to the second elevation of FIG. 7, the seat member 12 is directed both forward and upward allowing the rear edge of the seat member 12 to clear the bottommost part of the backrest member 14. Similar as discussed above, in another embodiment the rear edge of the seat member 12 may only partially contact, or not contact, the bottom portion of the first back surface 22. Although the seating assembly 10 of this application may be built to scale, in one particular embodiment for automobile use, the difference in elevation of the first seat surface 20 of the seat member 12 from the first elevation as shown in FIG. 2 to the second elevation as shown in FIG. 7 may be up to about 10.2 cm (about 4.0 inches) in relation to the vehicle surface 5.

The mechanism implemented to raise and lower the seat member 12 may be chosen amongst several modes of operation. For example, the seat member 12 may be raised and lowered via electromechanical operation, e.g., a linear actuator receiving power via a power supply of the corresponding vehicle and/or a separate power supply such as a battery or batteries. As such, the seating assembly 10 may include electric wiring and the necessary control circuitry for electromechanical operation. In another embodiment, the seat member 12 may be raised and lowered via a spring and latch system operationally configured to bias the seat member 12 in an upward direction, the latches of the system being operationally configured to hold the seat member 12 at a plurality of fixed elevations. In still another embodiment, the chassis 11 may include stepped grooves to receive tongue type appendages extending laterally out from the frame member 25 for adjusting the position of the seat member 12. In still another embodiment, the seat member 12 may be raised and lowered via a worm gear assembly manually and/or by electromechanical operation. In yet another embodiment, the seat member 12 may lie in communication with a curved track for changing the elevation of the seat member 12 according to the position of the seat member 12 along the track. In another embodiment, a rack and pinion system may be employed for raising and lowering the seat member 12.

Figure 8:
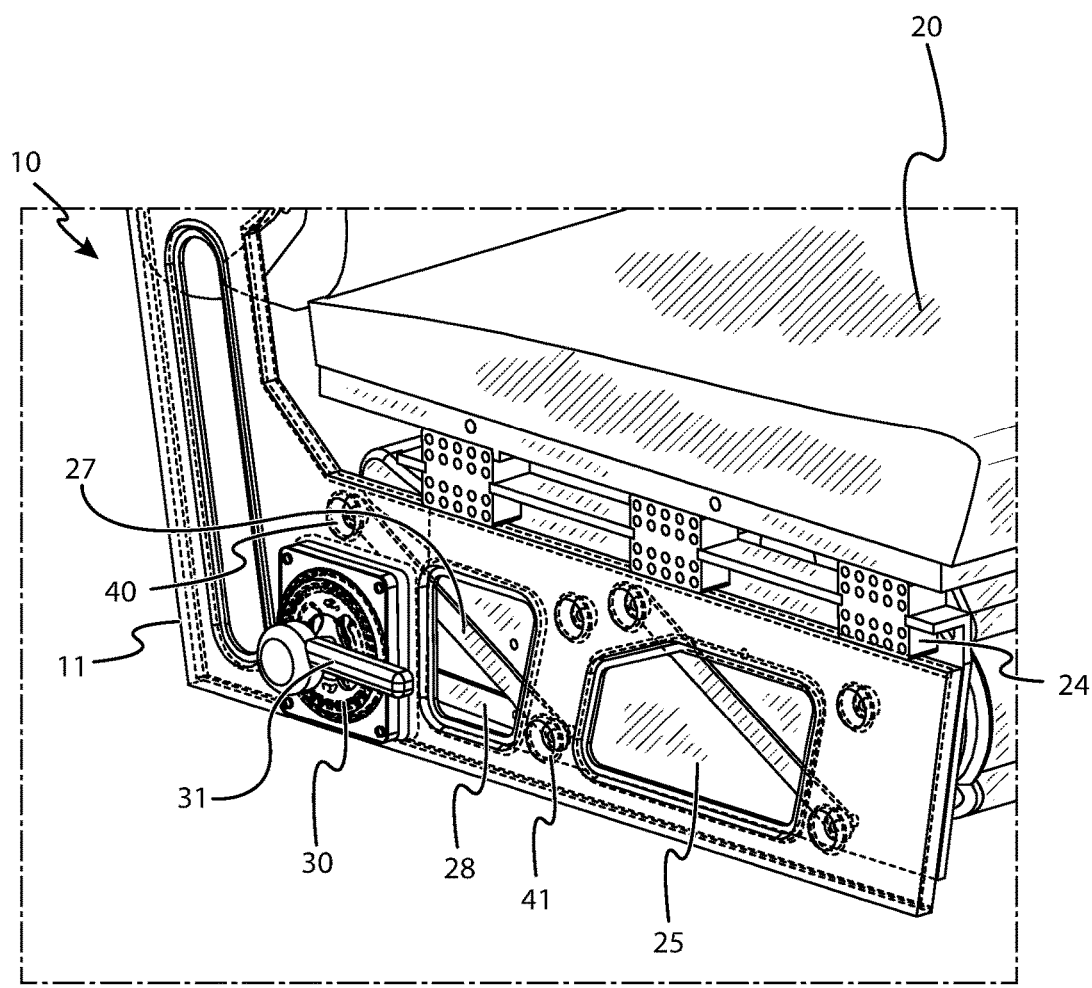
FIG. 8 is a perspective detail view of a lift system of the vehicular seating assembly of FIG. 2.
Figure 9:
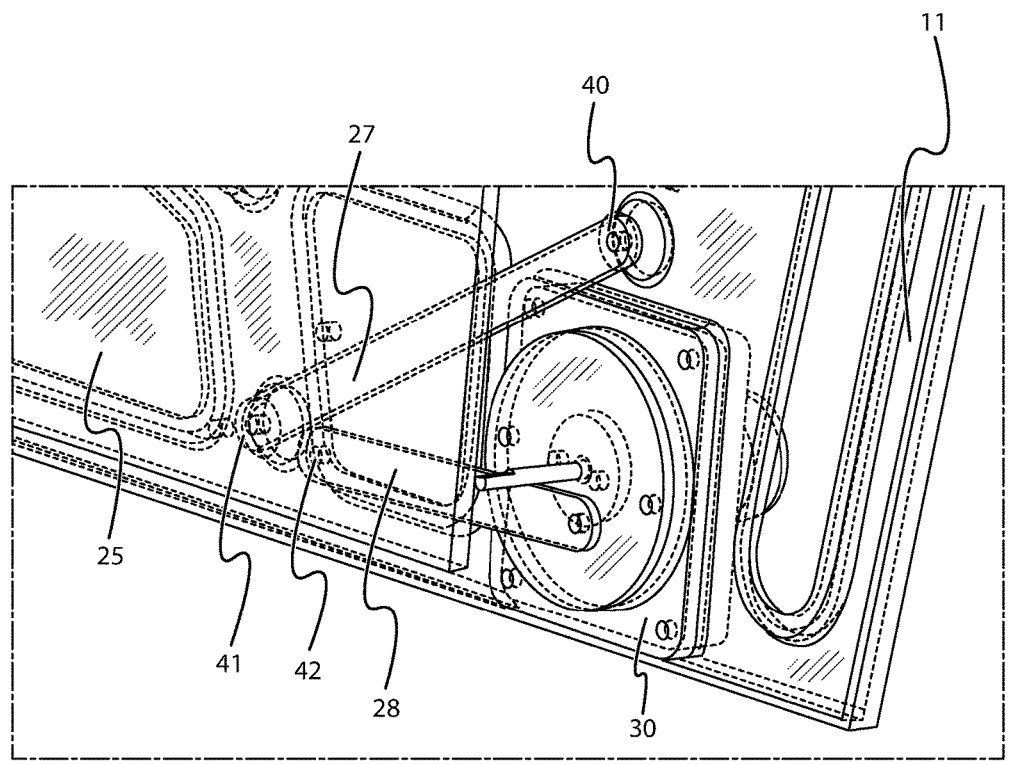
FIG. 9 is a phantom perspective detail view of part of the lift system of FIG. 8.

The present invention may also employ a lift system as shown in FIGS. 8 and 9 including a manually controllable handle 31 for manipulating the lift system to adjust the elevation of the first seat surface 20. In this embodiment, the lift system includes a combination of levers in communication with both the frame member 25 and the chassis 11 for raising and lowering the seat member 12 via a locking actuator assembly (hereafter "actuator 30") located along the outer surface of the chassis 11. As shown, the lift system may include a first elongated arm member 27 in pivotal communication with the chassis 11 at its first end at connection 40 and in pivotal communication with the frame member 25 at its second end at connection 41. The lift system may further include a second elongated arm member 28 having a first end 28A fixed to a rotor plate 44 (see FIG. 14) in rotatable communication with the actuator 30 and a second end in pivotal communication with the frame member 25 at connection 42. Suitably, the first end 28A is attached at a non-central location of the rotor plate 44 producing travel distance of the first end 28A as the rotor plate 44 is turned to assist in lifting the seat member 12 to an elevation as shown in FIG. 6. As discussed below, a handle 31 of the actuator 30 may be manipulated in a manner effective to turn the rotor plate 44 to act on the first and second elongated arm members 27, 28 to raise and lower the seat member 12 as desired.

Figure 10:
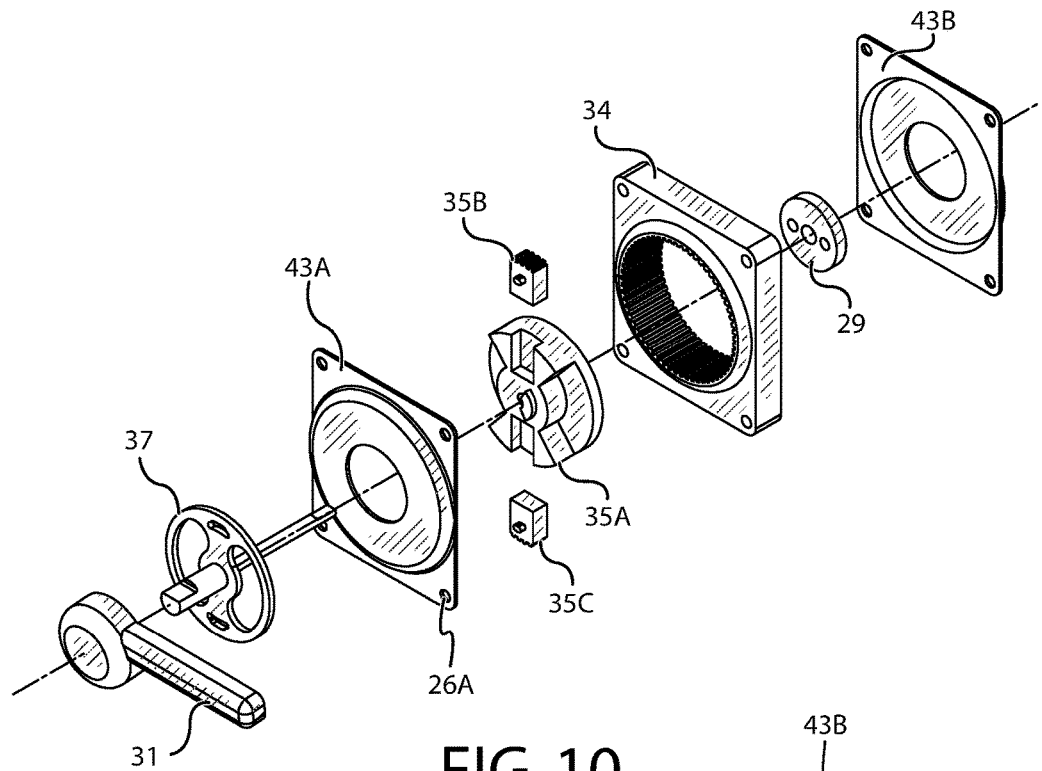
FIG. 10 is an exploded perspective view of an actuator of the lift system of FIG. 8.
Figure 11:
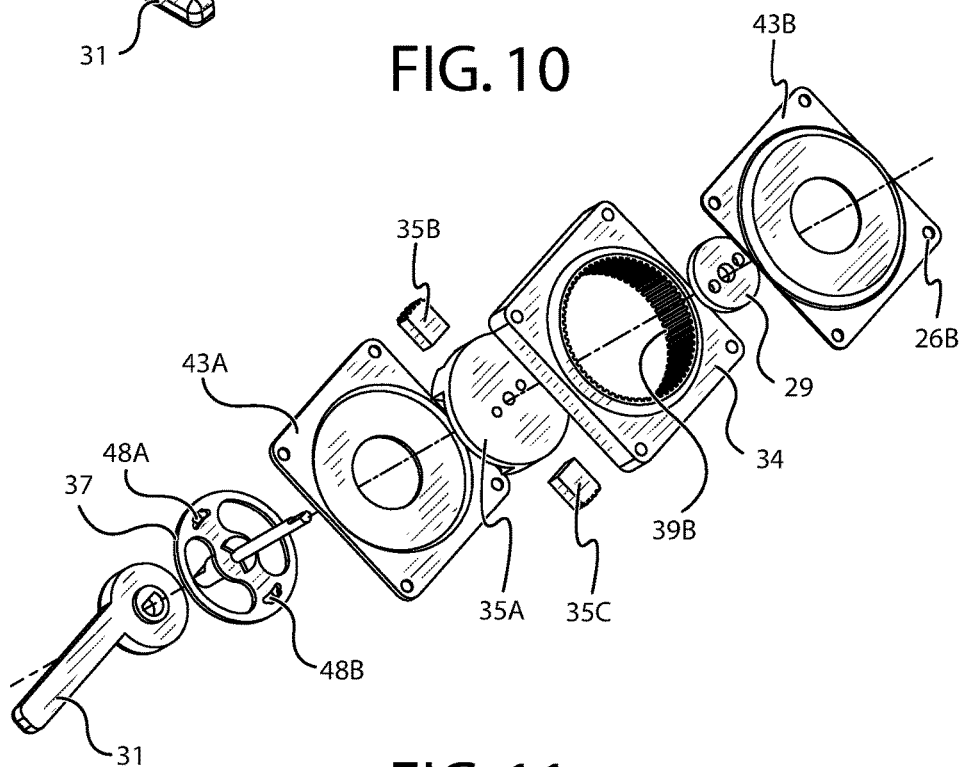
FIG. 11 is another exploded perspective view of the actuator of FIG. 10.

In one implementation, the actuator 30 of FIGS. 8 and 9 may be provided as a spring biased gear assembly including various working component parts for converting rotational force into directional movement of the seat member 12. As shown in FIGS. 10 and 11, one suitable actuator 30 may include (1) a rack member 34 providing an internal gear defined by a circular opening with teeth radially disposed along the perimeter of the opening; (2) a pinion gear assembly 35A-35C providing an external gear for working with the rack member 34; (3) a shaft assembly 37; (4) a handle 31 for acting on the shaft assembly 37; (5) a bushing 29 providing a load bearing surface and (6) plate members 43A and 43B for enclosing and holding the rack member 34 and pinion gear assembly 35A, 35B, 35C there between via one or more fasteners disposed through apertures 26A, 26B, e.g., via one or more threaded fasteners with or without and corresponding nuts.

Figure 12:
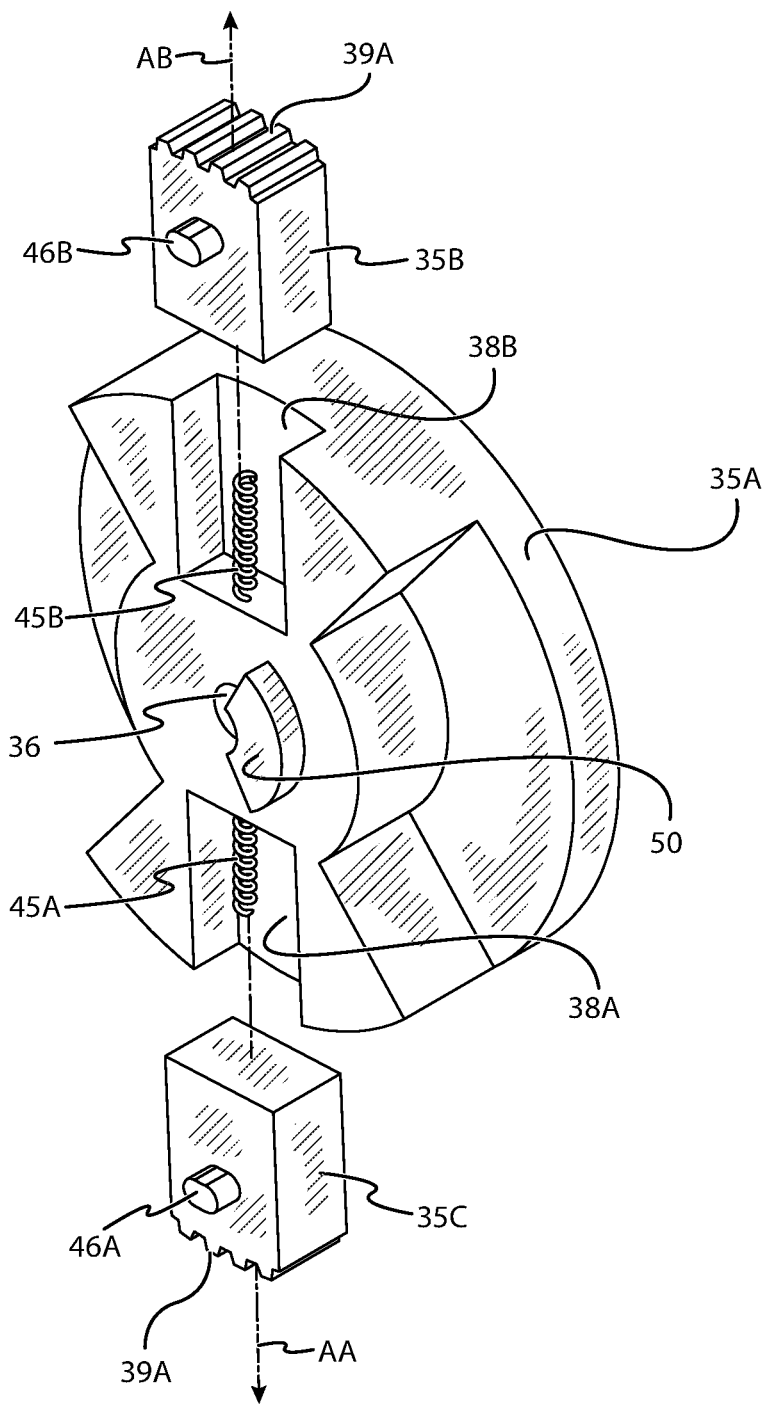
FIG. 12 is an exploded perspective view of a spring biased gear assembly of the actuator of FIG. 10.

Turning to FIG. 12, the pinion gear assembly 35A-35C includes (1) a main body 35A rotatable within the opening of the rack member 34 and (2) opposing biased booster members 35B and 35C including teeth 39A operationally configured to engage the teeth 39B of the rack member 34. In this embodiment, the main body 35A includes a centered aperture 36 for receiving the shaft assembly 37 there through. The main body 35A also has opposing linear grooves or cutout portions 38A, 38B corresponding in size and shape to the booster members 35B, 35C whereby the booster members 35B, 35C are radially slidable within the grooves 38A, 38B. Suitably, the booster members 35B, 35C are biased radially outward (see Directional Arrows AA and AB) via bias members 45A, 45B. Without limiting the invention, suitable bias members 45A, 45B may include helical springs, helical spring and pin combinations, spring loaded levers, and combinations thereof.

The main body 35A of this embodiment also includes an abutment member 50 disposed about part of the aperture 36. As understood by the skilled artisan, the abutment member 50 may be acted on by a corresponding abutment member for rotating the main body 35A. For example, the shaft assembly 37 may include a face plate 51 with an abutment member 53 disposed about a shaft 52 (see FIG. 13), the abutment member 53 being operationally configured to abut the abutment member 50 of the main body 35A when the shaft 52 is assembled through the aperture 36 and act on the main body 35A as the handle 31 is directed in either direction.

Figure 13:
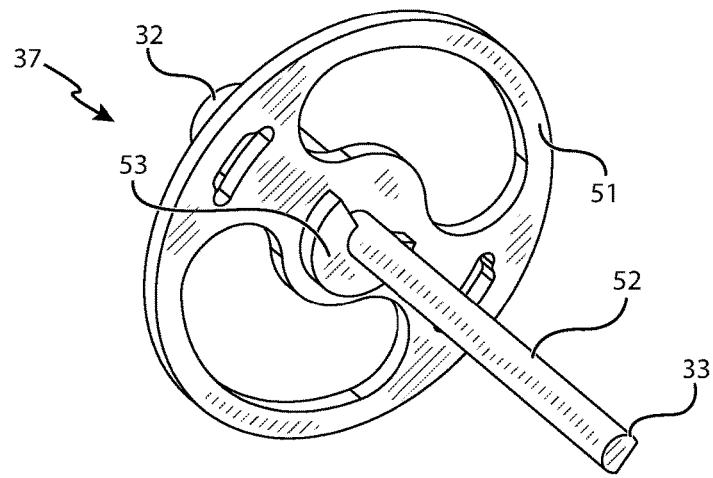
FIG. 13 is a perspective view of a shaft assembly of the actuator of FIG. 10.
Figure 14:
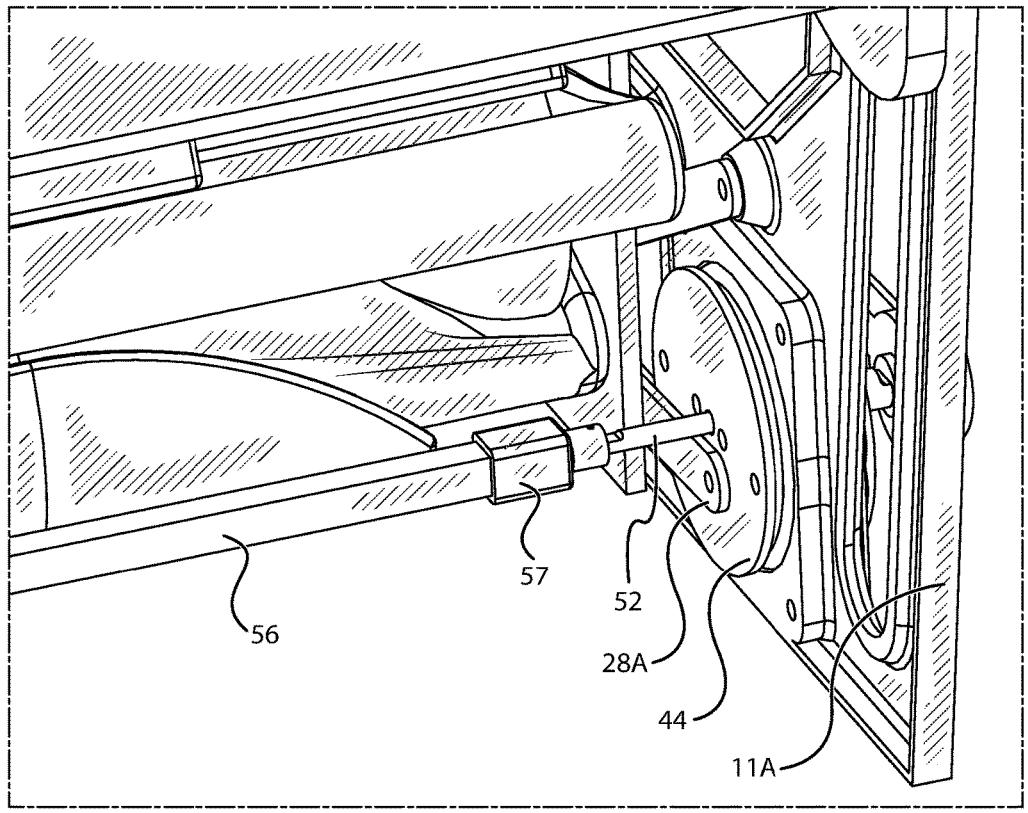
FIG. 14 is a perspective detail view of part of the lift system of FIG. 8.
Figure 15:
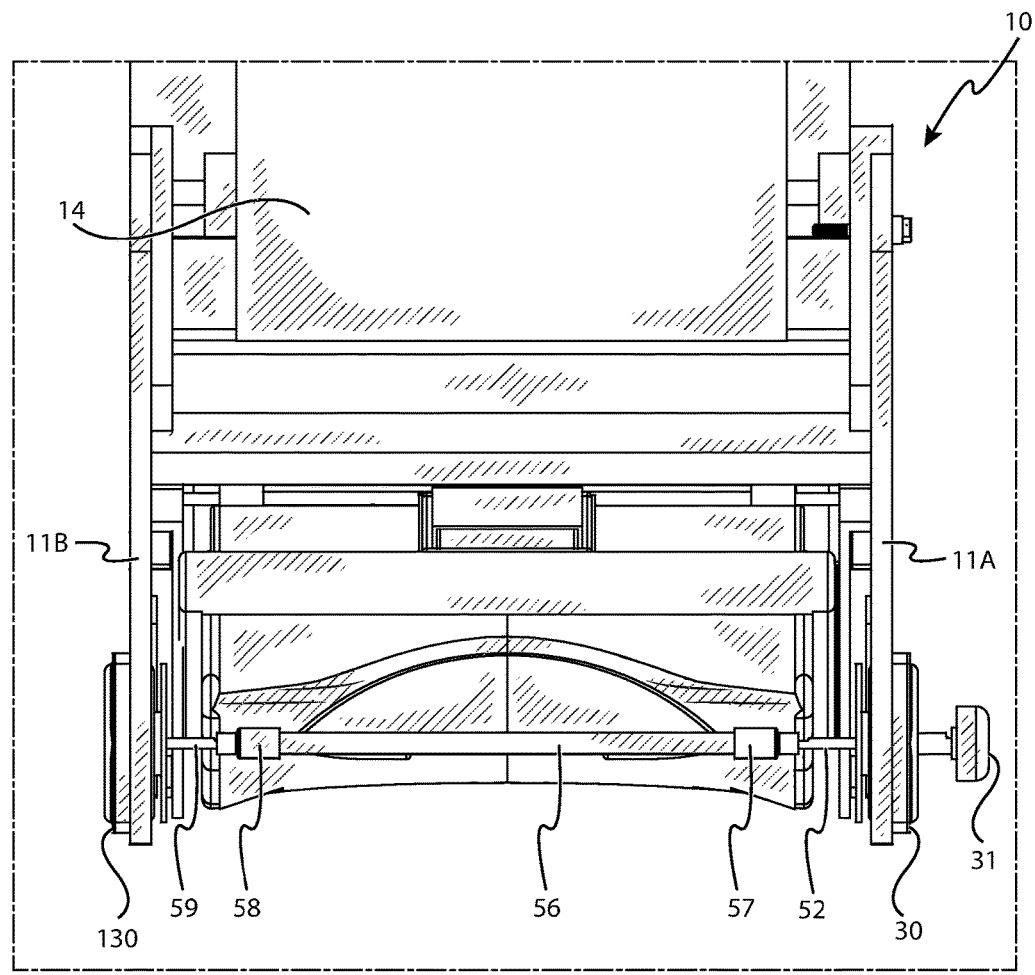
FIG. 15 is a back detail view of part of the vehicular seating assembly of FIG. 2.

With particular attention to FIGS. 13-15, the distal end 33 of the shaft assembly 37 is suitably connected to an actuation connector 56 disposed between the side sections 11A and 11B of the chassis 11. As shown in FIG. 15, the actuation connector 56 may be provided as a rod, cylinder, tube, or the like connectable to the distal end 33 of the shaft 52 at a first distal end and connectable to an opposing shaft 59 of an opposing second actuator 130 at its opposing distal end. Without limiting the mode of connection, the connector 56 may be attached to the shafts of the actuators 30, 130 directly, e.g., female ends of the connector 56, or via adapters 57, 58 as shown.

In operation, as the shaft 52 rotates the distal end 33 of the shaft 52 acts on the connector 56 thereby rotating the connector 56 in concert with the shaft 52 whereby the connector 56 is effective to act on the opposing shaft 59 of the second actuator 130 for raising and lowering the seat member 12. The first actuator 30 may be considered as handle-driven or lever-driven for operating according to the movement of the handle 31 whereas the second actuator 130 may be considered as shaft-driven or connector-drive utilizing the torque from the shaft 52 as applied to the connector 56. The incorporation of opposing lift assemblies along the side sections 11A and 11B helps to maintain the seat member 12 in a level position as the seat member 12 is raised/lowered during operation. The incorporation of opposing lift assemblies along the side sections 11A and 11B also provides greater structural support for purposes of extending operable life of the seating assembly 10 than may otherwise be provided via a lift system acting on only one side of the seat member 12.

Figure 16:
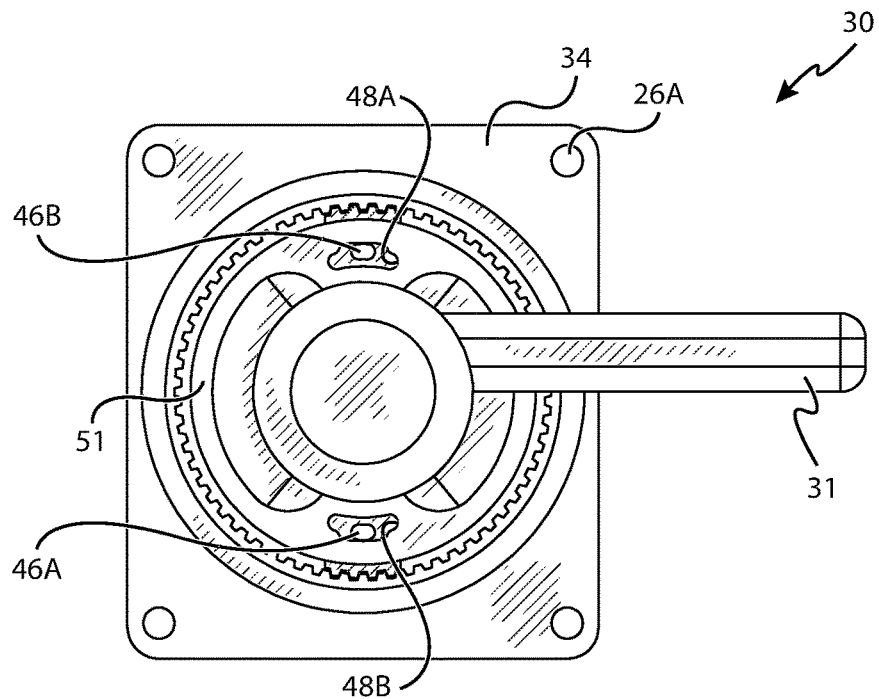
FIG. 16 is a front view of an actuator of the lift system of FIG. 8.
Figure 17:
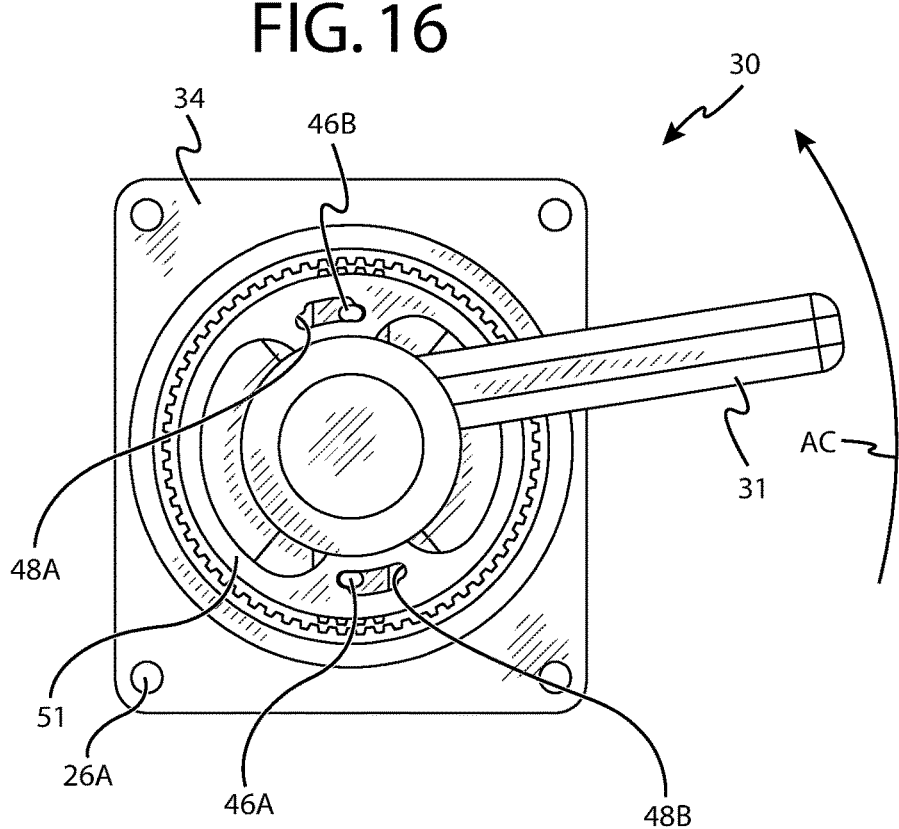
FIG. 17 is another front view of an actuator of the lift system of FIG. 8.

Basic operation of an exemplary actuator 30 is provided with reference to FIGS. 16-19. When the first seat surface 20 of a seat member 12 is set at a first elevation as depicted in FIG. 2, the handle 31 may be set in a substantially horizontal first position or first resting position as depicted in FIG. 16. As shown, the first resting position of the handle 31 may be characterized by the booster members 35B, 35C being biased in a manner effective for the teeth 39A of the booster members 35B, 35C to engage the teeth 39B of the rack member 34 thereby locking the main body 35A in a fixed position, which in turn maintains the seat member 12 in a fixed position. As further shown, the booster members 35B, 35C also include nodules 46A, 46B or raised surfaces located along the outer surfaces of the booster members 35B, 35C, the nodules being operationally configured to communicate with the inner perimeter surface of cutouts 48A, 48B of the face plate 51. In this embodiment, the cutouts 48A, 48B have a butterfly type shape allowing the nodules 46A, 46B to slide from a central position along the perimeter of the cutouts 48A, 48B in both X and Y directions, i.e., toward the edge of the cutouts 48A, 48B, in a manner effective to dictate linear movement of the booster members 35B, 35C between (1) an engagement position with the teeth 39B as shown in FIG. 16 and (2) a non-engagement position as shown in FIG. 17 and as further discussed below. For purposes of this application, the actual shape of the cutouts 48A, 48B may vary from the shape illustrated in the Figures and still provide for the desired linear movement of the booster members 35B, 35C within the grooves 38A, 38B.

In a first resting position as shown in FIG. 16, the nodules 46A, 46B are shown as being centrally located along the cutouts 48A, 48B in a manner effective for the teeth 39A of the booster members 35B, 35C to mate with the teeth 39B of the rack member 34 for gear type operation. From the perspective of FIG. 17, as the handle 31 is directed upward (see Directional Arrow AC) the shaft assembly 37 rotates counterclockwise whereby the shape of the cutouts 48A, 48B force the nodules 46A, 46B radially inward toward the shaft 52 disengaging the teeth 39A, 39B. In one suitable embodiment, directional movement of the handle 31 of only about five (5.0) degrees from the first resting position is required to disengage the teeth 39A, 39B according to the shape of the cutouts 48A, 48B. An alternate shape of the cutouts 48A, 48B may change the number of degrees for handle 31 activation of the actuator 30. Once the teeth 39A, 39B are disengaged, the main body 35A may be freely rotated counterclockwise within the rack member 34 until the handle 31 reaches a second resting position for fixing the first seat surface 20 of a seat member 12 at a second higher elevation as shown in FIG. 7. In operation, the abutment member 53 suitably applies force against the abutment member 50 providing rotation of the main body 35A.

Figure 18:
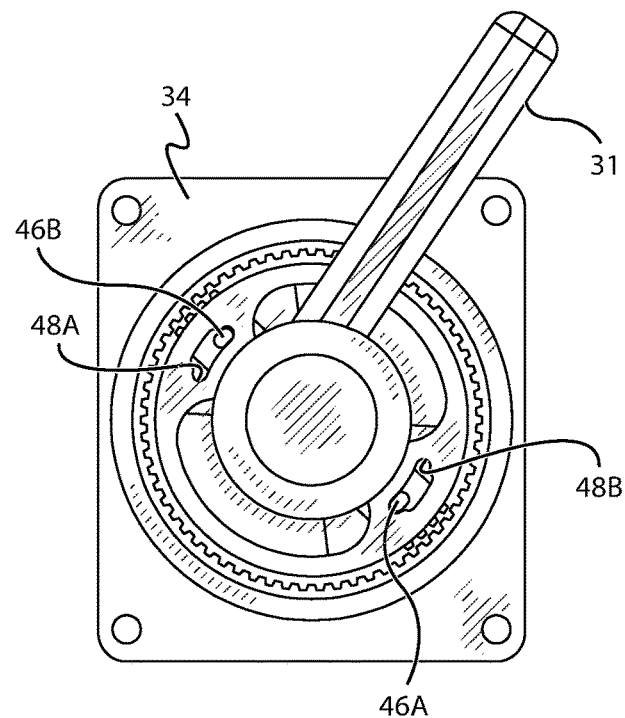
FIG. 18 is another front view of an actuator of the lift system of FIG. 8.
Figure 19:
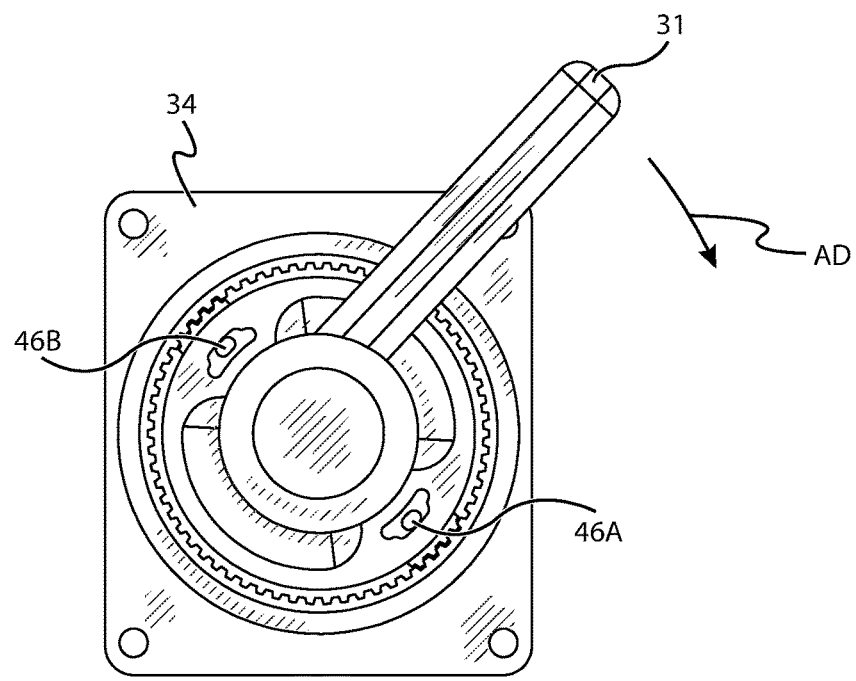
FIG. 19 is another front view of an actuator of the lift system of FIG. 8.

With reference to FIG. 18, once the handle 31 is directed to a second resting position a user may release the handle 31 in a manner effective for the biased booster members 35B, 35C to be directed radially outward via the bias members 45A, 45B directing the teeth 39A into an engagement position with teeth 39B as the nodules 46A, 46B are directed back to a centered position as shown in FIG. 19, thereby fixing the actuator 30 and the seat member 12 in a locked position. Depending on the configuration of the actuator 30, the position of the handle 31 may be substantially vertical as shown in FIG. 7 or at a position less than vertical as shown in FIG. 19.

Herein, the handle 31 may be referred to as being double actuated, meaning that both pulling and pushing of the handle 31 (see Directional Arrows AC and AD) may disengage the teeth 39A, 39B allowing the shaft 52 and main body 35A to turn clockwise and counterclockwise as desired. As such, to direct the first seat surface 20 from a second resting position back to a first resting position the handle 31 may be directed downward (see Directional Arrow AD) to disengage teeth 39A, 39B allowing the main body 35A to be turned clockwise back to the first resting position as shown in FIG. 16. As understood by the skilled artisan, rotation of the shaft 52 acts on the connector 56, which in turn acts on the second actuator 130 resulting in similar cooperative action of the second actuator 130 for supporting the opposing side of the seat member 12.

Figure 20:
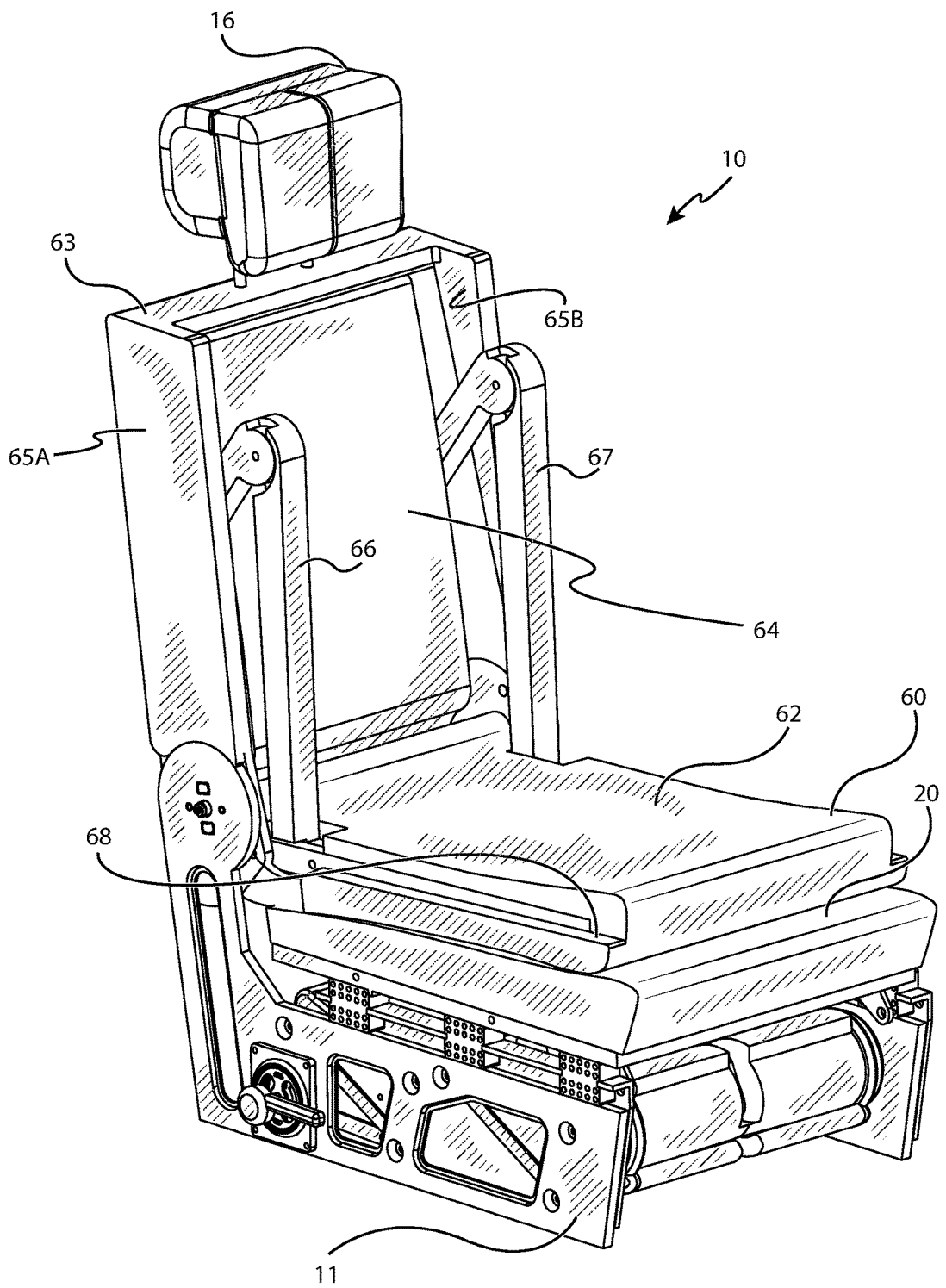
FIG. 20 is a front perspective view of the vehicular seating assembly of FIG. 2 with part of the backrest member positioned to form a sitting surface.
Figure 21:
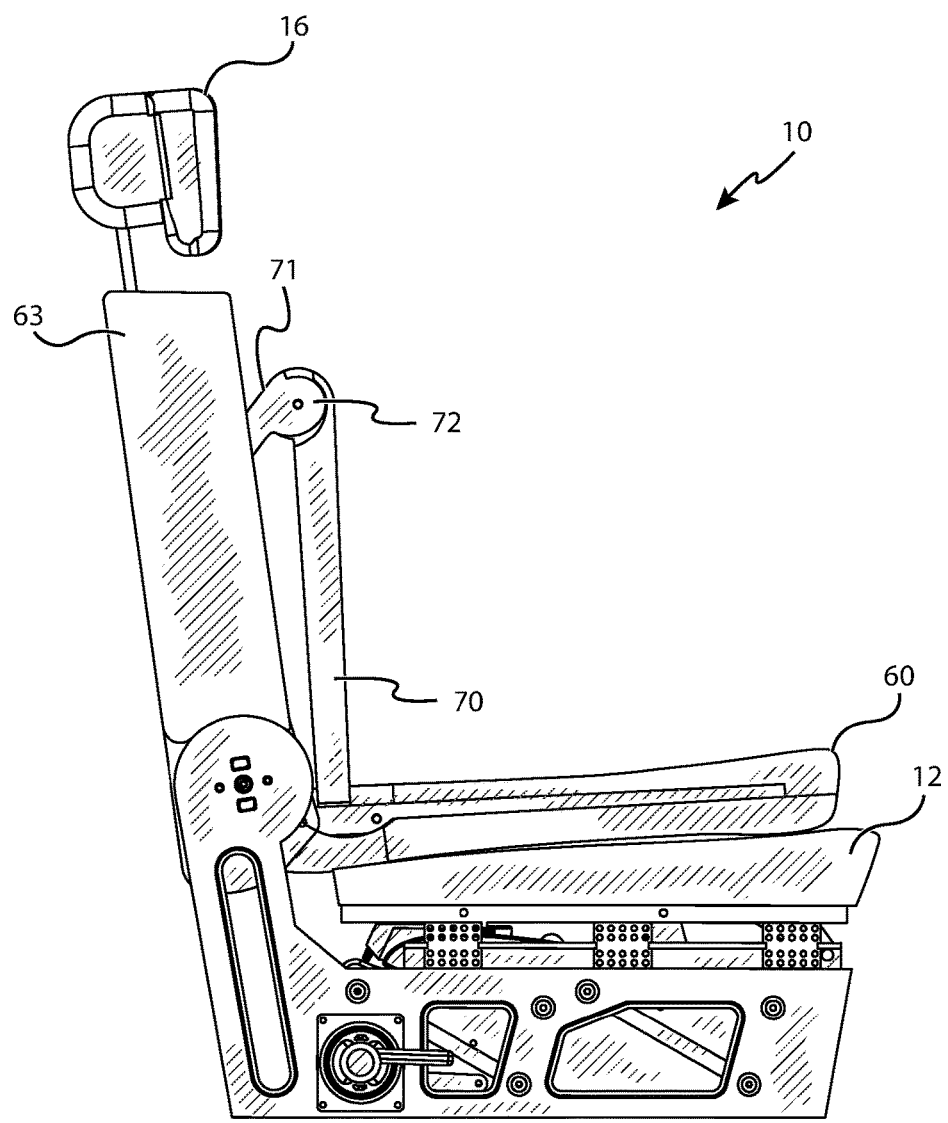
FIG. 21 is an elevated side view of the vehicular seating assembly of FIG. 20.

One simplified third forward sitting configuration of the seating assembly 10, including a second seat surface at a third elevation and a second backrest surface, is shown in FIGS. 20 and 21. As shown, the backrest member 14 may be provided as a multi-part assembly including a first backrest member or primary backing member 60 defining the first back surface 22, the primary backing member 60 being operationally configured to be directed downward from an upright position to a substantially horizontal position or fold down position in substantial abutment with the first seat surface 20 of the seat member 12 in a manner effective to provide a second seat surface as shown. In particular, when the primary backing member 60 is directed to a fold down position as shown, a rear surface of the primary backing member 60 and a second back surface of an upright backing member 63 are exposed to form a second seat surface 62 and second back surface 64 of the seating assembly 10, the sitting surface provided being different from the sitting surfaces as depicted in FIGS. 2 and 7. As shown, the second seat surface 62 provides a third elevation of the seating assembly 10 when the handle 31 is at a first resting position and the exposed second back surface 64 defines a backrest portion at a depth within the backrest member 14 thereby providing side walls 65A and 65B. As understood by the skilled artisan, when the handle 31 is directed to a second resting position as described above the elevation of the second seat surface 62 will be different than its elevation as illustrated in FIG. 20.

Still referring to FIGS. 20 and 21, the backrest member 14 suitably includes opposing side guard members 66 and 67 exposed when the primary backing member 60 is directed to a fold down position, the side guard members 66 and 67 being operationally configured to protect a passenger in the seat assembly 10 against side impacts, projectiles, unwanted lateral passenger movement, and combinations thereof. As such, the side guard members 66 and 67 are suitably constructed from one or more materials effective to maintain their shape under load. Suitable side guard member materials of construction may include, but are not necessarily limited to metals, polymeric materials, and combinations thereof. Suitable metals include, but are not limited to anodized aluminum, aluminum, steel, stainless steel, titanium, magnesium, brass, their respective alloys, and combinations thereof. Suitable polymeric materials include resilient polymeric materials such as polyurethane, polystyrene, rubber, and combinations thereof.

Figure 22:
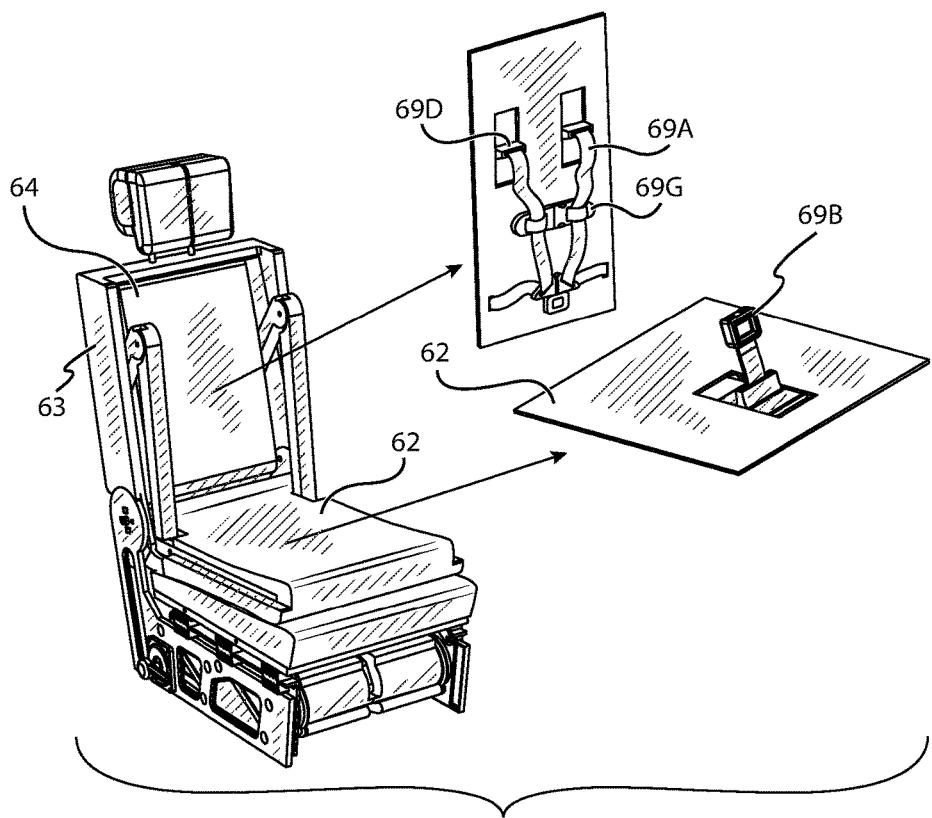
FIG. 22 is a front perspective view of the vehicular seating assembly of FIG. 20 detailing a safety harness system.
Figure 23:
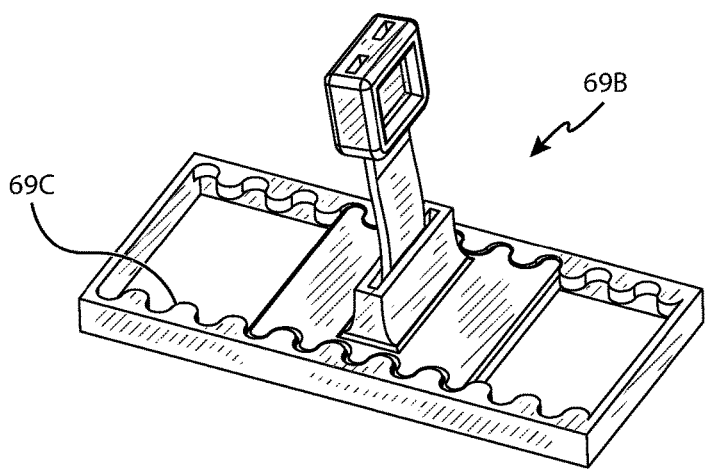
FIG. 23 is a perspective view of a buckle portion of the safety harness system of FIG. 22.

Referring now to FIG. 22, the seating assembly 10 may comprise a harness system including, but not necessarily limited to a five-point seat belt harness such as harness assembly 69A in operable communication with the second back surface 64 and a buckle assembly 69B attached to the rear surface 62. As shown in FIG. 23, in one embodiment the buckle assembly 69B may be operationally configured to provide both rearward and forward adjustment of the harness assembly 69A along the rear surface 62 by adjusting the buckle assembly 69B according to the alignment of the plurality of adjustment notches 69C as shown. In another embodiment, the buckle assembly 69B may be attached to the rear surface 62, or to internal material(s) and/or component(s) of primary backing member 60, at a single fixed position.

In one embodiment, the upper parts of the harness assembly 69A may be set at a fixed position along the second back surface 64 suitably above the shoulders of intended passenger(s). In another embodiment, the location of the upper parts of the harness assembly 69A may be adjustable along the second back surface 64 via an assembly 69D for receiving part of the harness assembly there through allowing for adjustment in a manner similar as the buckle assembly 69B according to the height or location of a particular passenger's shoulders in relation to the second back surface 64.

Figure 24:
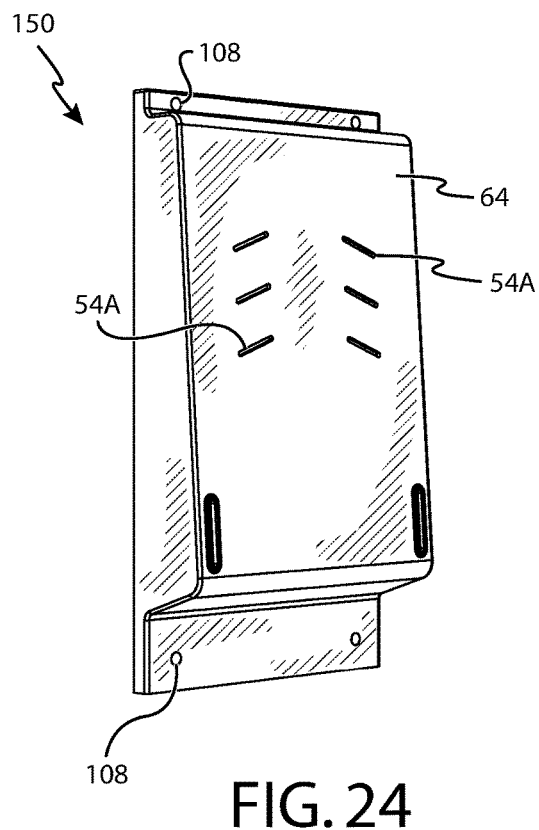
FIG. 24 is a perspective view of an embodiment of a second back surface of a backrest member.

With reference to FIG. 24, the second back surface 64 may be provided as part of one or more interchangeable removable components or members, hereafter referred to as a "second back surface member 150," that is releasably attachable to the upright backing member 63. For example, the second back surface member 150 may include one or more apertures 108 there through for releasably attaching the second back surface member 150 to the upright backing member 63 or frame within the upright backing member 63 via one or more fasteners. In one suitable embodiment, the upright backing member 63 and/or frame located therein may include threaded female apertures (not shown) for receiving fasteners such as threaded bolts, screws, and the like in a mated position therein. As understood by persons of ordinary skill in the art, the one or more apertures 108 are located along the second back surface member 150 in a manner to align with corresponding aperture(s) of the upright backing member 63 and/or frame located therein for ease of fastener use there through.

In one embodiment, the second back surface 64 may include a plurality of elongated apertures or openings (hereafter referred to as "fixed slots 54A") disposed along the second back surface 64 in a manner effective to receive the upper parts of the harness assembly 69A there through at one or more locations according to the shoulder location of the passenger using the seating assembly 10 or as may otherwise be required by law. For example, a user may remove the second back surface member 150 and run the upper parts of the harness assembly 69A through the desired slots 54A for attachment to a harness buckle 69G (see FIG. 22).

Figure 25:
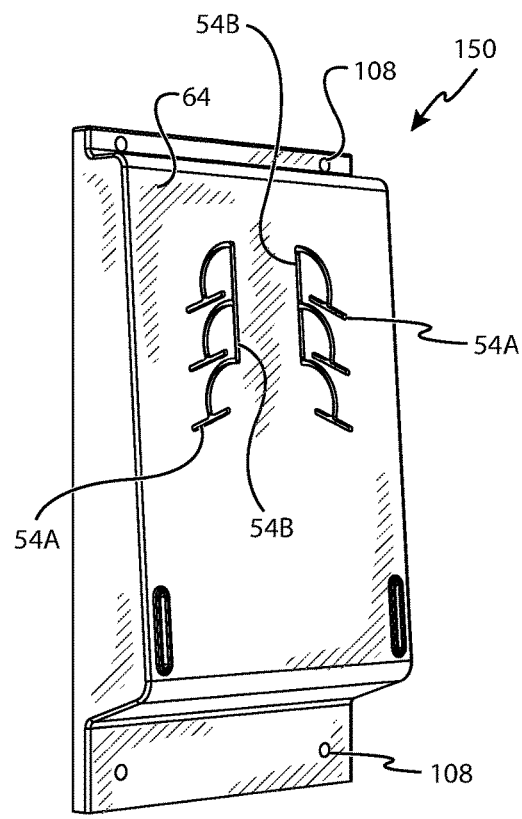
FIG. 25 is a perspective view of another embodiment of a second back surface of a backrest member.

In another embodiment as shown in FIG. 25, the second back surface member 150 may include apertures or openings in the form of a plurality of substantially horizontally aligned fixed slots 54A interconnected with open substantially vertically aligned paths, cutouts or grooves 54B through the second back surface 64 that are operationally configured to communicate the various fixed slots 54A allowing the upper parts of the harness portion 69A to slide between fixed slots 54A without having to remove the second back surface member 150. In still another embodiment as shown in FIGS. 26-28, the second back surface member 150 may include a slidable assembly for directing and holding the upper parts of the harness assembly 69A at one or more fixed locations along the second back surface 64. As shown, the second back surface 64 may include parallel type openings 47A, 47B there through, the solid section of the second back surface 64 between the openings 47A, 47B serving as a support surface for a passenger. In this embodiment, the slidable assembly includes a slide plate 49 along the inner surface of the second back surface member 150 that is moveable linearly along the length of the openings 47A, 47B. In this embodiment, slots 55 are located through the slide plate 49 as opposed to the second back surface 64 as shown in FIGS. 24 and 25. In this embodiment, the arrangement of the slots 55 and the slide plate 49 are effective to align the slots 55 with the openings 47A, 47B allowing the upper parts of the harness assembly 69A to mate with the slots 55 at a position according to the location of the slide plate 49. The slidable assembly of this embodiment may also include an actuation member in the form of a worm screw assembly operationally configured to direct the slide plate 49 linearly along the length of the openings 47A, 47B. As shown, the worm screw assembly includes a worm 97A or like object operationally configured to dictate linear movement of the slide plate 49—which may be provided as a worm plate as shown in FIGS. 27 and 28. As understood by the skilled artisan, the slide plate 49 includes grooves 131 along its proximal edge operationally configured to engage the threads of the worm 97A in a manner effective for the slide plate 49 to be directed linearly similar in action as a gear rack or the like along the length of the openings 47A, 47B as the worm 97A is turned in either direction. With reference to FIG. 27, the inner surface of the second back surface member 150 suitably includes a support member 132 slotted in a manner effective for holding the shaft of the worm 97A (hereafter "worm shaft 97B") near its distal end and near its proximal end as shown. Other shaft type supports, catches or seats known to those of ordinary skill in the art may be employed for purposes of holding the worm 97A during operation. For example, separate individual support members may be employed for holding the shaft 97B at or near each of its distal and proximal ends.

Suitably, the proximal end of the worm shaft 97B includes a pinion gear 97C operationally configured to be turned by the action of one or more corresponding gears. For example, a geared turn dial 85 or other turnable knob member may be inset along the second back surface 64, the gears of the turn dial 85 being in communication with the pinion gear 97C as shown. In operation, the turn dial 85 may be manually rotated clockwise or counter-clockwise to act on the worm 97A for moving the slide plate 49. In another embodiment, the slide plate 49 may include an appendage type ring member or other threaded aperture for mating with the worm 97A.

Figure 29:
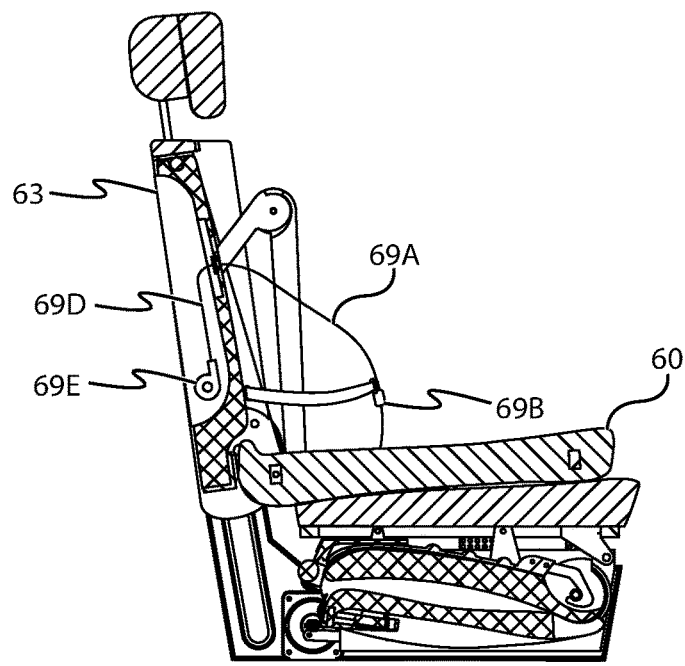
FIG. 29 is an elevated sectional side view of an embodiment of a safety harness system of FIG. 22.
Figure 30:
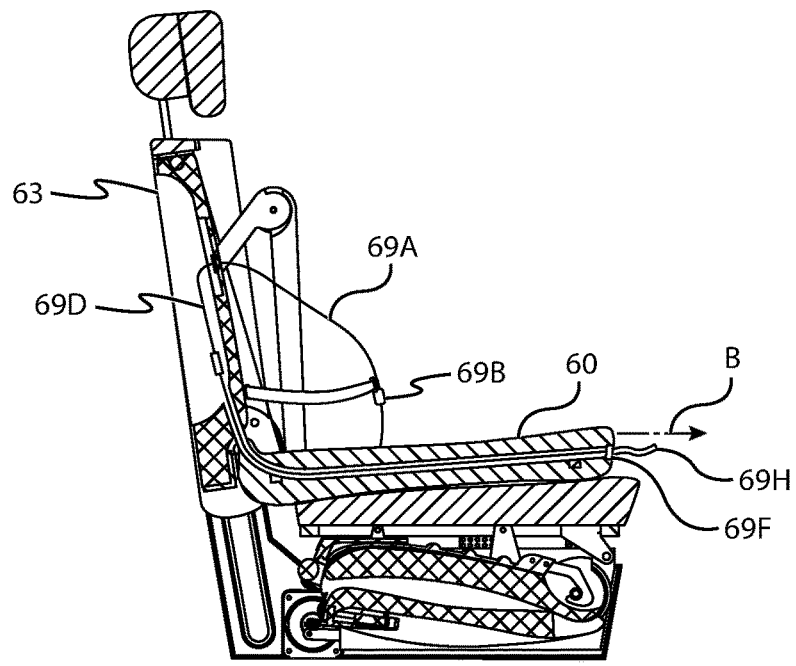
FIG. 30 is another elevated sectional side view of an embodiment of a safety harness system of FIG. 22.

In one suitable embodiment the harness assembly 69A may be attached to the second back surface 64 at a fixed length. As shown in FIG. 29, the harness assembly 69A may include a retractable assembly 69E housed within the second back surface member 150, which is operationally configured to store loose strapping or webbing 69D of the harness assembly 69A when the seating assembly 10 is in use thereby providing a snug or operable fit for a passenger without being restrictive. In still another embodiment, one or more of the strapping or webbing 69D of the harness assembly 69A may be operationally configured to run down through the second back surface member 150 into the primary backing member 60 and out through the front side of the primary backing member 60 via a mouth 69F as shown in FIG. 30, whereby a distal end 6911 of the harness assembly 69 strapping may be directed outward (see Directional Arrow B) to provide a more snug fit of the harness assembly 69A for a passenger. In one embodiment, to assist in holding the strap in a fixed position, the mouth 69F may include a releasable locking mechanism operationally configured to sandwich the strap in a fixed position. In still another embodiment, the harness assembly 69A may be adjusted via a mechanical ratchet system housed in the backrest member 14. In another embodiment, the harness assembly 69A may be adjusted via a mechanical or electro-mechanical adjustment interface set atop or near the upper edge of the backrest member 14.

Figure 31:
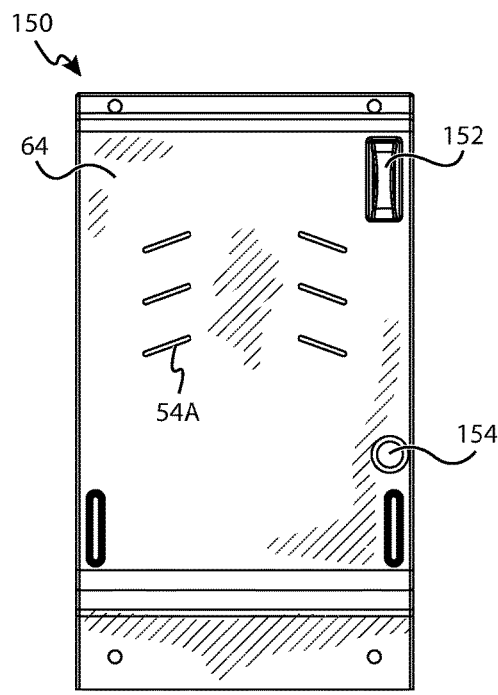
FIG. 31 is another second back surface of the present application.
Figure 32:
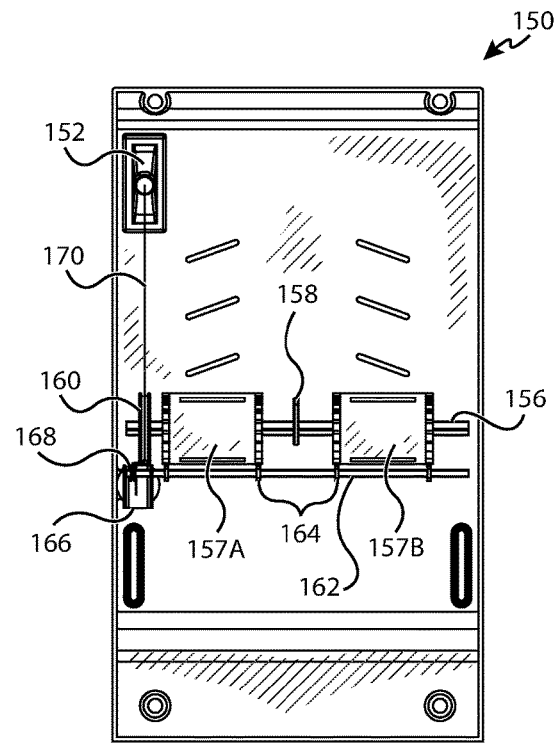
FIG. 32 is a view of the inner surface of the second back surface of FIG. 31 including an embodiment of a tensioner system.
Figure 33:
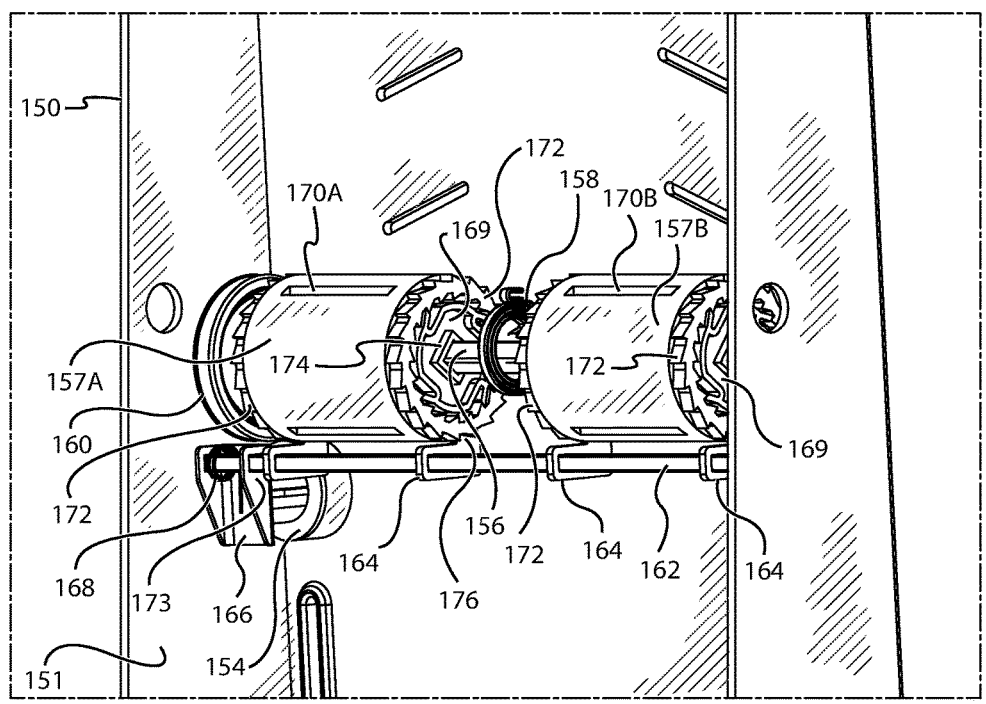
FIG. 33 is a perspective detail view of the tensioner system of FIG. 32.

Turning to the simplified illustrations of FIGS. 31-33, in one particular embodiment the second back surface member 150 may include a tensioner system operationally configured to increase and decrease the length of the harness strapping 69D extending out through the apertures of the second back surface 64. In other words, the tensioner system is operationally configured to dictate the slack or lack thereof in the strapping 69D as related to the securement of a passenger to the seating assembly 10. Suitably, the tensioner system is attached to the inner surface of the second back surface member 150 and is controlled manually via a handle 152 and a release member 154 located along the second back surface 64. In this embodiment, the tensioner assembly includes (1) a longitudinal tension rod 156, (2) tension drums 157A, 157B disposed along the tension rod 156 that corresponds to separate parts of the strapping 69D intended for use over each of a passenger's shoulders, (3) a first bias member 158 disposed about the tension rod 156 between the tension drums 157A, 157B, (4) a pulley 160 in communication with the tension rod 156, (5) a latch rod 162, (6) a plurality of latch rod pins 164 attached to the rod 162, (7) a biased lever 166 in communication with the latch rod 162 and release member 154, (8) a second bias member 168 for biasing the lever 166, (9) a plurality of ratchet plates 169 in communication with the tension rod 156, the ratchet plates 169 having angled teeth disposed along their perimeter effective to act on each of the tension drums 157A, 157B and (10) a cable member 170 in communication with the handle 152 at a proximal end and the pulley 160 at a distal end. In basic operation, the handle 152 and release member 154 act on the tensioner system to help dictate the length of the strapping 69D extending out from the second back surface 64 for securing a passenger to the seating assembly 10.

In one aspect, the tensioner system may include a retractable seat belt reel type of assembly similar as used in known commercial vehicles. For example, the tension drums 157A, 157B are suitably rotatable about a central axis of the tension rod 156 in a manner whereby the separate parts of the strapping 69D may wind and unwind upon the outer surface of the tension drums 157A, 157B. With particular attention to FIG. 33, the tension drums 157A, 157B are hollow or partially hollow members including inlets 170A and 170B for receiving the distal ends of the separate parts of the strapping 69D therein. As understood by the skilled artisan, the distal ends of the strapping 69D may be held in place within the tension drums 157A, 157B via holding pins, latches, clamps, and the like allowing for releasable attachment of the strapping 69D. In another embodiment, the distal ends of the strapping 69D may be adhered to the inner surface of the tension drums 157A, 157B via one or more adhesives. In still another embodiment, the distal ends of the strapping 69D may include metal covers or edges attached thereto that may be adhered to the tension drums 157A, 157B via welds and/or adhesives. As depicted, the tension drums 157A, 157B may be provided as cylindrical members. It is also contemplated that the tension drums 157A, 157B may include a non-cylindrical outer surface or shape, e.g., a multi-sided shape, an oval shape, to accentuate winding and unwinding of the strapping 69D as the tension drums 157A, 157B are rotated.

With further reference to FIG. 33, the opposing ends of the tension drums 157A, 157B include angled toothed ring type configurations or gears 172 operationally configured to engage the plurality of latch rod pins 164 with its outer teeth and the ratchet plates 169 with its inner teeth. As shown, the ratchet plates 169 and tension drums 157A, 157B are concentrically aligned with the elongated tension rod 156, which in this embodiment is shown as an elongated four sided member, the ratchet plates 169 having apertures there through corresponding in size and shape to the size and shape of the tension rod 156 effective for corresponding rotation of the tension rod 156 and ratchet plates 169. As illustrated, the ratchet plates 169 may include four sided apertures with reinforced side walls 174 providing structural support according to the anticipated torqueing forces applied to the ratchet plates 169 as the tension rod 156 is rotated. As shown, the ratchet plates 169 include angled teeth effective to engage the angled teeth disposed along the inner surface of the gears 172 when the pulley 160 is rotated as the handle 152 is drawn out from the second back surface 64.

In exemplary operation, the tensioner system is suitably set at a first fully retracted position wherein the strapping 69D is in a fully wound position about the tension drums 157A, 157B thereby minimizing the length of strapping 69D extending out from the second back surface 64 as the outer teeth of the gears 172 engage the latch rod pins 164 holding the tension drums 157A, 157B in a fixed position. As explained below, a desired length of the strapping 69D may be provided for passenger use by activating the release member 154 (see FIG. 31) and pulling the strapping 69D out from the second back surface 64 to a desired length. For directing the strapping 69D back to a wound position, a user may pull the handle 152 out from the second back surface 64 wherein the handle 152 acts on the cable member 170 attached thereto to rotate the pulley 160, which in turn rotates the tension rod 156 communicated with the pulley 160. Rotation of the tension rod 156 directs the teeth of the ratchet plates 169 to an engagement position with the inner teeth of the gears 172. Once engaged, the tension drums 157A, 157B may rotate according to rotation of the pulley 160 allowing a desired length of strapping 69D to be drawn in from the second back surface 64. In suitable operation for infants and children passengers, the handle 152 and strapping 69D need only be drawn out from the second back surface 64 up to about 7.62 cm (3.0 inches).

During use, a user may activate or press the release member 154, shown in FIG. 31 as a push button, to disengage the latch rod pins 164 from the outer teeth of the gears 172 in order to unwind the strapping 69D as desired. As the release member 154 is directed inward the release member 154 contacts and directs the lever 166 directionally apart from the inner surface of the second back surface member 150. As shown in FIG. 33, the lever 166 may include apertures 173 for receiving the latch rod 162 there through. In this embodiment, the apertures 173 are rectangular and sized to correspond with a four sided latch rod 162 in a substantially flush orientation minimizing any undesired movement or rotation of the latch rod 162 within the aperture 173. In another embodiment, the latch rod 162 may be adhered to the surface of the lever 166. In another embodiment the latch rod 162 and lever 166 may be provided as a one piece construction—including the opportunity to locate the second bias member 168 along the latch rod 162 apart from the lever 166 if desired.

With further reference to FIG. 33, the latch rod pins 164 are disposed along the latch rod 162 in substantial alignment with the gears 172 on opposing ends of the tension drums 157A, 157B. As such, as the lever 166 moves the latch rod 162 too moves in like direction. Therefore, as the release member 154 is directed inward each of the latch rod pins 164 disengage the outer teeth of the gears 172. As understood by the skilled artisan, the latch rod pins 164 and ratchet plates 169 operate in a manner similar as a tooth engaging portion of a release pawl. Once the latch rod pins 164 disengage the outer teeth of the gears 172, the tension rod 156 may be rotated according to pulling of the handle 152 and/or according to the first bias member 158 for purposes of winding the strapping or for purposes of adjusting the amount of slack of the strapping 69D. For example, the handle 152 may be manipulated back and forth to adjust the slack in the strapping 69D as a user pulls the strapping 69D out from the second back surface thereby unwinding the strapping from the tension drums 157A, 157B.

For rotational operation, the ends of the tension rod 156 and latch rod 162 are suitably rotatably communicated with the inner surface 151 of the second back surface member 150 whereby the longitudinal axes of the tension rod 156 and latch rod 162 are suitably aligned in a substantially horizontal parallel orientation. Suitably, the first bias member 158, shown in this embodiment as a radial spring, may be located about the tension rod 156 at a point between the tension drums 157A, 157B. As stated, the radial spring 158 is effective to bias the tension rod 156 and tension drums 157A, 157B to an engagement position with the latch rod pins 164.

Without limiting the configuration of the latch rod pins 164 to any one particular embodiment, in this embodiment the latch rod pins 164 include lips 176 or other raised surfaces extending out from the remaining latch rod pins 164 in a manner effective to catch and hold the outer teeth of the gears 172 to prohibit the biased tension rod 156 from undesired rotation when the release member 154 is not activated.

Figure 34:
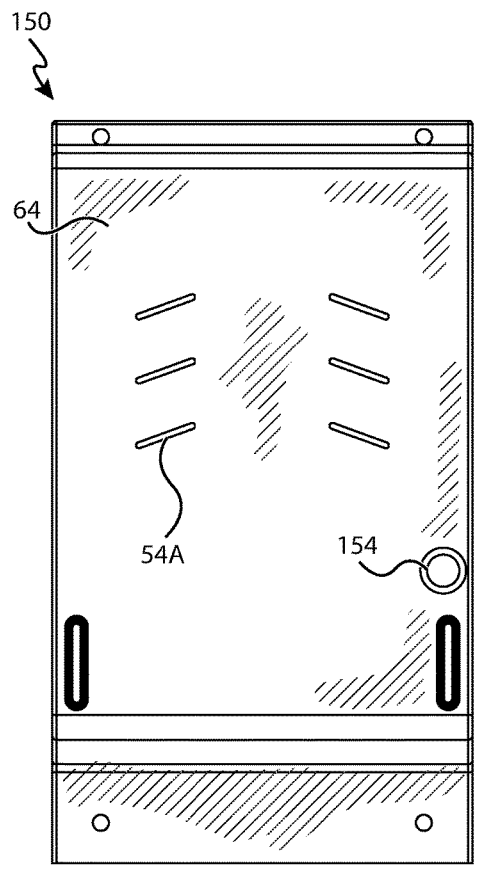
FIG. 34 another second back surface of the present application.
Figure 35:
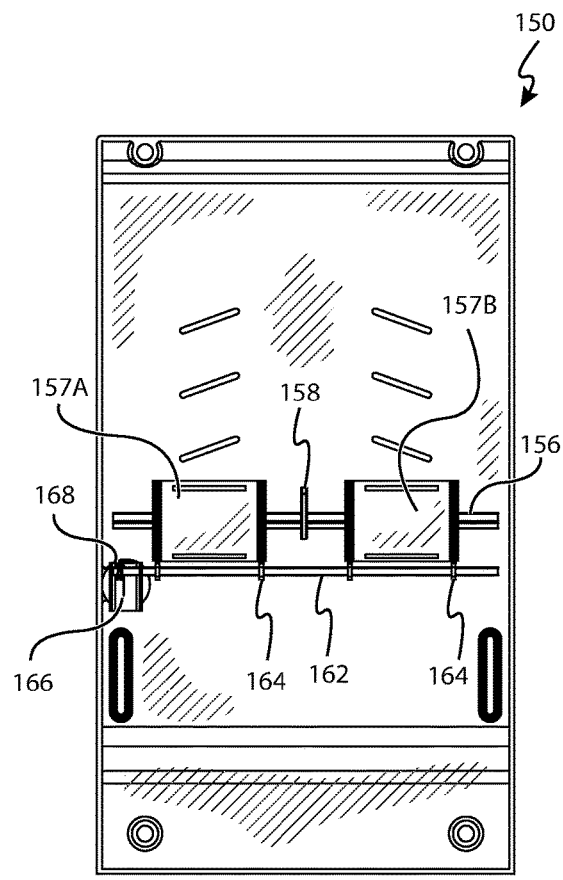
FIG. 35 is a view of the inner surface of the second back surface of FIG. 34 including an embodiment of a tensioner system.
Figure 36:
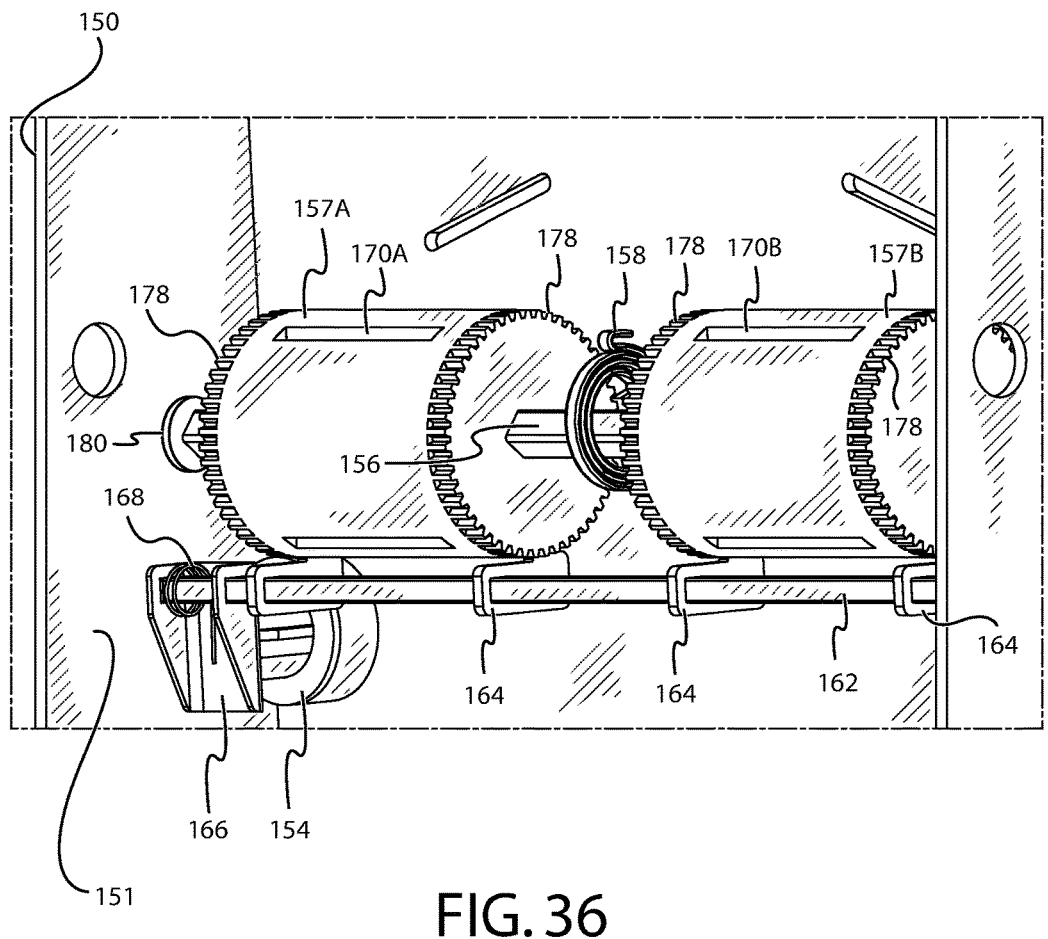
FIG. 36 is a perspective detail view of the tensioner system of FIG. 35.

Turning to FIGS. 34-36, in another embodiment a release member 154 and strapping 69D alone may be provided for adjusting the length of the usable strapping 69D by activating the release member 154 and pulling the strapping 69D out from the second back surface 64 by unwinding the strapping 69D from the tension drums 157A, 157B. With particular attention to FIG. 36, the tension drums 157A, 157B in this embodiment include cylindrical members with a plurality of uniform grooves 178 or teeth disposed along the perimeters of the opposing ends of the tension drums 157A, 157B. Similar as described above, until the release member 154 is activated, i.e., directed or pushed inward, the latch rod pins 164 are operationally configured to engage the grooves 178 via the force applied to the tension rod 156 by the first bias member 158 and via the force applied to the lever 166 via the second bias member 168. As stated above, the tension rod 156 and latch rod 162 are rotatably communicated with the inner surface 151 of the second back surface member 150 whereby the longitudinal axes of the tension rod 156 and latch rod 162 are suitably aligned in a substantially horizontal parallel orientation. In both examples of the tensioner assembly, the tension rod 156 and latch rod 162 are provided as four sided members. As such, the inner surface 151 is suitably operationally configured to receive the opposing ends of the tension rod 156 and the latch rod 162 in rotatable attachment thereto. As shown in FIG. 36, the inner surface 151 may include rotating hubs 180 rotatably attached thereto for mating with the ends of the tension rod 156 and latch rod 162. In one embodiment, the rotating hubs 180 may include raised nipples for receiving female type ends of the tension rod 156 and latch rod 162. In another embodiment, the rotating hubs 180 may include apertures for receiving male ends of the tension rod 156 and latch rod 162 therein.

In operation, an adult or other operator may activate the release member 154 thereby rotating the lever 166 and latch rod 162 attached thereto thereby disengaging the latch rod pins 164 apart from the grooves 178 of the tension drums 157A, 157B. As the release member 154 is activated, an operator may grab the strapping 69D and pull the strapping 69D out from the second back surface 64 to a desired length. Thereafter, an operator may release the release member 154 directing the lever 166 back to a resting state as shown in FIG. 36 via the bias force of the second bias member 168 allowing the grooves 178 to engage the latch rod pins 164 via the first bias member 158 acting on the tension rod 156. Once a passenger is secured in the seating assembly 10, an operator may again press the release member 154 allowing the tension drums 157A, 157B to further wind directionally according to the bias force of the first bias member 158 in a manner effective to remove any slack in the strapping 69D that may be present. Once the strapping 69D is set to a desired length out from the second back surface 64 for passenger use, an operator may release the release member 154 reengaging the grooves 178 with the latch rod pins 164.

Referring again to FIG. 20, the backing member 60 suitably includes cutout portions 68, depressions, or the like, along the length of its opposing sides providing a mating surface for the corresponding side walls 65A and 65B when the backing member 60 is set to an upright position as shown in FIG. 2. In this embodiment, the cutout portions 68 may be defined by right angle forming surfaces disposed along opposing sides of the backing member 60 corresponding to the rectangular shape of the side walls 65A and 65B. The shape of the cutout portions 68 may vary as desired, for example, the cutout portions 68 may correspond in size and shape to side walls 65A and 65B of a particular size and shape, e.g., (1) cutout portions 68 having curved surfaces for abutment with curved side walls 65A and 65B, (2) cutout portions 68 having angled surfaces greater or less than about 90.0 degrees.

Figure 37:
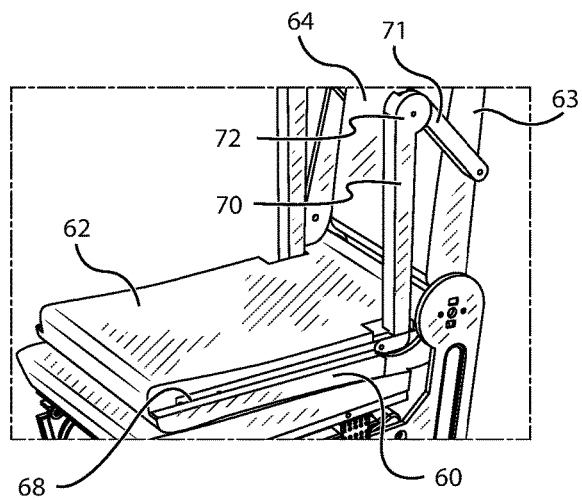
FIG. 37 is a perspective detail view of the vehicular seating assembly highlighting the exposed side guard member where the backrest member is in a fold-out position.
Figure 38:
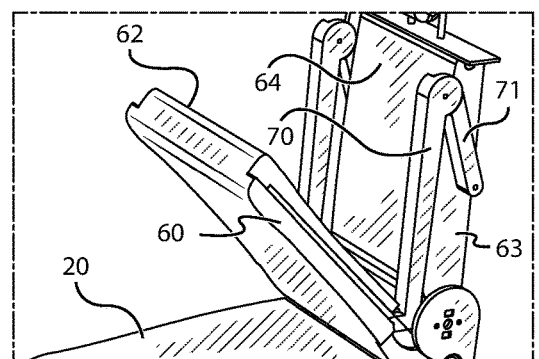
FIG. 38 is another perspective detail view of the vehicular seating assembly highlighting the exposed side guard member wherein the backrest member is in a partially raised position.
Figure 39:
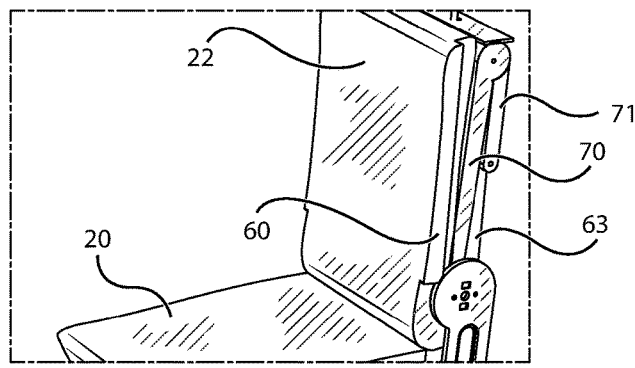
FIG. 39 is another perspective detail view of the vehicular seating assembly highlighting the exposed side guard member wherein the backrest member is in a fully raised position.
Figure 66:
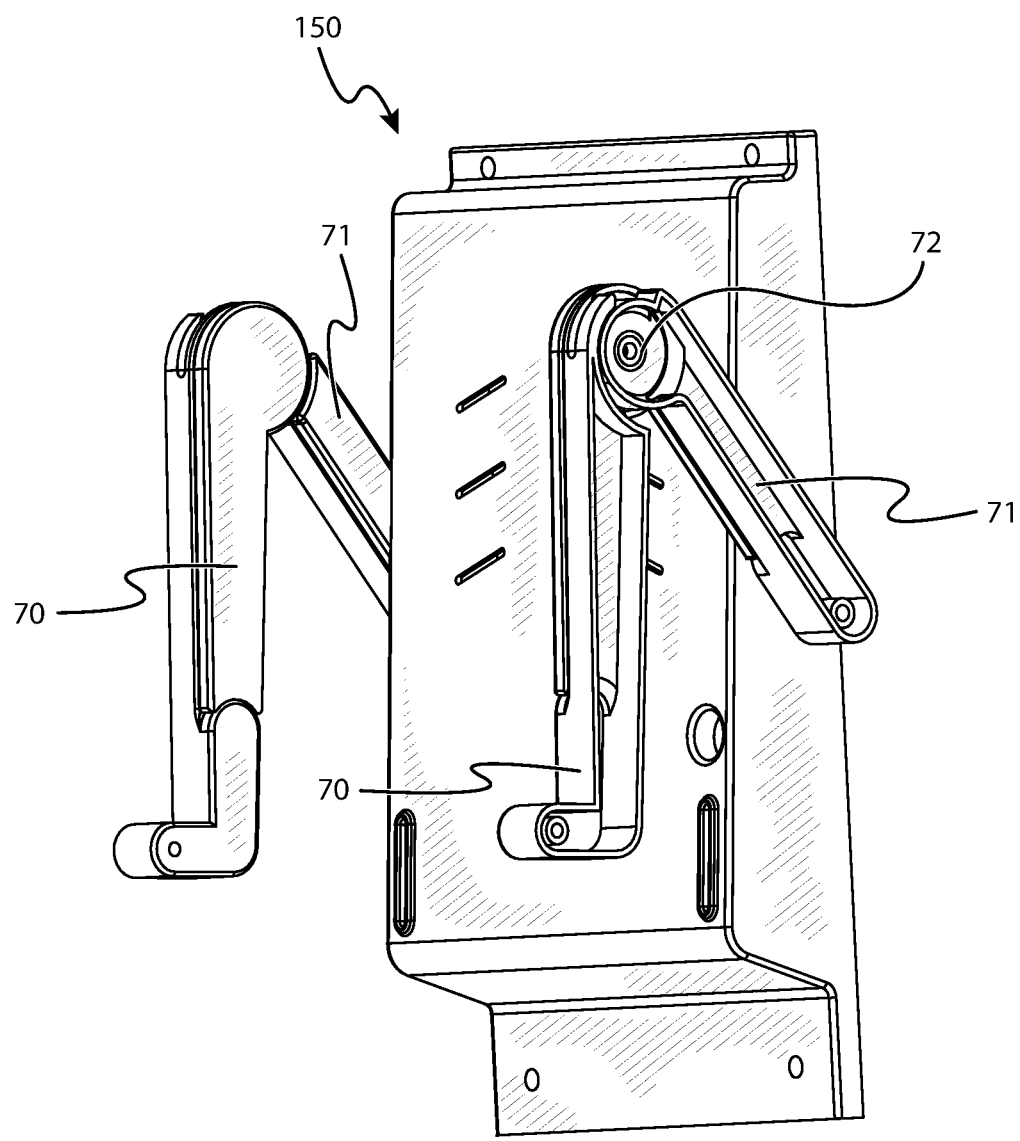
FIG. 66 is a perspective view of exemplary side guard members attached to a second back surface member.

Referring again to FIG. 21, each side guard member 66 and 67 suitably includes two elongated members 70, 71 interconnected via a pivot joint 72 forming an angle there between. As understood by persons of ordinary skill in the art, the angle formed between the elongated members 70, 71 may decrease when the backrest member 14 of the seating assembly 10 is set to a collapsed position as shown in FIGS. 3 and 4. With particular attention to FIGS. 37-39, a first end of the elongated members 70 may be pivotally attached to a framework of the primary backing member 60 or directly attached to the primary backing member 60. Likewise, the first end of the elongated members 71 may be pivotally attached to a framework of the upright backing member 63 or directly attached to the upright backing member 63. In another embodiment, the first end of the elongated members 71 may be pivotally attached directly to the second back surface member 150 (see FIG. 66), depending on the shape of the upright backing member 63 and second back surface member 150 employed. The first ends of the elongated members 70, 71 may vary in shape as desired. For example, the first ends may include a linear curved end (see elongated member 71) or the first ends may include an L-shape curved end as depicted by the elongated members 70 in FIG. 66. As understood by persons of ordinary skill, the first ends suitably include apertures for receiving pivot pins, rods, or the like there through for maintaining the location of the first ends of the elongated members 70, 71 in relation to the primary backing member 60, upright backing member 63 and second back surface member 150 during operation.

Figure 40:
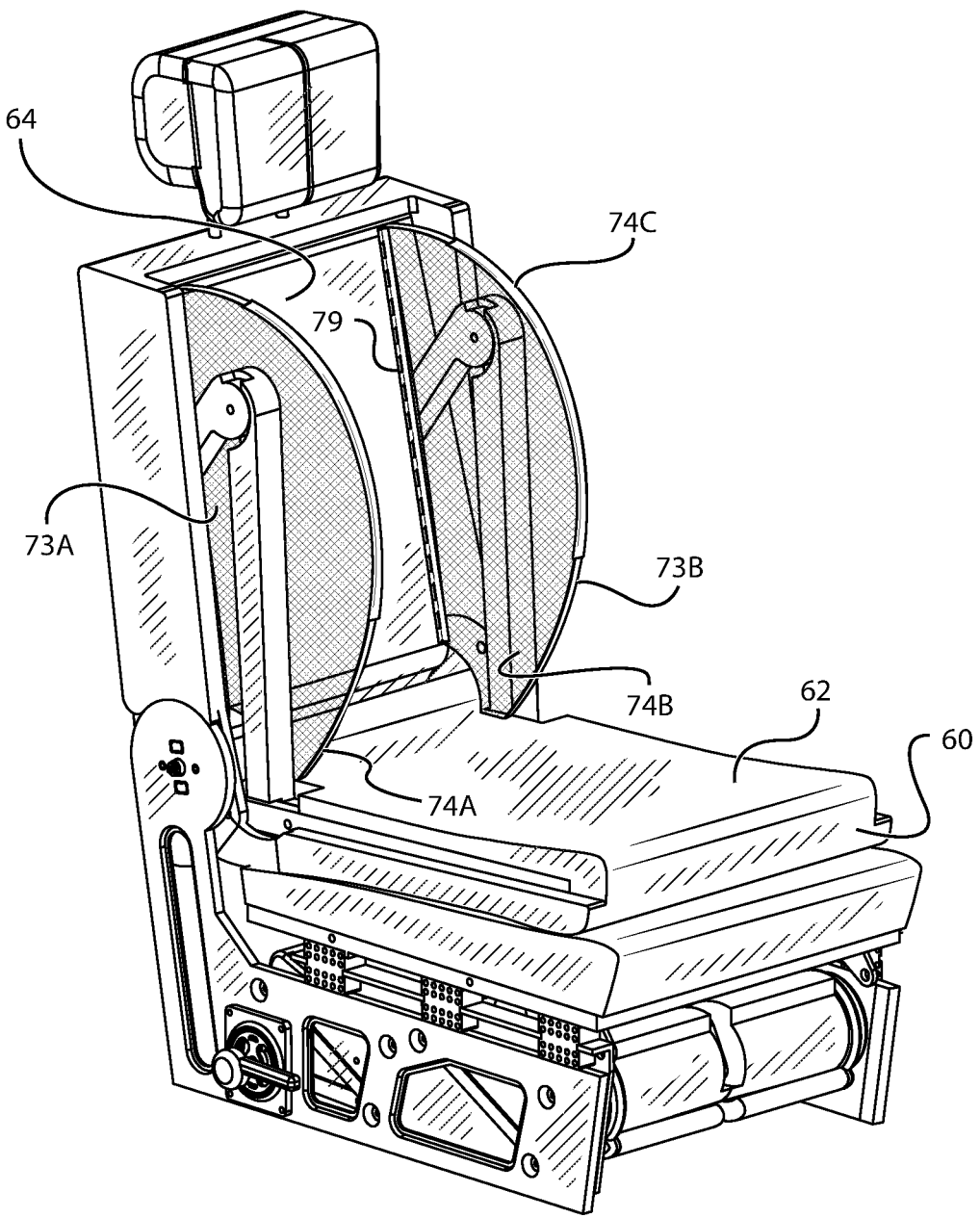
FIG. 40 is a front perspective view of the vehicular seating assembly of FIG. 20 including extensible side shielding.

Referring now to FIG. 40, each of the side guard members 66 and 67 may also include extensible side shielding members 73A and 73B effective to protect a passenger's upper torso and head against impact related side to side jarring movements, side impacts to the seating assembly 10 as well as providing protection from projectiles. As shown, the side shielding members 73A and 73B suitably extend forward along the inside of the side guard members 66 and 67 to a fixed position when the primary backing member 60 is directed to a horizontal position as shown in FIG. 40. The construction of the side shielding members 73A and 73B is not limited to any one particular design or mode of fabrication. In one suitable embodiment, the side shielding members 73A and 73B may each include a perimeter forming frame member 74A disposed along the edge of an interior substantially planar panel member 74B. The frame member 74A may be constructed from one or more rigid or semi-rigid materials as desired. In addition, the frame member 74A may include impact absorbing material 74C disposed along the front parts of the frame member 74A effective to protect a passenger's head and body from impacts against the frame member 74A. One suitable impact absorbing material may include one or more resilient foam materials, for example, open cell foam and/or closed cell foam. In another embodiment, the impact absorbing material 74C may include an elongated flexible tension member operationally configured to flex or bend when the side shielding members 73A, 73B are set at a collapsed or retracted position and reconfigure to a natural resting position when the side shielding members 73A, 73B are set to an extended position as shown in FIG. 40.

The panel members 74B may also be constructed from one or more materials effective to absorb external impacts and passenger related impacts. As shown, the side shielding members 73A and 73B may extend forward a distance suitable to protect a passenger's head and/or torso from side impacts and/or projectiles in the event of a vehicular accident, sudden stop or sudden jerking motion of the vehicle. As such, the panel members 74B are suitably constructed from one or more materials effective to absorb direct external forces and impacts to the panel members 74B. Without limiting the invention to any particular materials of construction, apposite materials may include, but are not necessarily limited to metals, nylons, polymeric materials, textiles, and combinations thereof. In one embodiment, the panel members 74B may be fabricated using a class of nylon called aramids. One suitable aramid may include para-aramid synthetic fibers. As of the time of this application, a suitable source of para-aramid synthetic fibers is E. I. du Pont de Nemours and Company, Delaware, U.S.A, which manufacturers a suitable product under the brand KEVLAR®. One particular fiber material includes KEVLAR® Plain Weave Fabric commercially available from Fibre Glast Developments Corporation, Brookville, Ohio. In another suitable embodiment, the panel members 74B may be fabricated using a combination of para-aramid synthetic fibers and carbon fiber. In another embodiment, the panel members 74B may be fabricated using carbon fiber reinforced polymer. In still another embodiment, the panel members 74B may be constructed from one or more metals including, but are not necessarily limited to steel, titanium, aluminum, and combinations thereof.

In one embodiment, the side shielding members 73A and 73B may be snap fit to the backrest member 14 and/or the primary backing member 60 and/or the side guard members 66 and 67. In another embodiment, the primary backing member 60 and second back surface 64 may include grooves or spacing along the sides of the primary backing member 60 and second back surface 64 effective for receiving the side shielding members 73A and 73B in a slidable manner. In another embodiment, the side shielding members 73A and 73B may be pivotally attached to the backrest member 14 via hinges 79 in a manner to fold against the second back surface 64 in a wing-like manner and opened as shown in FIG. 40. In one embodiment, the side shielding members 73A and 73B may be manually opened. In another embodiment, the hinges 79 may include biased hinges, including but not necessarily limited to spring hinges effective to bias the side shielding members 73A and 73B to an open position as the primary backing member 60 is directed to a horizontal position.

In another embodiment, the panel members 74B may be fabricated from one or more textiles including, but not necessarily limited to one or more para-aramid synthetic fabrics. Without limiting the invention, textile materials described herein may be attached to the elongated members 70, 71 via screws, rivets, adhesives, or combination thereof. In one particular embodiment, the edge or outer periphery of the panel members 74B may be doubled or folded over to form pocket type formations operationally configured to house elongated flexible tension member 74C therein as shown in FIG. 40. In this embodiment, when the side shielding members 73A, 73B are set to a collapsed position, the panel members 74B suitably bend or fold, possibly in a preformed way via pleats and/or bellows, thereby shaping to fit compressed like within spaces provided as part of the seating assembly 10. When the side shielding members 73A, 73B are deployed to an extended position as shown in FIG. 40, the flexible tension members 74C of the elongated members 70, 71 are operationally configured to help stretch or extend and hold the panel members 74B in a substantially planar orientation as shown in FIG. 40.

Figure 41:
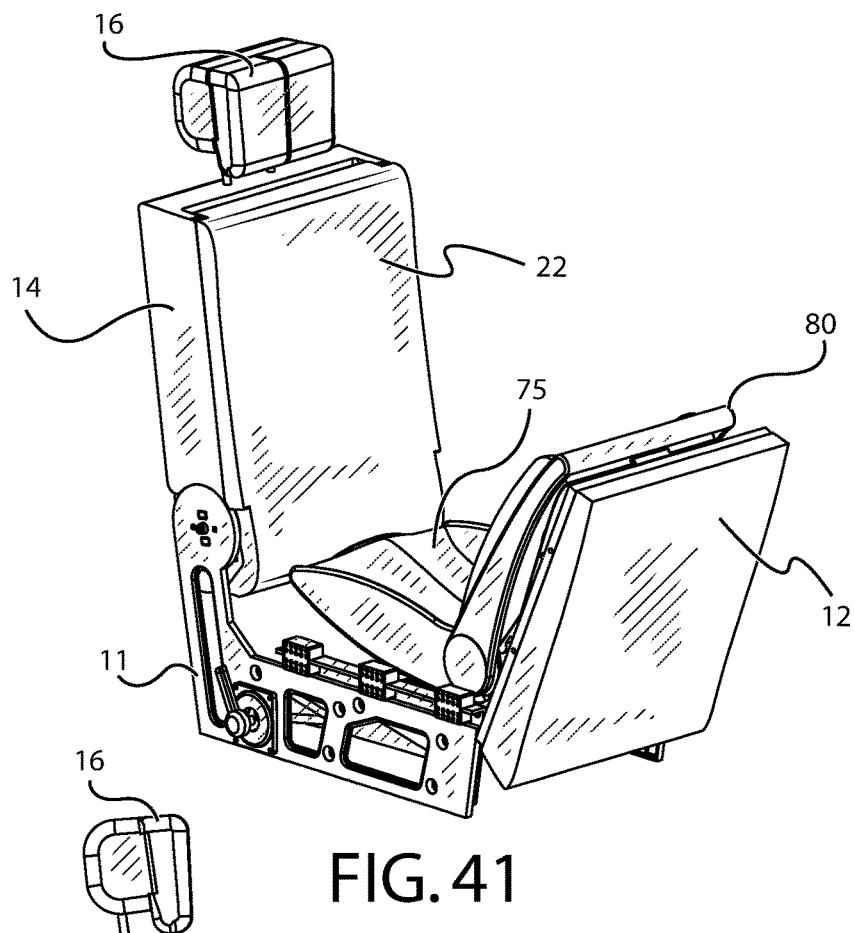
FIG. 41 is a front perspective view of the vehicular seating assembly of FIG. 2 set to an infant passenger position.
Figure 42:
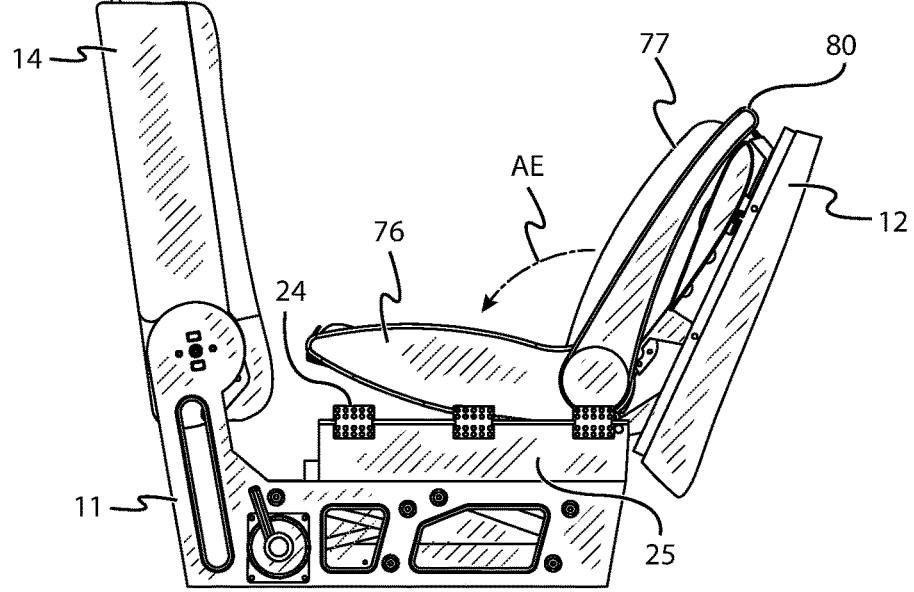
FIG. 42 is an elevated side view of the vehicular seating assembly of FIG. 41.
Figure 43:
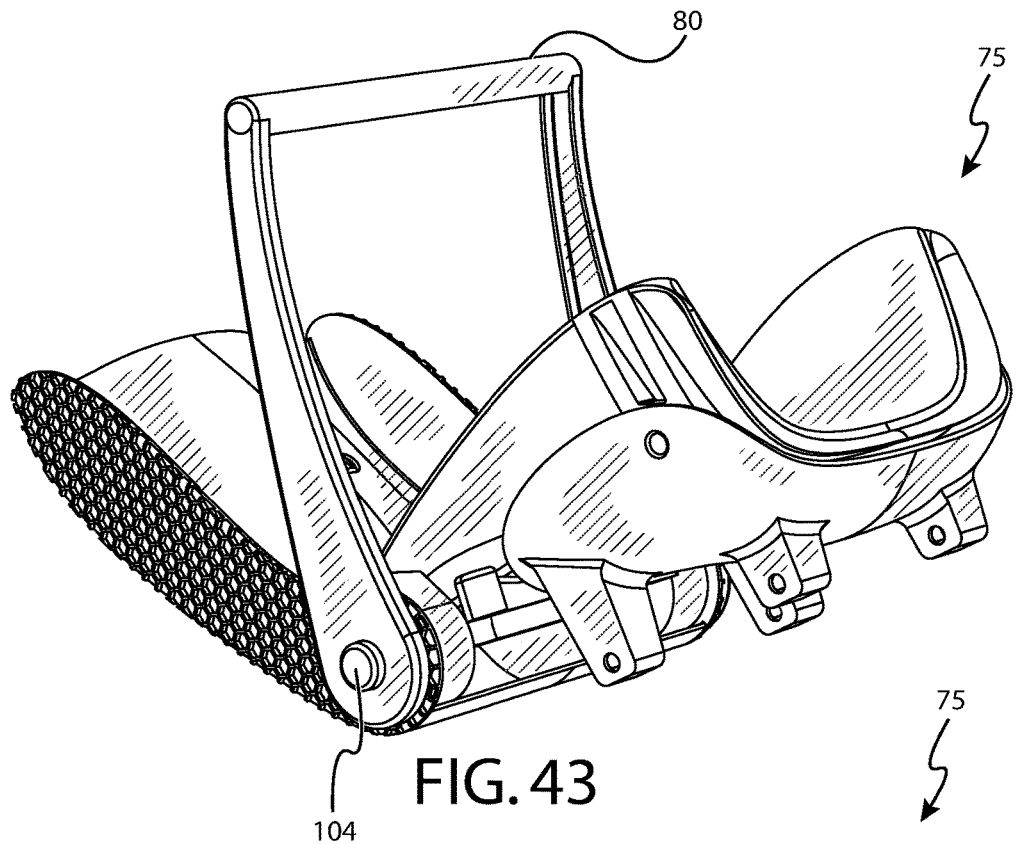
FIG. 43 is a rear perspective view illustrating a carrier in an attached position with an embodiment of an adapter assembly.
Figure 44:
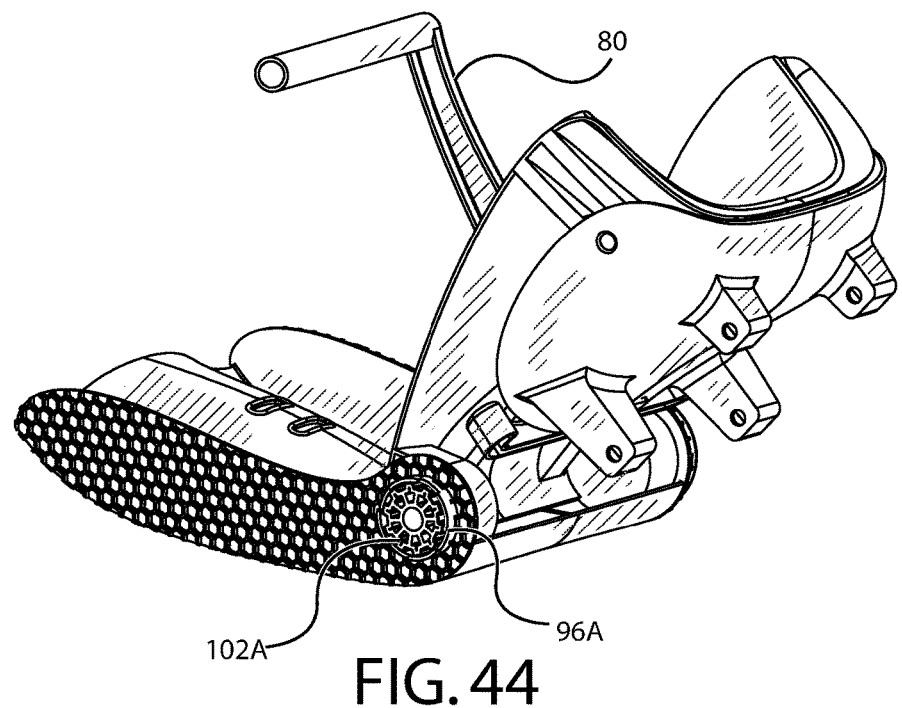
FIG. 44 is a view of the carrier and adapter assembly of FIG. 43 including a handle partially removed exposing the junction of rotation of the handle and carrier for adjusting the reclining angle of the carrier.

Turning to the simplified illustrations of FIGS. 41-49, the seating assembly 10 may also include a rearward facing carrier 75 that may be directed (1) to a first closed position where it is concealed under the seat member 12 between the side sections 11A and 11B of the chassis 11 as shown in FIG. 2 and (2) to a second open position when the seat member 12 is pivoted open back to front as shown in FIGS. 41 and 42. When the carrier 75 is set to an open position, the carrier 75 suitably defines a third seat surface at a fourth elevation and a third backrest surface of the seating assembly 10. In one embodiment, the carrier 75 may be provided as a Class 1 Child Vehicle Seat, or equivalent, providing a first reverse or first rearward facing sitting configuration of the seating assembly 10. As a skilled artisan can appreciate, it is herein contemplated that the carrier 75 configuration may be altered according to one or more changes or differences in the laws of one or more jurisdictions where use of the seating assembly 10 is foreseen. In addition, the carrier 75 may be provided for standalone use apart from the remaining seating assembly 10 as desired.

Similar as commercially available infant vehicle seats, the present concealable carrier 75 may include an interior sitting surface defining a seat surface member and a backrest surface member for supporting a passenger therein—the sitting surface of the seat surface member and backrest surface member forming one or more obtuse angles for receiving an infant therein. In addition, the carrier 75 is operationally configured to fold for concealment purposes in a first closed position, for example, wherein the backrest surface member 77 is collapsed to an abutment or partial contact position with the seat surface member 76. For example, the backrest surface member 77 may be pivotally attached to the seat surface member 76 so that the backrest surface member 77 may be directed down toward the seat surface member 76 (see Directional Arrow AE in FIG. 42) with the center longitudinal plane P-1 (see FIG. 58) of the backrest surface member 77 lying in substantially parallel alignment with the center longitudinal plane P-2 (see FIG. 58) of the seat surface member 76 whereby the carrier 75 may be concealed under the seat member 12.

In one embodiment, the seat surface member 76 and a backrest surface member 77 may open to a single second position of a desired reclining angle. In another embodiment, the backrest surface member 77 may be set to one or more desired fixed reclining angles via one or more locking mechanisms operationally configured to permit directional movement and locking of the seat surface member 76 and backrest surface member 77 at one or more fixed reclining angles. As an example, a carrier 75 may include a first open position with a reclining angle operationally configured to hold an infant and a second open position with a reclining angle operationally configured to hold a toddler.

With particular reference to FIGS. 43-52, in one embodiment the seat surface member 76 and the backrest surface member 77 may be pivotally communicated at opposing pivot axis junctions 96A and 96B with at least one of the junctions including a locking mechanism in the form of a locking gear assembly comprised of outer gears and an adjustable gear stop member operationally configured to communicate with the gears and handle 80 for regulating the reclining angle of the carrier 75. The locking gear assembly may also be operationally configured to regulate the position of the handle 80 in relation to the seat surface member 76 and the backrest surface member 77 by locking the handle 80 in a fixed position as desired. In another embodiment, the handle 80 may pivot freely independent of the locking gear assembly, i.e., independent of the position of the seat surface member and backrest surface member.

Figure 45:
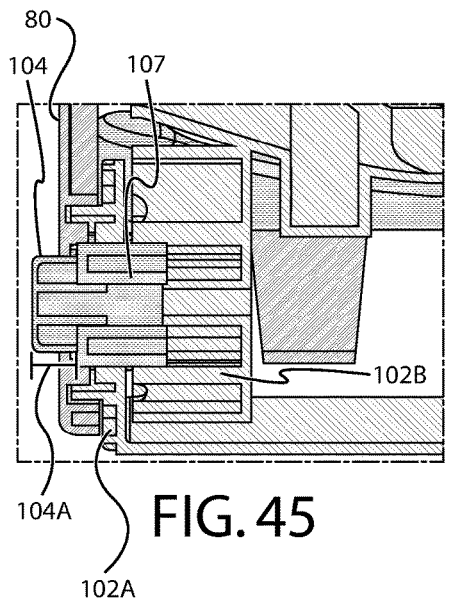
FIG. 45 is a sectional detail view of a locking gear assembly in a first position.
Figure 46:
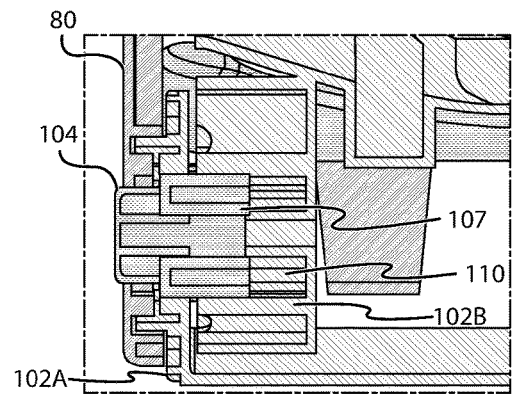
FIG. 46 is a sectional detail view of the locking gear assembly of FIG. 45 in a second position.
Figure 47:
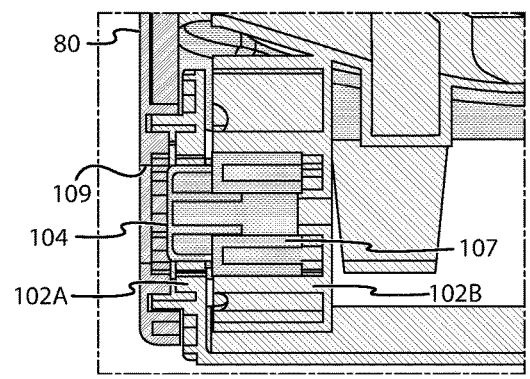
FIG. 47 is a sectional detail view of the locking gear assembly of FIG. 45 in a third position.

As shown in FIGS. 45-47, an outer gear 102A is part of the seat surface member 76 and outer gear 102B is part of the backrest surface member 77. The outer gears 102A, 102B may include a general layout defined by a matrix of radial rib structures, a honeycomb configuration, or other structurally supportive pattern (see for example FIG. 44). The gear stop 104 as shown suitably includes (1) a first part 104A of a size effective to be adjusted, i.e., directed back and forth, within an aperture 109 of the handle 80 that accessible manually at an external location (see FIG. 43) and (2) a second part defined by one or more elongated members 107 operationally configured to slidably mate with openings in the matrixes of one or both of the outer gears 102A, 102B in a manner effective to engage and hold one or both of the outer gears 102A, 102B in a static position as desired.

As shown in FIG. 45, the inner surface of the handle 80 suitably prohibits the elongated members 107 from sliding out of the aperture apart from the carrier 75. This position of the gear stop 104 may be referred to as a first position—also shown in the simplified embodiment of FIG. 43—whereby the position of the one or more elongated members 107 is effective to prohibit rotation of the handle 80 and the seat surface member 76. At a second position as shown in FIG. 46, the gear stop 104 is directed inward whereby the one or more elongated members 107 are clear of the handle 80 allowing free rotation of the handle 80 as desired until the gear stop 104 is directed back to the first position. At a third position as shown in FIG. 47, the gear stop 104 is directed further inward whereby the one or more elongated members 107 are located within the outer gear 102B clear of the handle 80 and the outer gear 102A allowing free rotation of the handle 80 and the seat surface member 76. For example, if a user wishes to adjust the reclining angle of the carrier 75, he/she may direct the gear stop 104 to the third position until a desired reclining angle is created and there after direct the gear stop 104 back to the second position or the first position. It is also contemplated that a bias member such as a helical spring or resilient polymer material may be located at the distal ends of the elongated members 107 within the gear matrix spacing 110 in a manner effective to bias the gear stop 104 directionally toward the first position. For purposes of this application, a suitable handle 80 may be attached to both of the opposing pivot axis junctions or attached at a single pivot axis junction as desired.

The carrier 75 of this application may be defined by a rigid and/or semi-rigid body. In one particular embodiment, the carrier 75 may include a cushioned cover disposed along the seat surface member 76 and/or the backrest surface member 77 similar as commercially available infant vehicular seats providing added comfort and support for a passenger. Without limiting the invention to a particular embodiment, a suitable carrier 75 may be constructed from one or more materials functionally effective for the carrier 75 to perform according to one or more laws of one or more jurisdictions. For example, a suitable carrier 75 may be constructed from metals, polymeric materials, fiber-reinforced plastic, composite materials, wood, and combinations thereof. Suitable polymeric materials include, but are not necessarily limited to rubbers, plastics, and combinations thereof. Suitable plastics include, but are not necessarily limited to acrylonitrile butadiene styrene ("ABS"), polypropylene, and combinations thereof. Suitable wood species include, but are not necessarily limited to maple, oak, ash, birch, cedar, chestnut, hickory, mahogany, walnut, and combinations thereof.

In one particular embodiment, the carrier 75 may be fabricated from high-density polypropylene effective to flex under pressure but also resilient to cracking or breaking due to loads or other external forces. In addition, the carrier 75 may include one or more cushioned cover assemblies 83 attachable to the surface of the carrier 75 (see FIG. 61). As understood by the skilled artisan, a cushioned cover assembly 83 may include a cushion member covered by an outer surface member. The outer surface member may be fabricated from one or more textiles, vinyls, leather, and combinations thereof as desired. In addition, the outer surface may be fabricated from one or more particular materials such as water proof materials and/or color schemes and/or designs for aesthetic purposes and/or for guarding against liquid spills and passenger urination. Although practically any soft material may be used, suitable cushion member materials may include, but are not necessarily limited to bird feathers, cotton, open cell foam, closed foam, wool, silicone rubber, animal hair, and combinations thereof. One or more cushion member materials may be provided according to manufacturer choice and/or consumer demand and/or according to one or more laws of one or more jurisdictions. In addition, the outer surface member may be attached to the carrier 75 as desired or as otherwise required, suitably in a non-intrusive manner or non-abrasive for a passenger using the carrier 75. For example, outer surface members may be sewn into the surface of the carrier 75, adhered to the surface of the carrier 75, pinned via snaps, pinned via hook and loop fasteners, and combinations thereof. In another embodiment, the carrier 75 may be molded in a manner effective to receive and hold elongated loops, e.g., elastic pieces, which are sewn into a removable cover assembly 83. The carrier 75 may also be provide with snap posts operationally configured to receive corresponding snap caps fixed to the cover assembly 83. Furthermore, a cushioned cover assembly 83 of this application may meet toxicity, flammability and energy absorption requirements according to one or more laws of one or more jurisdictions.

Figure 49:
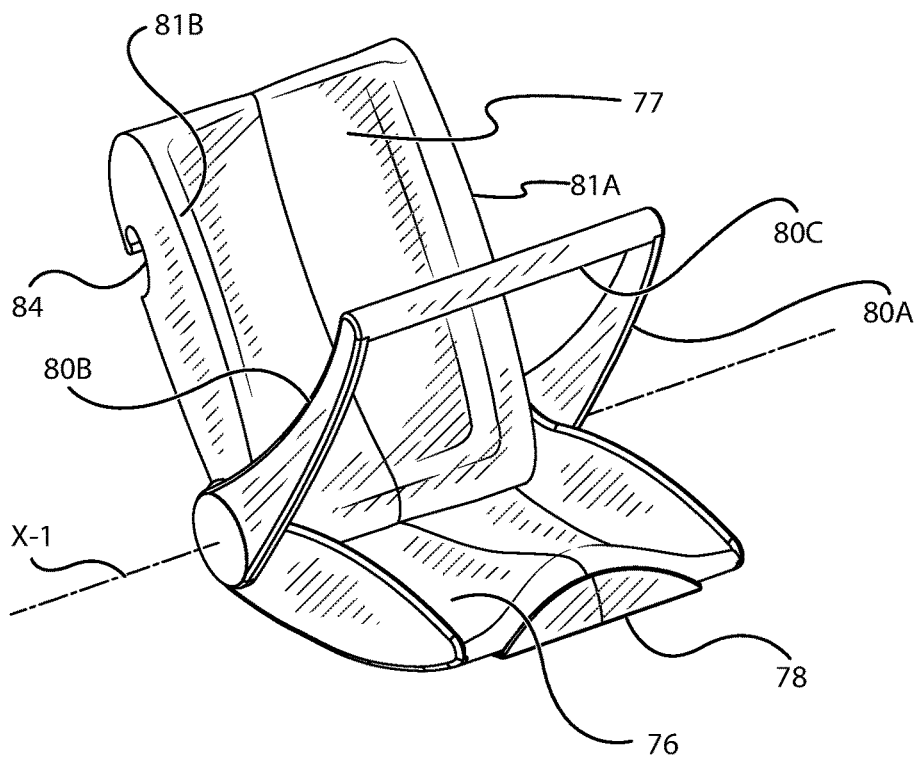
FIG. 49 is a front perspective view of an embodiment of an infant carrier.
Figure 50:
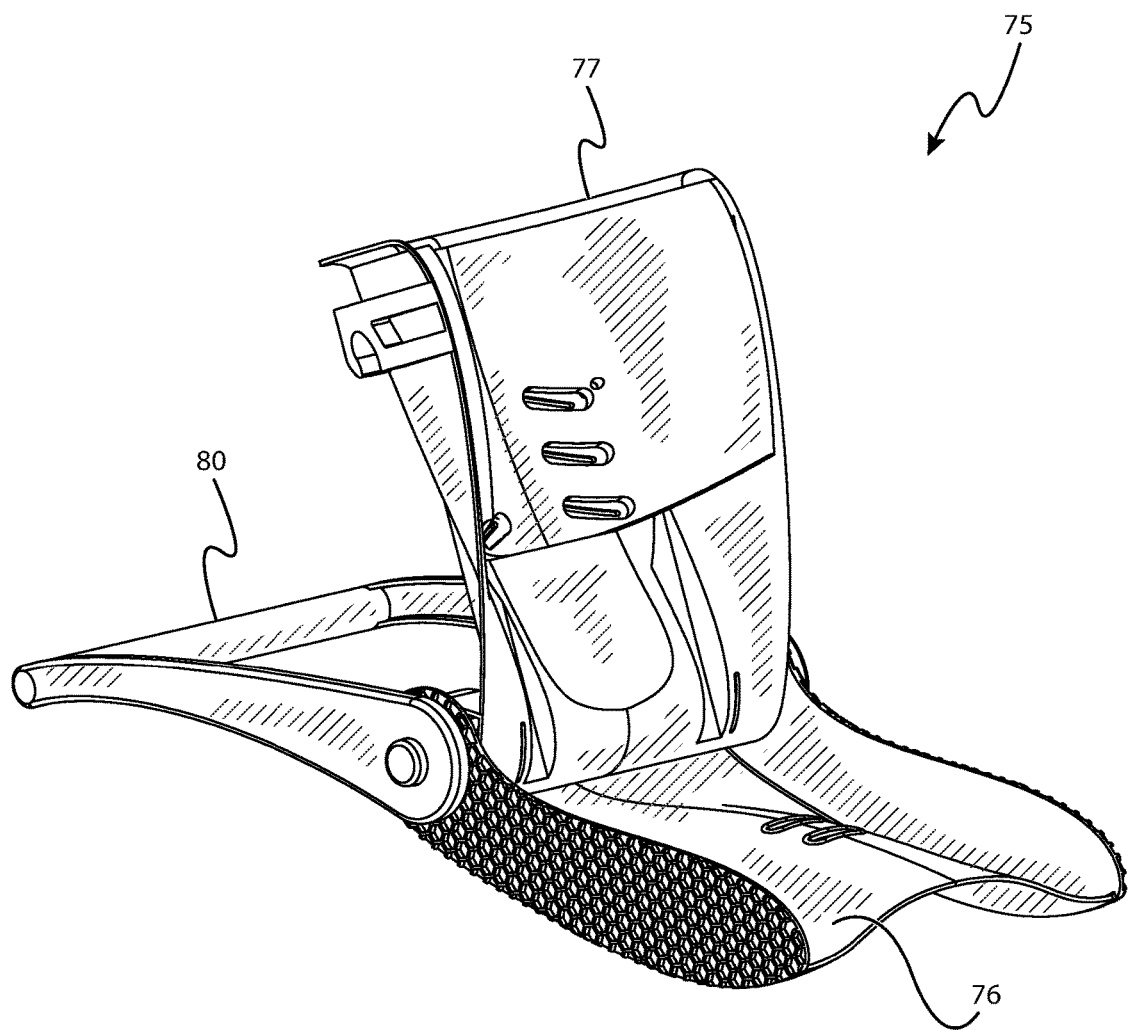
FIG. 50 is a front perspective view of another embodiment of an infant carrier.

As shown in FIG. 49, the seat surface member 76 and the backrest surface member 77 may be ergonomically shaped or contoured for passenger comfort. For example, the concealable infant carrier 75 may include a structural support member 78 shaped in a manner effective to form and maintain a raised surface contouring the seat surface member 76 to be occupied by a passenger's right and left legs on either side. Likewise, the backrest surface member 77 may lie deeper near its centerline forming raised side walls 81A and 81B.

Figure 48:
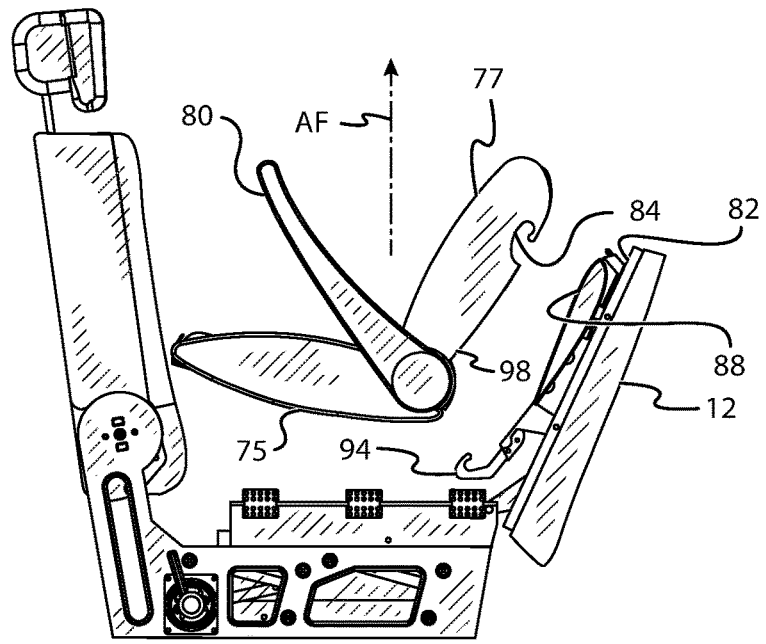
FIG. 48 is an elevated side view of the vehicular seating assembly of FIG. 42 including an infant carrier separated apart from the assembly.

As discussed above, the carrier 75 may include a handle 80 pivotally attached to one side or to the opposing sides of the carrier 75 in a manner effective for a person to manually grab or grasp the handle 80 and remove the carrier 75 out from its attachment position with the seating assembly 10 (see Directional Arrow AF in FIG. 48). As a result, the carrier 75 may be utilized as a hand held carrier item separate and apart from the seating assembly 10 and the corresponding vehicle. For example, when an infant is secured within the carrier 75, a parent or other capable person or persons may grab the handle 80 and remove the carrier 75 out from the seat assembly 10 for purposes of carrying the infant passenger out apart from the vehicle, i.e., for purposes of extravehicular infant transport when transporting an infant between a home and a vehicle, when out shopping, and the like. When returning the carrier 75 to a target vehicle, the carrier 75 may be redirected back to an attachment position with the remaining seating assembly 10. In one embodiment, the handle 80 may include a static member as shown. In another embodiment, the handle 80 may be constructed from one or more flexible or bendable materials. In still another embodiment, the handle 80 may include a strap, chain, belt or cable type member operationally configured to be manually grabbed for removing the carrier 75 out from its attachment position with the seating assembly 10 and for carrying the carrier 75.

With particular attention to FIG. 49, one suitable handle 80 may include opposing side members 80A, 80B and a crossbar member 80C providing additional impact protection for a passenger along his/her sides and frontal regions when the handle 80 is directed to a first position as shown. As illustrated, the crossbar member 80C may (1) serve as a lap bar for a passenger and also (2) provide a convenient section of the handle 80 for an adult or other person to manually grab, grasp and hold when transporting the carrier 75 out apart from the seating assembly 10. As shown in FIGS. 41 and 42, when placing a passenger into the carrier 75 and/or when removing a passenger out from the carrier 75 the handle 80 may be directed to a second position allowing direct unencumbered access to the seat surface member 76 and the backrest surface member 77. As shown in the embodiment of the carrier 75 in FIG. 50, the handle 80 may also be directed to a third position behind the backrest surface member 77 in a manner effective to assist in maintaining the carrier 75 in an upright position when the carrier 75 is set on a support surface such as a floor, table, ground.

As shown in FIG. 48, the undercarriage of the seating assembly 10 is suitably exposed when the carrier 75 is removed apart from the seating assembly 10. Without limiting the invention to a particular mode of operation, in one embodiment the underside surface 82 of the seat member 12 may include a surface configuration effective to releasably attach and hold a corresponding backside of the carrier 75 in a fixed position during operation of the seating assembly 10. For example, the seat member 12 may include a mounting assembly disposed along the underside surface 82 that is operationally configured to receive and hold a carrier 75 in a fixed position for passenger use. In one particular embodiment, a mounting assembly, a.k.a., an intermediate member, may be releasably attached to the underside surface 82 of the seat member 12 in a manner effective to releasably attach and hold the backside of a carrier 75 in a fixed position during operation of the seating assembly 10. One exemplary intermediate member may include a plate type member or other expanse type member having a surface substantially similar in shape as the shape of the backside of the carrier 75, which may assist in holding the carrier 75 in a fixed position during vehicular use.

Figure 51:
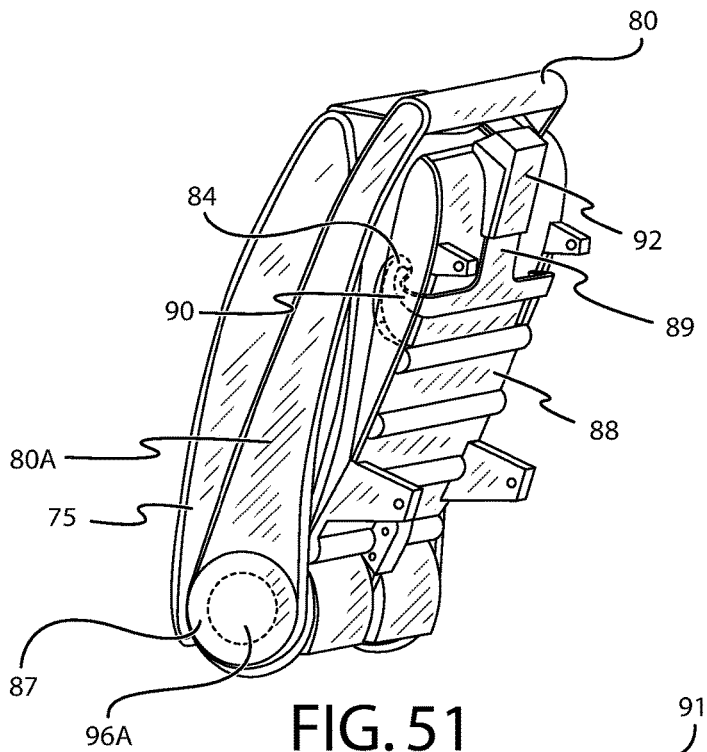
FIG. 51 is a perspective partial phantom view of an adapter assembly of the present application.
Figure 52:
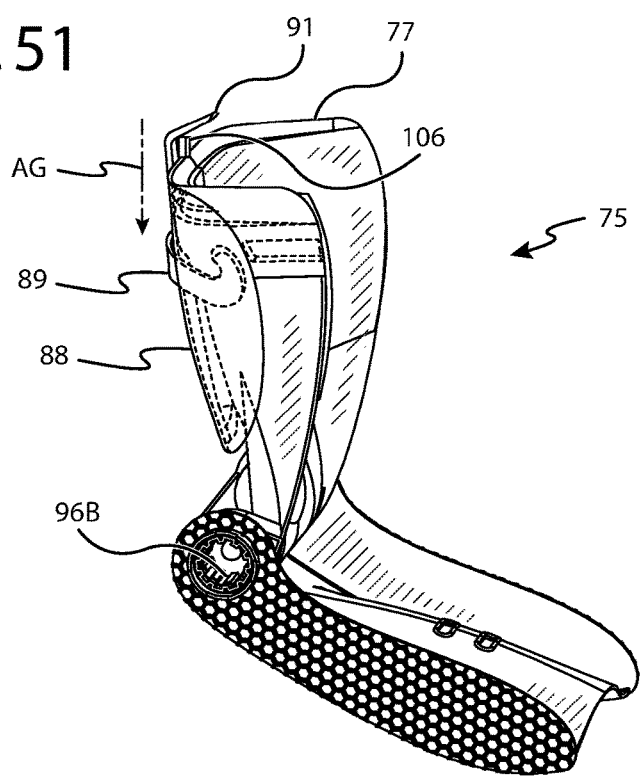
FIG. 52 is a perspective partial phantom view of a simplified infant carrier and anchor assembly of the adapter assembly of FIG. 51.

Turning to FIGS. 51 and 52, one suitable intermediate member, hereafter referred to as an adapter assembly 88, may be disposed along the underside surface 82 of the seat member 12 wherein the adapter assembly 88 is operationally configured to engage one or more connectors disposed along the backside of the carrier 75, e.g., one or more latch sockets 84 (see also FIG. 48), a pivot crossbar 86 (see FIG. 55), for holding the carrier 75 in a fixed position during operation. Similarly, the backside of the carrier 75 may include one or more connectors operationally configured to directly engage the underside surface 82 for holding the carrier 75 in a fixed position.

One suitable adapter assembly 88 may include one or more anchor members, e.g., an anchor assembly 89 or other member, including one or more upper latches or hook members 90 operationally configured to engage the one or more latch sockets 84 disposed on one or both sides of the carrier 75. As shown, the anchor assembly 89 may also include a latch or catch member 91 operationally configured to extend over the upper edge of the backrest surface member 77 of the carrier 75 to prevent or otherwise minimize vertical travel of the carrier 75 during operation.

Figure 53:
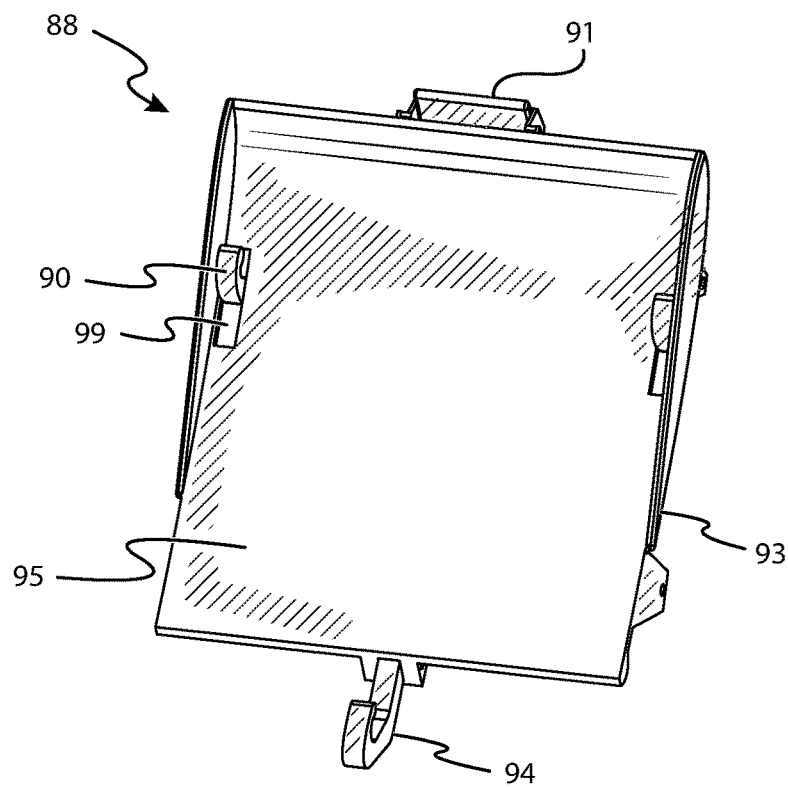
FIG. 53 is a perspective view of an exemplary adapter assembly.
Figure 54:
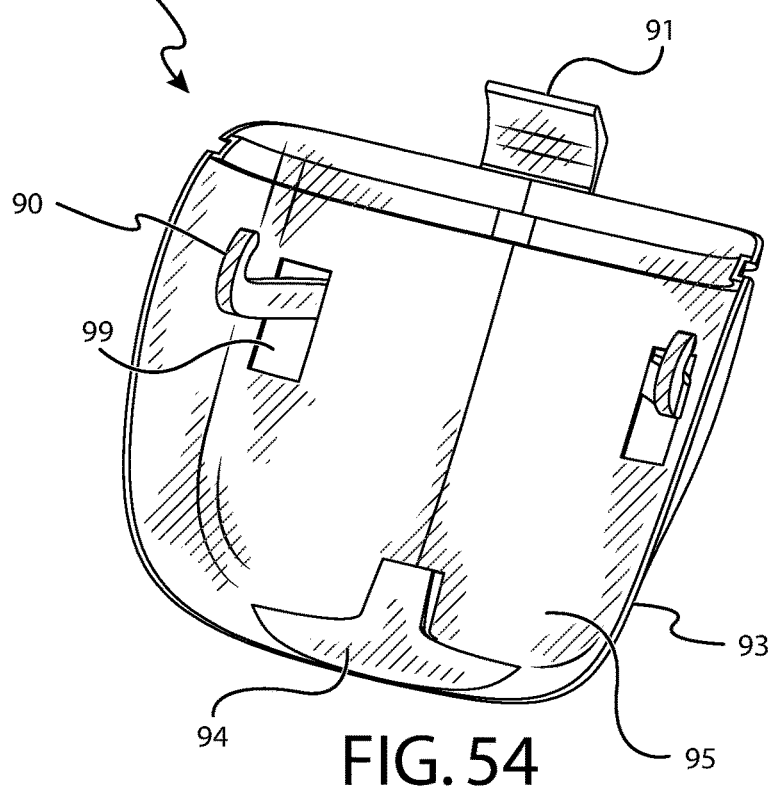
FIG. 54 is a perspective view of another exemplary adapter assembly.

The adapter assembly 88 of this application is not limited to any particular configuration. With attention to the non-limiting examples of FIGS. 53 and 54, one suitable adapter assembly 88 may include at least (1) a first body member 93 and (2) a second anchor assembly 89 similar as described above (see FIG. 51) attached to the body member 93. The body member 93 suitably includes an engagement surface 95 for receiving the carrier 75 in abutment thereto, the opposing side of the body member 93 being operationally configured to receive the anchor assembly 89 in attachment thereto. In addition, the body member 93 suitably includes one or more apertures or openings 99 for receiving the one or more hook members 90 of the anchor assembly 89 there through. As shown in FIG. 52, the catch member 91 may extend out in front of the engagement surface 95 a distance effective for (1) blocking the carrier 75 from vertical release from the seating assembly 10 and (2) providing ease of access for a user to depress the catch member 91 (see Directional Arrow AG in FIG. 52) for unlatching the carrier 75 in order to remove the carrier 75 out from the remaining seating assembly 10. In the embodiment of FIG. 53, the adapter assembly 88 may also include one or more lower latch or hook members 94 attached to the body member 93 in a fixed manner for engaging the pivot crossbar 86. As shown in the exemplary embodiment of FIG. 54, a single lower latch or hook member 94 may be employed having a width up to about the length of the pivot crossbar 86. As each of FIGS. 53 and 54 illustrate, the shape of the body member 93 is not limited to any one configuration. For example, the engagement surface 95 may be substantially planar or the engagement surface 95 may include a non-planar surface. Without limiting the invention, FIGS. 53 and 54 illustrate exemplary curved engagement surfaces 95 that may be employed for suitable operation.

Suitably, the adapter assembly 88 is operationally configured to prevent the carrier 75 from being pulled or otherwise manipulated directionally out from the seating assembly 10 (see Directional Arrow AF in FIG. 48) when the carrier 75 is secured or otherwise set at an operational position as shown in FIGS. 41 and 42. At a minimum, the carrier 75 is secured to the adapter assembly 88 via mating of the opposing hook members 90 within the opposing latch sockets 84 of the carrier 75. When attaching the carrier 75 to the remaining seating assembly 10, the catch member 91 may be manually directed to a non-engagement position (see Directional Arrow AG in FIG. 52) thereby providing clearance of the opposing hook members 90 allowing the carrier 75 to be directed to an attachment position as shown in FIG. 51—with the opposing hook members 90 set at a mated position within the opposing latch sockets 84 of the carrier 75. In regard to the embodiments illustrated herein, the carrier 75 may be manually directed toward the adapter assembly 88 along the engagement surface 95 and guided to an engagement position with both the opposing hook members 90 and the one or more hook members 94 discussed below. To release the carrier 75, the catch member 91 may again be directed to the non-engagement position whereby the opposing hook members 90 may be directed out from a mated position with the opposing latch sockets 84 allowing the carrier 75 to be released from the adapter assembly 88.

With reference to FIG. 52, the catch member 91 may be spring loaded or otherwise operationally configured to be biased to a first resting engagement position as shown. In one apposite embodiment, the anchor assembly 89, including the catch member 91, may be constructed from one or more materials effective for the catch member 91 to be directed to a second non-engagement position according to Directional Arrow AG via one or more forces and then automatically return to the first resting engagement position when force is removed from the catch member 91. Likewise, the catch member 91 may be constructed from one or more materials effective to operate as an upper catch of the carrier 75 preventing the carrier 75 from disengaging the adapter assembly 88. Suitable anchor assembly 89 materials include, but are not necessarily limited to metals, plastics, rubbers, composite materials, and combinations thereof. In one particular embodiment, the anchor assembly 89 may be constructed from impact copolymer propylene.

With reference to the exemplary embodiment of FIG. 51, the anchor assembly 89 may also include a cover member 92 operationally configured to enclose at least part of the catch member 91, the cover member 92 being operationally configured to limit or control the maximum travel distance or displacement of the catch member 91 when the catch member 91 is directed to a non-engagement position according to Directional Arrow AG. By controlling the travel distance of the catch member 91, the catch member 91 may be protected against any undesired bending, reshaping, splintering, or breaking as the catch member 91 is directed to a non-engagement position. In addition, the anchor assembly 89 may include one or more biasing members operationally configured to bias the catch member 91 in the direction opposite of Directional Arrow AG. For example, a biasing member 106 may be located along the anchor assembly 89 for biasing the underside of the catch member 91 (see FIG. 52) in the direction opposite of Directional Arrow AG. In another embodiment, the inner surface of the cover member 92 may include feet or ledge type members extending out therefrom for holding biasing members in a manner effective to bias the catch member 91 in the direction opposite of Directional Arrow AG.

Figure 55:
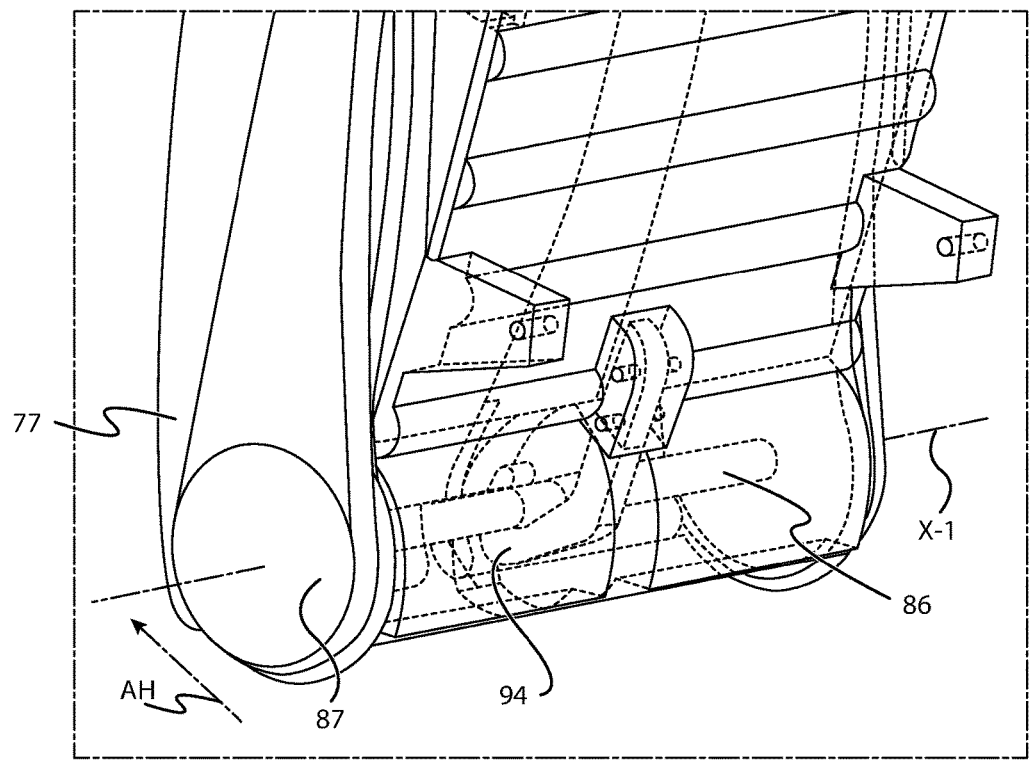
FIG. 55 is a perspective phantom detail view of part of an adapter assembly of the present application.

With attention to the simplified embodiment of FIG. 55, the pivot crossbar 86 is suitably disposed laterally near the lowest most part of the backrest surface member 77 and operates as a pivot point for one or more lower hook members 94. As shown, the pivot crossbar 86 may include a cylindrical member defined by pivot axis X-1 having opposing ends terminating at the opposing junctions 96A and 96B (see FIGS. 51 and 52), the junctions 96A, 96B operating as pivot point connections for opposing side members 80A, 80B of the handle 80 as well as a pivot axis for the seat surface member 76 and backrest surface member 77 as described above. The end caps 87 covering the junctions 96A, 96B are not necessarily required but may serve to keep moisture, dirt and other undesired materials out from the junctions 96A, 96B. In one suitably embodiment, end caps 87 may be provided as pop-in style cap members. The end caps 87 may also be riveted into place to prevent tampering. In an embodiment where the handle 80 includes a flexible material, a geared hub may be attached to one or both ends of the handle 80 for pivotally communicating with one or both of the junctions 96A and 96B.

In operation, once the pivot crossbar 86 is directed to an engagement position with the lower hook member 94, the carrier 75 may be rotated about the engagement point between the crossbar 86 and the lower hook member 94 and directed toward the underside surface 82 and adapter assembly 88 according to the center of gravity of the carrier 75 and according to the surface configuration of the lower hook member 94 in relation to the surface of the cylindrical pivot crossbar 86. As the carrier 75 rotates, the attachment side surface 98 of the backrest surface member 77 may be aligned with the anchor assembly 89 whereby the carrier 75 may be lowered so that the hook members 90 can engage the latch sockets 84 as shown in FIG. 51. Once engaged, the lower hook member 94 is also operationally configured to impede travel of the carrier 75 forward (see Directional Arrow AH in FIG. 55) thereby assisting in maintaining the carrier 75 in an engagement position with the adapter assembly 88 during operation.

In one embodiment, the adapter assembly 88 may be attached to the underside surface 82 as desired. For example, the adapter assembly 88 may be attached to the underside surface 82 and/or a frame within the backrest surface member 77 via one or more fasteners, one or more adhesives, one or more welds, form fitted molds, and combinations thereof. In one particularly advantageous embodiment, the adapter assembly 88 may be releasably bolted to the underside surface 82 to promote ease of attachment and/or release of the adapter assembly 88.

In still another embodiment, the anchor assembly 89 may be reversed so that the one or more fixed latches or hook members 94 may be located near the upper end of the backrest surface member 77 and the hook member 90 and/or catch member 91 may be located near the bottom backrest surface member 77. As understood by the skilled artisan, such a change in configuration may also change or alter the location of the one or more apertures or openings 99 through the body member 93.

In another exemplary embodiment as shown in FIGS. 56-59, another type of adapter assembly 88 and carrier 75 configuration may be employed. Here, the adapter assembly 88 may include attachment members in the form of (1) an anchor assembly 89 located along the bottom part of the body member 93 and (2) opposing protuberances 182 extending out from the inner surface of the body member 93 near the upper part of the body member 93 as shown, each of which is operationally configured to mate with surface configurations along the attachment side surface 98 of the carrier 75. Without limiting the shape to any one particular form, suitable protuberances 182 may be multi-sided and/or cylindrical in shape and extend out from the inner surface of the body member 93 in a substantially horizontal manner as shown. In this embodiment, the anchor assembly 89 includes a "T-shape" type configuration including elongated arms 184 extending out substantially perpendicular from the end of a stem member 186. As depicted, the stem member 186 is disposed through an enclosure 188 set along the bottom edge of the body member 93, the configuration of the enclosure 188 being effective to receive an enlarged head 187 at the distal end of the stem member 186 to travel within the enclosure 188 without escaping out the lowermost opening of the enclosure 188 thereby maintaining the anchor assembly 89 securely attached to the body member 93. For example, in one suitable embodiment the lowermost opening of the enclosure 188 is smaller than the uppermost opening of the enclosure 188.

Figure 56:
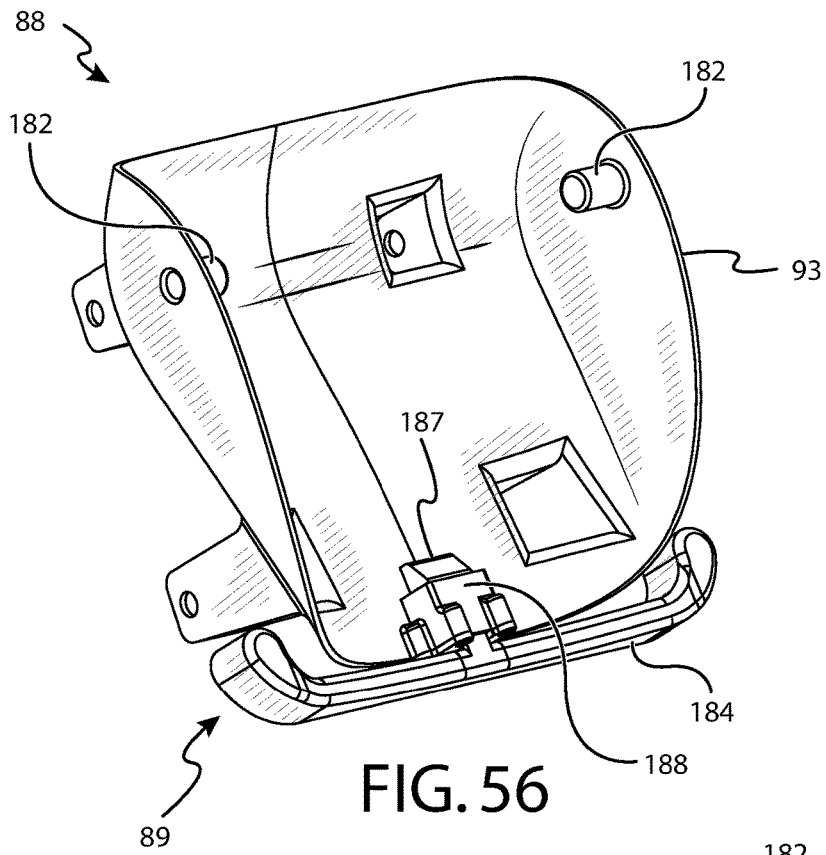
FIG. 56 is a perspective view of another adapter assembly of the present application.
Figure 57:
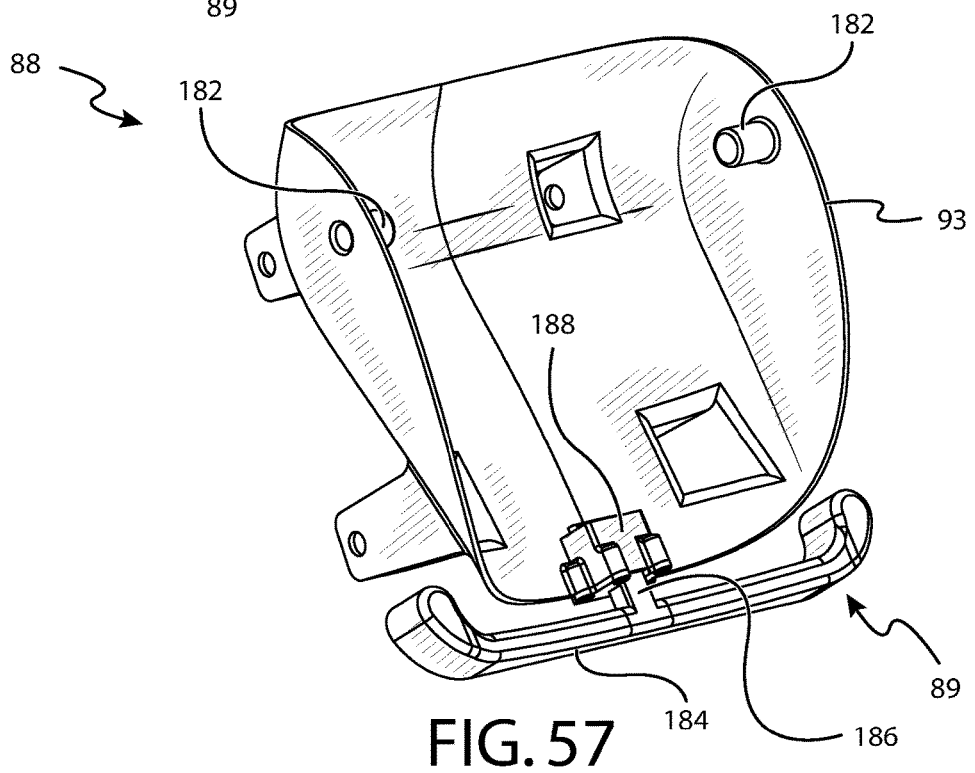
FIG. 57 is another perspective view of the adapter assembly of FIG. 56.
Figure 58:
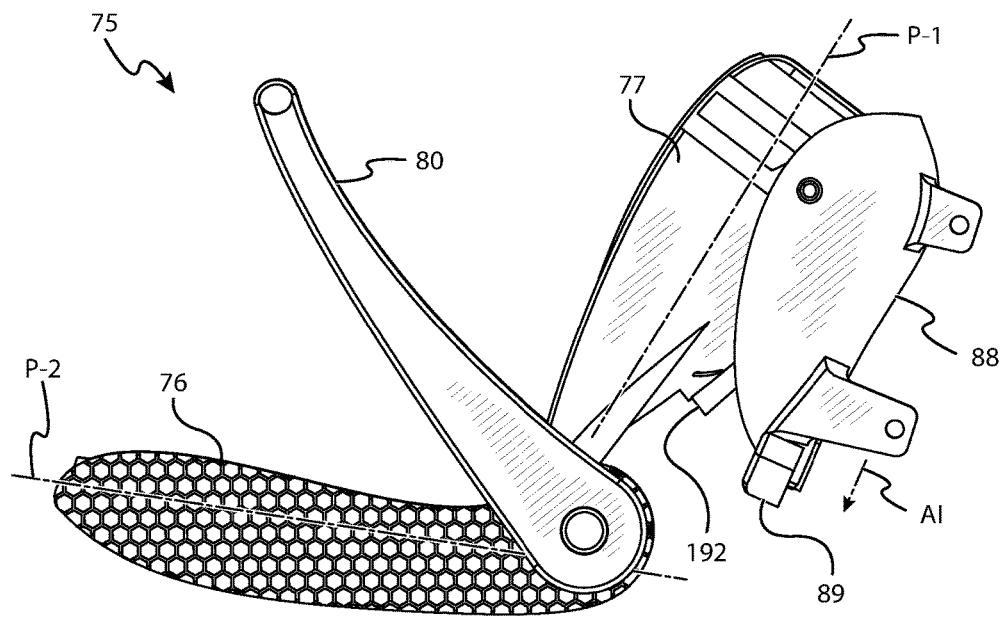
FIG. 58 is a simplified side view of a carrier partially attached to the adapter assembly of FIG. 56.
Figure 59:
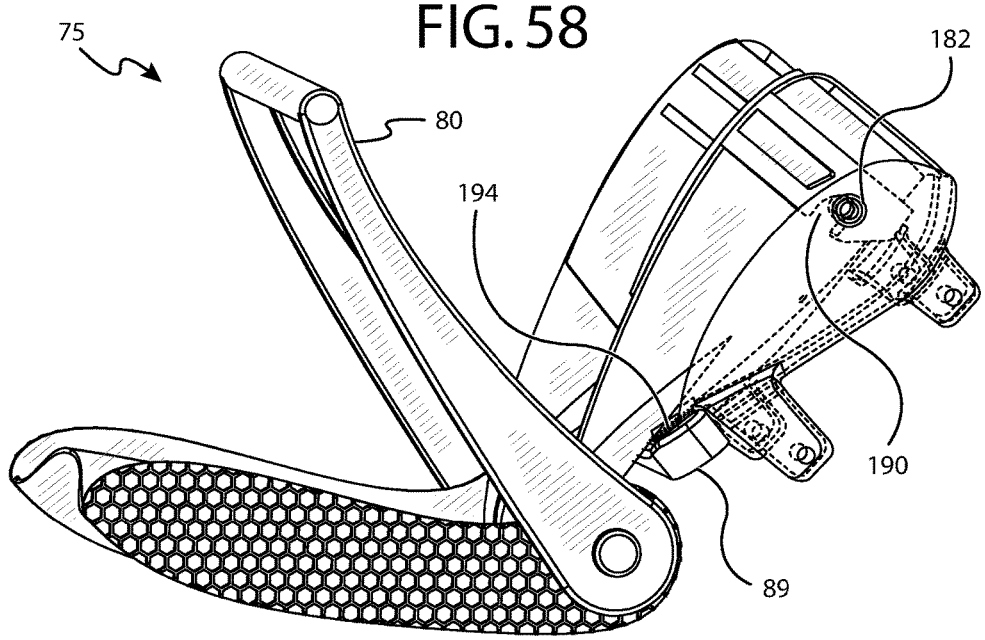
FIG. 59 is a perspective partially phantom view of the carrier of FIG. 58 in an attached position with the adapter assembly.

With particular reference to FIGS. 58 and 59, the carrier 75 of this embodiment includes channels 190 disposed along opposing sides of the attachment side surface 98 operationally configured to receive the opposing protuberances 182 in a slotted position therein. The attachment side surface 98 also includes a catch member 192 extending out there from that is operationally configured to receive the enlarged head 187 of the stem member 186 in an engagement position therein during operation of the seating assembly 10. Suitably, the anchor assembly 89 includes one or more bias members 194 attached to the enclosure 188 and the stem member 186 in a manner effective to bias the stem member 186 to maintain the enlarged head 187 exposed out through the uppermost opening of the enclosure 188 as illustrated in FIG. 56. In operation, as the carrier 75 is installed onto the adapter assembly 88 the opposing channels 190 are aligned with the opposing protuberances 182 and set to an engagement position as illustrated. To lock the stem member 186 to the catch member 192 the anchor assembly 89 may be manually directed downward (see Directional Arrow AI) thereby directing the stem member 186 within the enclosure 188 as shown in FIG. 57. Once the stem member 186 is aligned with the lowermost opening of the enclosure 188, a user may release the anchor assembly 89 whereby the one or more bias members 194 suitably bias the enlarged head 187 to an engagement position with the catch member 192 (see attachment position in FIG. 59).

Figure 60:
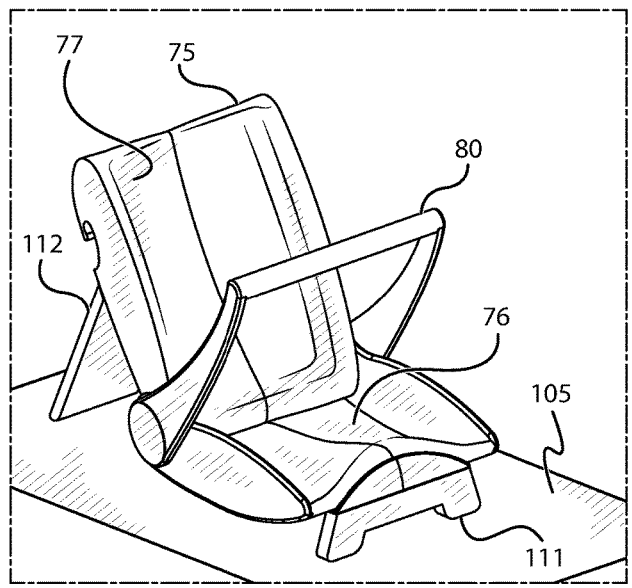
FIG. 60 is another embodiment of an infant carrier.

As depicted in the simplified illustrations of FIGS. 60-63, the carrier 75 may include one or more components or add-on features as desired or as otherwise required by one or more laws of one or more jurisdictions. For example, the carrier 75 may include a first support or kickstand 111 pivotally attached near the front of the carrier 75 suitably along the bottom surface of the seat surface 76 effective to maintain the carrier 75 in a fixed upright position when the carrier 75 is set upon a target support surface, e.g., a floor, ground, table top, chair or bench seat, automobile hood, thereby setting the orientation of the seat surface 76 and backrest surface member 77 in a fixed position. To further fix the position of a carrier 75, i.e., fix the position of the seat surface 76 and backrest surface member 77 relative a target surface, a carrier 75 may also include a second support or kickstand 112 pivotally attached to the rear surface of the backrest surface member 77. Similar as other kickstand type devices, the present kickstands 111, 112 may be (1) pivotally directed against the bottom and rear surfaces of the carrier 75, e.g., when the carrier 75 is set to an attachment position with the remaining seating assembly 10, and (2) directed to an open position for purposes of maintaining the carrier 75 in an upright position atop a separate support surface 105 as shown in FIG. 60. In one embodiment, the kickstands 111, 112 may be pivotally attached to the carrier 75 via one or more hinges. In another embodiment, the kickstands 111, 112 may be pivotally attached to the carrier 75 via one or more pivot pins. In another embodiment, the kickstands 111, 112 may be removable members attachable to the carrier 75, e.g., snap fit to the carrier 75, mated or abutted with one or more surface features along the carrier 75.

Figure 61:
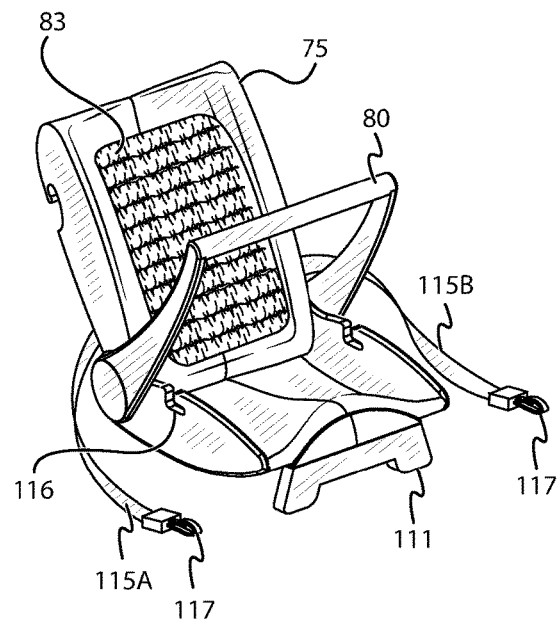
FIG. 61 is another embodiment of an infant carrier.

The carrier 75 may also include one or more connectors for further securing the carrier 75 to the seat member 12 and/or for securing the carrier 75 to vehicular child anchors as may be provided in a particular vehicle. In one simplified embodiment, connectors may include opposing strap members 115A and 115B including attachment members 117 as shown in FIG. 61, effective to assist in maintaining the carrier 75 in a fixed position with the remaining seating assembly 10 during use. In another simplified embodiment, the two opposing strap members 115A and 115B and attachment members 117 may be used for attaching the carrier 75 to vehicular child anchors of one or more vehicles. Without limiting the invention, suitable strap members include, but are not necessarily limited to flexible elongated straps, belts, cables, cords, ropes, and combinations thereof. It is further contemplated that such strap members may also be stretchable as desired.

In one embodiment, the carrier 75 may include an opening through its body for receiving a single strap member there through, the strap member having a length effective for use along either side of the carrier 75. In operation, the strap members 115A and 115B, or single strap depending on the embodiment, may inserted between the first back surface 22 and first seat surface 20, whereby the distal ends of the strap members 115A and 115B may be fastened to vehicular child anchors including but not necessarily limited to an ISOFIX system, LATCH system, LUAS system or other operable mechanism of securement. In another embodiment, a single strap may be inserted between the first back surface 22 and the first seat surface 20 from one side of the carrier 75 to the opposite side of the carrier 75.

The attachment members 117 may vary as desired or as otherwise required by law. As shown in the exemplary embodiment of FIG. 61, the opposing attachment members may include snap spring clip hooks 117. In another embodiment, one of the straps may include a snap spring clip hook and the opposing strap may include a ring member, a carabiner spring clip, and the like as is commonly used for attaching snap spring clip hooks.

In an embodiment for passenger securement purposes, the strap members 115A, 115B may include a female end buckle type device with a release button intended to receive the corresponding male end anchor of the latch assembly in a manner commonly found in automobiles and the like. In still another embodiment for passenger securement purposes, the strap members 115A, 115B may include hook and loop fasteners for interconnecting and holding the opposing strap members 115A, 115B together during use. In another embodiment for passenger securement purposes, the carrier 75 may be provided with a single strap attached at one side of the seat member 12 and a buckle or loop attached to an opposing side of the seat surface 76 of the carrier 75 whereby the strap may be pulled through and then over the buckle or loop and attach to itself via hook and loop fasteners disposed along the strap as known in the art of hook and loop fastening belts. As such, the strap may be tightened as desired according to the layout of the hook and loop fasteners.

For purposes of this application, the one or more strap members 115A, 115B are suitably constructed from one or more flexible materials including, but not necessarily limited to fabric materials, natural fibrous materials, synthetic fibrous materials, rubbers, plastics, leathers, and combinations thereof. In addition, the attachment members 117 of this application are suitably constructed from one or more durable materials effective to maintain the strap members 115A, 115B in a locked or attached position during use. Suitable materials of construction of the attachment members 117 include, but are not necessarily limited to metals, polymeric materials, and combinations thereof. Even though snap spring clip hooks and the like may be constructed from one or more metals, one or more polymeric materials, and combinations thereof as desired, one suitable clip hook may be constructed from stainless steel. Another suitable clip hook may be constructed from aluminum. Another suitable clip hook may be constructed from polyvinyl chloride ("PVC").

Figure 62:
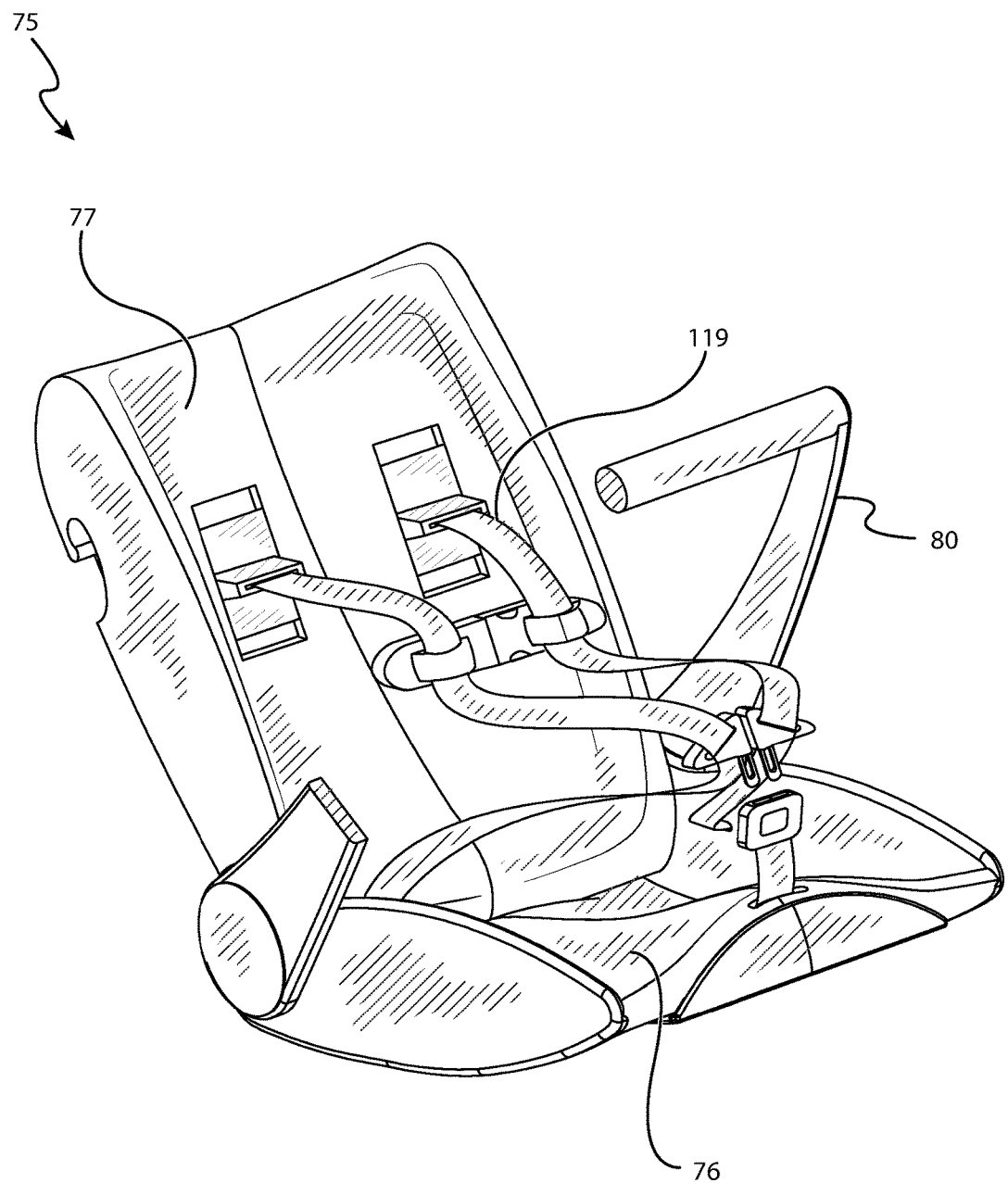
FIG. 62 is another embodiment of an infant carrier.

In still another embodiment the carrier 75 may include an adjustable seat belt harness operationally configured to be adjusted according to the size of the passenger seated therein, e.g., adjustable along the seating surface of the backrest surface member 77 to accommodate the shoulder position of a particular passenger. As shown in FIG. 62, the carrier 75 may include a five-point seat belt harness 119 having attachments to both the seat surface 76 and the backrest surface member 77. In other embodiments, a six-point seat belt harness as understood by the skilled artisan may be employed. Although the configuration of the harness attachments may vary, a suitable five-point harness system may include a belt adjusting mechanism and operate in a manner similar as the harness systems provided by manufacturers including, but not limited to Graco Children's Products, Atlanta, Ga., and Evenflo Company Inc., Miamisburg, Ohio.

Figure 63:
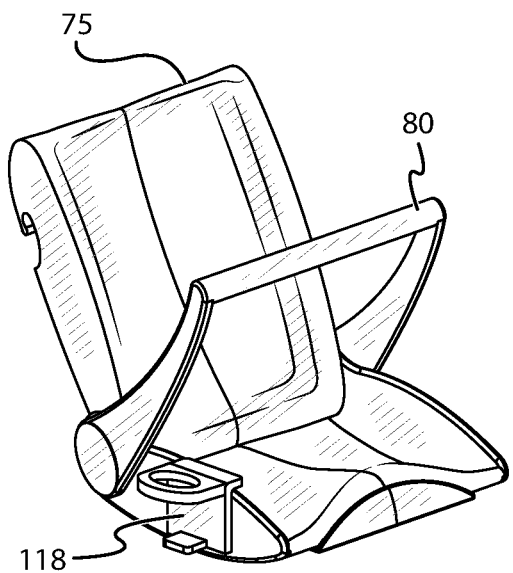
FIG. 63 is another embodiment of an infant carrier.

Turning to FIG. 63, the carrier 75 may also include a holder 118 for a beverage container such as a bottle or a cup. A suitable holder 118 may be located along one of the sides of the seat surface 76 at a position not to encumber the handle 80 allowing the handle 80 to pivot about junctions 96A and 96B through its complete travel distance (see the cutout portions 116 in FIG. 61 operationally configured to receive and secure part of a holder 118 therein). The holder 118 may also be formed or otherwise operationally configured to hold various infant related items including, but not necessarily limited to wet wipes, tissue, diapers, medicine, and combinations thereof. The holder 118 may also be used to hold adult related items such as smartphones, keys, beverages, eye glasses, sun shades and other hand held items as desired. A suitable holder 118 may be constructed from polymeric materials, fibrous materials, metals, woods, composite materials, and combinations thereof. Suitable polymeric materials include rubbers and plastics such as ABS, polypropylene, and combinations thereof. Suitable fibrous materials include cardboard, paperboard, and combinations thereof.

Figure 64:
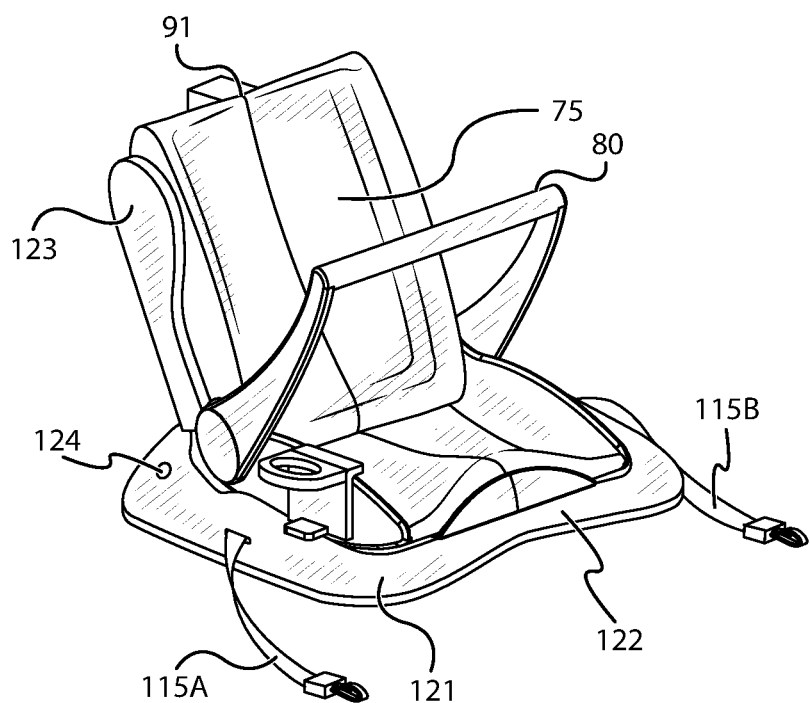
FIG. 64 is another embodiment of an infant carrier.

In still another embodiment as shown in the simplified illustration of FIG. 64, a separate base member 121 may be provided as a universal type base operationally configured to engage and hold the carrier 75 for use in other commercially available vehicular seats other than the present seating assembly 10. As shown, the base member 121 includes a frame and/or a body having an upper surface operationally configured to engage and hold the backside of a carrier 75 in a fixed position during use similar as described above in regard to the adapter assembly 88. Without limiting the invention to a single mode of operation, in one suitable embodiment both the carrier 75 and the base member 121 may be produced from molds or the like and shaped to maximize the surface area of abutment between the two members providing a form fit for the carrier 75 within the base member 121.

In one embodiment, the base member 121 may be constructed from like material(s) as the corresponding carrier 75 or one or more materials as described above in reference to the carrier 75. As further illustrated in FIG. 64, the base member 121 may be provided with strap members 115A, 115B as described above for attaching the base member 121 to a vehicle. In addition, the base member 121 may include a lip, hook or similar structure for engaging and holding a vehicular seat belt restraint for added stabilization of the base member 121 during vehicle operation. In still another embodiment, a base member 121 may be provided with wheels and push handles functioning as a stroller type device as known in the art for transporting a passenger in the carrier 75 apart from the seating assembly 10.

Still referring to FIG. 64, the base member 121 suitably includes two sections, namely, a seat base 122 and a backrest base 123 pivotally connected at pivot point 124 via a pivot rod. In another embodiment, each side of the base member 121 may have a separate pivot rod or pivot pin for promoting pivot action of the seat and backrest bases 122, 123. In still another embodiment, the base member 121 may be provided as a one piece shell. The base member 121 may also be provided with one or more kickstands as described above effective for stabilizing the base member 121 and for orienting the base member 121 as desired.

Figure 65:
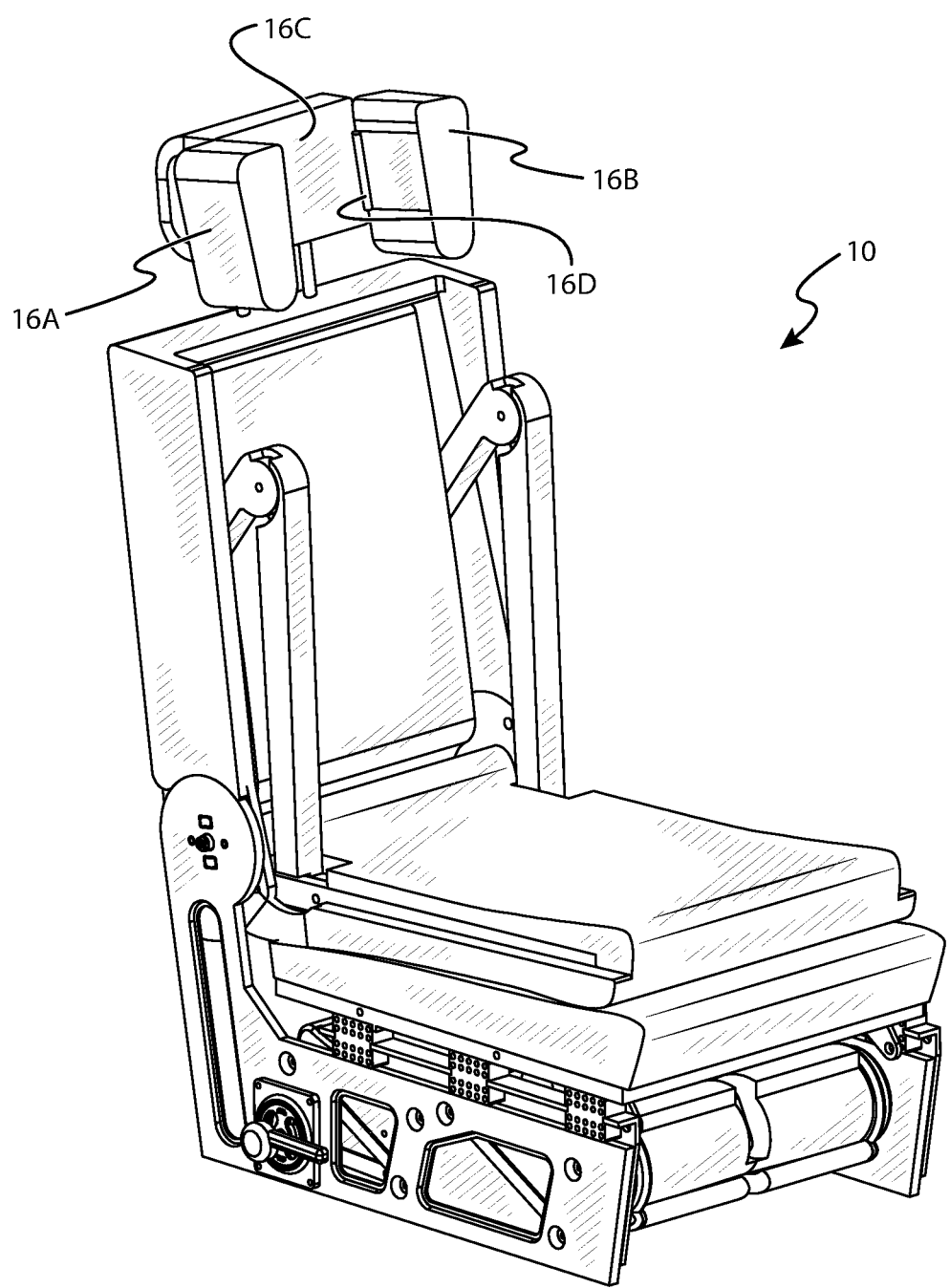
FIG. 65 is another view of the vehicular seating assembly of FIG. 2.

It is also contemplated herein that the headrest member 16 may include one or more size and/or shapes as desired as otherwise required by law. In addition, the headrest member 16 may include a single body or it may incorporate multiple component parts for adjustable use. As shown in the simplified example of FIG. 65, the headrest member 16 of FIG. 2 may include two fold out members 16A, 16B pivotally attached to a stationary member 16C. Suitably, the fold out members 16A, 16B provide a space or void there between large enough to receive a passenger's head against the surface of the stationary member 16C. In addition, the fold out members 16A, 16B may extend forward a distance effective to provide lateral shielding to protect a passenger's head from side impacts, and/or projectiles as well as undesired lateral head/neck movement. Accordingly, the fold out members 16A and 16B include outer surfaces that are operationally configured to dictate the amount of rearward passenger head movement during use when the fold out members 16A, 16B are set to a closed position (see FIGS. 2 and 7). When the fold out members 16A and 16B are set to an open position, the inner surfaces of the fold out members 16A, 16B and the stationary member 16C are operationally configured to dictate the amount of rearward and lateral head movement during use. In one embodiment, when the headrest member 16 is set at an abutment position or near abutment with the top of the backrest member 14, the fold out members 16A, 16B may extend forward in a manner whereby the lowermost part of the fold out members 16A, 16B encroach part of the upper surface area of the second back surface 64 providing a usable headrest member 16 for shorter passengers.

In one suitable embodiment, the fold out members 16A, 16B may be pivotally attached to the stationary member 16C via hinges 16D. For automobile operations, when set to an open position the distance from the surface of the stationary member 16C to the front or foremost surface of each fold out member 16A, 16B is up to about 15.24 cm (about 6.0 inches).

Although the seating assembly 10 is described above in terms of various exemplary embodiments and implementations, it should be understood that the various features, aspects and functionality described in one or ore of the individual embodiments are not limited in their applicability to the particular embodiment with which they are described, but instead might be applied, alone or in various combinations, to one or more of the other embodiments of the disclosed assembly system and method, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof. The terms "a" or "an" should be read as meaning "at least one," "one or more," or the like. Adjectives such as "typical," "normal," "known," "common" and terms of similar meaning should not be construed as limiting the item described to a given time period or to an item available as of a given time, but instead should be read to encompass typical, normal, or known technologies that might be available or known now or at any time in the future. Likewise, where this application refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Persons of ordinary skill in the art will recognize that many modifications may be made to the present application without departing from the spirit and scope of the application. The embodiment(s) described herein are meant to be illustrative only and should not be taken as limiting the invention, which is defined in the claims. All original claims submitted with this specification are incorporated by reference in their entirety as if fully set forth herein.

We claim:

1. An infant seat carrier including:
    a seat surface member having a center longitudinal plane and a backrest surface member having a center longitudinal plane, the backrest surface member being pivotally attached to the seat surface member at opposing pivot axis junctions wherein the seat surface member and backrest surface member are pivotal between (1) a closed position wherein said center longitudinal planes are oriented in a substantially parallel alignment and (2) one or more open positions including open positions wherein the center longitudinal planes define obtuse angles;
    one or more connectors releasably attachable to vehicular child anchors;
    at least a first locking mechanism operable with one of the pivot axis junctions, the first locking mechanism being operationally configured to dictate pivotal movement of the seat surface member and the backrest surface member between said closed position and said one or more open positions; and,
    wherein a first locking mechanism includes a locking gear assembly comprised of outer gears and an adjustable gear stop member operationally configured to communicate with the outer gears in a manner effective to prevent pivotal movement of the seat surface member and backrest surface member.

2. The infant seat carrier of claim 1 further including a handle attached at one or more of the pivot axis junctions.

3. The infant seat carrier of claim 1 further including at least one support operationally configured to maintain the infant seat carrier in an upright position when the infant seat carrier is set upon a target surface.

4. The infant seat carrier of claim 1 further including an adjustable five-point seat belt harness.

5. A vehicular seating assembly having a seat member assembly and a backrest member assembly, the vehicular seating assembly including a plurality of vehicular forward facing seating configurations and a plurality of vehicular rearward facing seating configurations, the rearward facing seating configuration including an infant seat carrier operationally configured to be concealed from view when the seating assembly is set at a forward facing seating configuration, the infant seat carrier being (1) releasably attachable to the seat member assembly for rearward facing seating use and (2) releasably attachable to vehicular child anchors for standalone vehicular use apart from the seating assembly; and,
    the vehicular seating assembly further including an intermediary member releasably attachable to the seat member assembly, the intermediary member being operationally configured to receive a backrest surface member of the infant seat carrier in releasable attachment thereto when the vehicular seating assembly is set at forward and rearward facing seating configurations.

6. The vehicular seating assembly of claim 5 wherein the infant seat carrier includes a seat surface member and a backrest surface member pivotally attached to the seat surface member at opposing pivot axis junctions in a manner effective for the backrest surface member to be (1) directed to a contact position with the seat surface member when the seating assembly is set at a forward facing seating configuration and (2) directed apart from the seat surface member to one or more open positions when the seating assembly is set at a rearward facing seating configuration.

7. The vehicular seating assembly of claim 5 wherein the backrest surface member includes one or more connectors for releasably attaching the backrest surface member to the intermediary member.

8. The vehicular seating assembly of claim 6 further including a locking mechanism in communication with one of the pivot axis junctions, the locking mechanism being operationally configured to hold the backrest surface member at one or more fixed positions relative the seat surface member.

9. The vehicular seating assembly of claim 5 wherein the infant seat carrier includes a handle for manually carrying of the infant seat carrier apart from the vehicular seating assembly.

10. A vehicular seating assembly including (1) a mounting chassis fixable to one or more vehicular surfaces, (2) a seat member assembly attached to the mounting chassis, the seat member assembly having a pivotal seat member defining a first seat surface and an opposing underside surface including a mounting assembly disposed along the underside surface, (3) a backrest member assembly attached to the mounting chassis, the backrest member assembly having a pivotal first backrest member defining a first backrest surface when the first backrest member is set at an upright position, and (4) an infant seat carrier releasably attachable to the mounting assembly; and, wherein the backrest member assembly includes at least a first interchangeable removable member operationally configured to provide a second backrest surface when the first backrest member is oriented in a horizontal position.

11. The vehicular seating assembly of claim 10 wherein the elevation of the first seat surface relative the vehicular surface is adjustable.

12. The vehicular seating assembly of claim 10 wherein the infant seat carrier is operationally configured for stand-alone use, the infant seat carrier including one or more connectors releasably attachable to vehicular child anchors of a vehicle.

13. The vehicular seating assembly of claim 10 wherein the first interchangeable removable member includes a harness system defined by harness strapping, apertures disposed along the second backrest surface for receiving part of the harness strapping there through, and a tensioner system housed within the backrest member assembly operationally configured to increase and decrease the length of the harness strapping extending out through the apertures.

14. The vehicular seating assembly of claim 13 wherein the apertures include a combination of a plurality of substantially horizontally aligned fixed slots interconnected with substantially vertically aligned grooves for receiving the harness strapping there through.

15. The vehicular seating assembly of claim 10 including opposing side guard members exposed when the first backrest member is oriented in a horizontal position.

16. The vehicular seating assembly of claim 15 wherein the opposing side guard members further include extensible side shielding members effective to define the width of the second backrest surface.

17. The vehicular seating assembly of claim 16 wherein the extensible side shielding members each include a perimeter frame member disposed along the edge of an interior substantially planar panel member, the frame members being operationally configured to bend when the side shielding members are set at a retracted position when the first backrest member is oriented in an upright position.

* * * * *